(12) United States Patent
Bishop et al.

(10) Patent No.: US 7,725,427 B2
(45) Date of Patent: May 25, 2010

(54) RECURRENT BILLING MAINTENANCE WITH RADIO FREQUENCY PAYMENT DEVICES

(76) Inventors: Fred Bishop, 5511 W. Aster, Glendale, AZ (US) 85304; Peter D Saunders, 3710 E. Palisade Dr., Salt Lake City, UT (US) 84109

(*) Notice: Subject to any disclaimer, the term of this patent is extended or adjusted under 35 U.S.C. 154(b) by 1052 days.

(21) Appl. No.: 10/711,613

(22) Filed: Sep. 28, 2004

(65) Prior Publication Data

US 2005/0149544 A1 Jul. 7, 2005

Related U.S. Application Data

(63) Continuation-in-part of application No. 10/192,488, filed on Jul. 9, 2002, now Pat. No. 7,239,226, which is a continuation-in-part of application No. 09/865,878, filed on May 25, 2001, now Pat. No. 7,035,872, which is a continuation-in-part of application No. 10/340,352, filed on Jan. 10, 2003.

(60) Provisional application No. 60/396,577, filed on Jul. 16, 2002, provisional application No. 60/304,216, filed on Jul. 10, 2001.

(51) Int. Cl.
*G06F 17/30* (2006.01)
*G06F 17/00* (2006.01)
(52) U.S. Cl. .................. 707/203; 707/200
(58) Field of Classification Search ............ 707/3, 707/10, 100
See application file for complete search history.

(56) References Cited

U.S. PATENT DOCUMENTS

| | | |
|---|---|---|
| D61,466 S | 9/1922 | Foltz |
| 2,767,756 A | 10/1956 | Niles |
| 3,446,260 A | 5/1969 | Osher |
| 3,536,894 A | 10/1970 | Travioli |
| 3,573,731 A | 4/1971 | Schwend |
| 3,725,647 A | 4/1973 | Retzky |
| 3,763,356 A | 10/1973 | Berler |
| 3,829,662 A | 8/1974 | Furahashi |
| 3,838,252 A | 9/1974 | Hynes et al. |
| 3,873,813 A | 3/1975 | Lahr et al. |

(Continued)

FOREIGN PATENT DOCUMENTS

| | | |
|---|---|---|
| CA | 2300241 | 9/2000 |
| DE | 3636921 | 5/1981 |
| DE | 3941070 | 6/1991 |
| DE | 4339460 | 11/1993 |
| DE | 19741726 | 9/1997 |
| DE | 10203926 | 1/2002 |
| EP | 0657297 | 6/1995 |
| EP | 0735505 | 10/1996 |
| EP | 0854461 | 7/1998 |
| EP | 0917120 | 5/1999 |

(Continued)

OTHER PUBLICATIONS

International Search Report and Written Opinion of the International Searching Authority, PCT/US05/26067, May 23, 2007.

(Continued)

*Primary Examiner*—Baoquoc N To
(74) *Attorney, Agent, or Firm*—Snell & Wilmer L.L.P.

(57) ABSTRACT

An RF recurrent billing system in which an account number associated with a recurrent billing account is stored within an RF transaction device. The user of the RF transaction device may present the device for completing a transaction, and the transaction, if successfully completed, is billed to the user's recurrent billing account. The user is billed for the transaction during a billing cycle, typically occurring on a regular basis according to the recurrent billing account.

26 Claims, 15 Drawing Sheets

U.S. PATENT DOCUMENTS

| | | | |
|---|---|---|---|
| 3,894,756 A | 7/1975 | Ward | |
| 3,929,177 A | 12/1975 | Reis | |
| 3,955,295 A | 5/1976 | Mayer | |
| 4,044,231 A | 8/1977 | Beck et al. | |
| 4,048,737 A | 9/1977 | McDermott | |
| 4,056,139 A | 11/1977 | Murt | |
| 4,058,839 A | 11/1977 | Darjany | |
| 4,119,361 A | 10/1978 | Greenaway | |
| 4,202,491 A | 5/1980 | Suzuki | |
| 4,222,516 A | 9/1980 | Badet et al. | |
| 4,277,863 A | 7/1981 | Faneuf | |
| 4,303,904 A | 12/1981 | Chasek | |
| 4,356,646 A | 11/1982 | Johnson, Jr. | |
| 4,361,757 A | 11/1982 | Ehrat | |
| D270,303 S | 8/1983 | Zautner | |
| D270,546 S | 9/1983 | Malmberg | |
| 4,436,991 A | 3/1984 | Albert et al. | |
| 4,450,535 A | 5/1984 | dePommery et al. | |
| 4,453,074 A | 6/1984 | Weinstein | |
| 4,475,308 A | 10/1984 | Heise et al. | |
| 4,504,084 A | 3/1985 | Jauch | |
| 4,507,652 A | 3/1985 | Vogt et al. | |
| D280,214 S | 8/1985 | Opel | |
| 4,538,059 A | 8/1985 | Rudland | |
| 4,547,002 A | 10/1985 | Colgate, Jr. | |
| 4,558,211 A | 12/1985 | Berstein | |
| 4,563,024 A | 1/1986 | Blyth | |
| 4,581,523 A | 4/1986 | Okuno | |
| 4,582,985 A | 4/1986 | Lofberg | |
| 4,583,766 A | 4/1986 | Wessel | |
| 4,597,814 A | 7/1986 | Colgate, Jr. | |
| 4,639,765 A | 1/1987 | dHont | |
| 4,641,017 A | 2/1987 | Lopata | |
| 4,643,452 A | 2/1987 | Chang | |
| 4,672,021 A | 6/1987 | Blumel et al. | |
| 4,684,795 A | 8/1987 | Colgate, Jr. | |
| 4,692,394 A | 9/1987 | Drexler | |
| 4,694,148 A | 9/1987 | Diekemper et al. | |
| 4,697,073 A | 9/1987 | Hara | |
| 4,697,363 A | 10/1987 | Gamm | |
| 4,711,690 A | 12/1987 | Haghiri-Tehrani | |
| 4,725,719 A | 2/1988 | Oncken et al. | |
| 4,739,328 A | 4/1988 | Koelle et al. | |
| 4,747,147 A | 5/1988 | Sparrow | |
| 4,768,811 A | 9/1988 | Oshikoshi et al. | |
| 4,779,898 A | 10/1988 | Berning et al. | |
| 4,794,142 A | 12/1988 | Alberts et al. | |
| 4,801,790 A | 1/1989 | Solo | |
| 4,816,653 A | 3/1989 | Anderl et al. | |
| 4,841,570 A | 6/1989 | Cooper | |
| 4,852,911 A | 8/1989 | Hoppe | |
| 4,853,525 A | 8/1989 | Vogt et al. | |
| 4,863,819 A | 9/1989 | Drexler et al. | |
| 4,889,366 A | 12/1989 | Fabbiani | |
| 4,897,533 A | 1/1990 | Lyszczarz | |
| 4,897,947 A | 2/1990 | Kass-Pious | |
| 4,910,521 A | 3/1990 | Mellon | |
| 4,917,292 A | 4/1990 | Drexler | |
| D307,979 S | 5/1990 | Purvis | |
| 4,937,963 A | 7/1990 | Barnes | |
| D310,386 S | 9/1990 | Michels et al. | |
| 4,961,142 A | 10/1990 | Elliott et al. | |
| 4,993,068 A | 2/1991 | Piosenka et al. | |
| 5,004,899 A | 4/1991 | Ueda | |
| 5,010,243 A | 4/1991 | Fukushima et al. | |
| 5,015,830 A | 5/1991 | Masuzawa et al. | |
| 5,016,274 A | 5/1991 | Micali et al. | |
| 5,023,782 A | 6/1991 | Lutz et al. | |
| 5,023,908 A | 6/1991 | Weiss | |
| 5,025,372 A | 6/1991 | Burton et al. | |
| 5,052,328 A | 10/1991 | Eppenbach | |
| 5,053,774 A | 10/1991 | Schuermann et al. | |
| 5,096,228 A | 3/1992 | Rinderknecht | |
| 5,099,226 A | 3/1992 | Andrews | |
| 5,101,200 A | 3/1992 | Swett | |
| 5,106,125 A | 4/1992 | Antes | |
| 5,111,033 A | 5/1992 | Fujita et al. | |
| 5,142,383 A | 8/1992 | Mallik | |
| 5,171,039 A | 12/1992 | Dusek | |
| 5,175,416 A | 12/1992 | Mansvelt et al. | |
| 5,180,902 A | 1/1993 | Schick et al. | |
| 5,192,947 A | 3/1993 | Neustein | |
| 5,193,114 A | 3/1993 | Moseley | |
| 5,197,140 A | 3/1993 | Balmer | |
| 5,202,826 A | 4/1993 | McCarthy | |
| 5,212,777 A | 5/1993 | Gove et al. | |
| 5,217,844 A | 6/1993 | Fukushima et al. | |
| 5,221,838 A | 6/1993 | Gutman et al. | |
| 5,222,282 A | 6/1993 | Sukonnik et al. | |
| 5,226,989 A | 7/1993 | Sukonnik | |
| 5,239,654 A | 8/1993 | Ing-Simmons et al. | |
| 5,245,329 A | 9/1993 | Gokcebay | |
| 5,247,304 A | 9/1993 | dHont | |
| 5,251,937 A | 10/1993 | Ojster | |
| 5,256,473 A | 10/1993 | Kotani et al. | |
| 5,272,326 A | 12/1993 | Fujita et al. | |
| 5,274,392 A | 12/1993 | dHont et al. | |
| 5,279,019 A | 1/1994 | Knickle | |
| 5,285,100 A | 2/1994 | Byatt | |
| 5,300,764 A | 4/1994 | Hoshino et al. | |
| 5,305,002 A | 4/1994 | Holodak et al. | |
| 5,311,679 A | 5/1994 | Birch, Sr. | |
| 5,321,751 A | 6/1994 | Ray et al. | |
| 5,329,617 A | 7/1994 | Asal | |
| 5,331,138 A | 7/1994 | Saroya | |
| 5,339,447 A | 8/1994 | Balmer | |
| 5,349,357 A | 9/1994 | Schurmann et al. | |
| 5,350,906 A | 9/1994 | d'Hont et al. | |
| 5,351,052 A | 9/1994 | dHont et al. | |
| 5,351,142 A | 9/1994 | Cueli | |
| 5,355,411 A | 10/1994 | MacDonald | |
| 5,371,896 A | 12/1994 | Gove et al. | |
| 5,373,303 A | 12/1994 | dHont | |
| 5,383,687 A | 1/1995 | Suess et al. | |
| 5,407,893 A | 4/1995 | Koshizuka et al. | |
| 5,408,243 A | 4/1995 | dHont | |
| 5,410,142 A | 4/1995 | Tsuboi et al. | |
| 5,410,649 A | 4/1995 | Gove | |
| 5,428,363 A | 6/1995 | dHont | |
| 5,438,184 A | 8/1995 | Roberts et al. | |
| 5,453,747 A | 9/1995 | dHont et al. | |
| 5,461,217 A | 10/1995 | Claus | |
| 5,461,219 A | 10/1995 | Cronvall | |
| 5,471,592 A | 11/1995 | Gove et al. | |
| 5,477,038 A | 12/1995 | Levine et al. | |
| 5,478,629 A | 12/1995 | Norman | |
| 5,479,530 A | 12/1995 | Nair et al. | |
| 5,485,510 A | 1/1996 | Colbert | |
| 5,488,376 A | 1/1996 | Hurta et al. | |
| 5,489,411 A | 2/1996 | Jha et al. | |
| 5,489,908 A | 2/1996 | Orthmann et al. | |
| 5,490,079 A | 2/1996 | Sharpe et al. | |
| 5,491,483 A | 2/1996 | dHont | |
| 5,491,484 A | 2/1996 | Schuermann | |
| 5,491,715 A | 2/1996 | Flaxl | |
| 5,493,312 A | 2/1996 | Knebelkamp | |
| 5,497,121 A | 3/1996 | dHont | |
| 5,500,513 A | 3/1996 | Langhans et al. | |
| 5,500,651 A | 3/1996 | Schuermann | |
| 5,504,808 A | 4/1996 | Schuermann | |
| 5,506,395 A | 4/1996 | Eppley | |
| 5,513,272 A | 4/1996 | Bogosian, Jr. | |
| 5,513,525 A | 5/1996 | Schurmann | |
| 5,514,860 A | 5/1996 | Berson | |

| Patent | Date | Name |
|---|---|---|
| 5,516,153 A | 5/1996 | Kaule |
| 5,518,810 A | 5/1996 | Nishihara et al. |
| 5,519,381 A | 5/1996 | Marsh et al. |
| 5,520,230 A | 5/1996 | Sumner, III |
| 5,521,966 A | 5/1996 | Friedes et al. |
| 5,522,083 A | 5/1996 | Gove et al. |
| 5,525,992 A | 6/1996 | Froschermeier |
| 5,525,994 A | 6/1996 | Hurta et al. |
| 5,530,232 A | 6/1996 | Taylor |
| 5,537,314 A | 7/1996 | Kanter |
| 5,539,825 A | 7/1996 | Akiyama |
| 5,541,582 A | 7/1996 | Wagner et al. |
| 5,541,604 A | 7/1996 | Meier |
| 5,543,798 A | 8/1996 | Schuermann |
| 5,544,246 A | 8/1996 | Mandelbaum et al. |
| 5,548,291 A | 8/1996 | Meier et al. |
| 5,550,536 A | 8/1996 | Flaxl |
| 5,550,548 A | 8/1996 | Schuermann |
| 5,552,789 A | 9/1996 | Schuermann |
| 5,557,279 A | 9/1996 | dHont |
| 5,557,516 A | 9/1996 | Hogan |
| 5,559,504 A | 9/1996 | Itsumi et al. |
| 5,559,887 A | 9/1996 | Davis et al. |
| 5,561,430 A | 10/1996 | Knebelkamp |
| 5,563,582 A | 10/1996 | dHont |
| 5,569,187 A | 10/1996 | Kaiser |
| 5,572,226 A | 11/1996 | Tuttle |
| 5,572,815 A | 11/1996 | Kovner |
| 5,575,094 A | 11/1996 | Leake et al. |
| 5,577,109 A | 11/1996 | Stimson et al. |
| 5,577,120 A | 11/1996 | Penzias |
| 5,577,121 A | 11/1996 | Davis et al. |
| 5,577,609 A | 11/1996 | Hexter, Jr. |
| 5,581,630 A | 12/1996 | Bonneau, Jr. |
| 5,590,038 A | 12/1996 | Pitroda |
| 5,590,197 A | 12/1996 | Chen et al. |
| 5,592,150 A | 1/1997 | dHont |
| 5,592,405 A | 1/1997 | Gove et al. |
| 5,594,227 A | 1/1997 | Deo |
| 5,594,233 A | 1/1997 | Kenneth et al. |
| 5,594,448 A | 1/1997 | dHont |
| 5,597,534 A | 1/1997 | Kaiser |
| 5,600,175 A | 2/1997 | Orthmann |
| 5,602,538 A | 2/1997 | Orthmann et al. |
| 5,602,918 A | 2/1997 | Chen et al. |
| 5,602,919 A | 2/1997 | Hurta et al. |
| 5,604,342 A | 2/1997 | Fujioka |
| 5,604,801 A | 2/1997 | Dolan et al. |
| 5,606,520 A | 2/1997 | Gove et al. |
| 5,606,594 A | 2/1997 | Register et al. |
| 5,607,522 A | 3/1997 | McDonnell |
| 5,608,203 A | 3/1997 | Finkelstein et al. |
| 5,608,406 A | 3/1997 | Eberth et al. |
| 5,608,778 A | 3/1997 | Partridge, III |
| 5,611,965 A | 3/1997 | Shouji et al. |
| 5,613,001 A | 3/1997 | Bakhoum |
| 5,613,131 A | 3/1997 | Moss et al. |
| 5,613,146 A | 3/1997 | Gove et al. |
| 5,614,703 A | 3/1997 | Martin et al. |
| 5,619,207 A | 4/1997 | dHont |
| 5,621,199 A | 4/1997 | Calari et al. |
| 5,621,396 A | 4/1997 | Flaxl |
| 5,621,411 A | 4/1997 | Hagl et al. |
| 5,621,412 A | 4/1997 | Sharpe et al. |
| 5,625,366 A | 4/1997 | dHont |
| 5,625,370 A | 4/1997 | dHont |
| 5,625,695 A | 4/1997 | MRaihi et al. |
| 5,629,981 A | 5/1997 | Nerlikar |
| 5,638,080 A | 6/1997 | Orthmann et al. |
| 5,640,002 A | 6/1997 | Ruppert et al. |
| 5,641,050 A | 6/1997 | Smith et al. |
| 5,646,607 A | 7/1997 | Schurmann et al. |
| 5,649,118 A | 7/1997 | Carlisle et al. |
| 5,657,388 A | 8/1997 | Weiss |
| 5,660,319 A | 8/1997 | Falcone et al. |
| 5,665,439 A | 9/1997 | Andersen et al. |
| 5,668,876 A | 9/1997 | Falk et al. |
| 5,673,106 A | 9/1997 | Thompson |
| D384,971 S | 10/1997 | Kawan |
| 5,675,342 A | 10/1997 | Sharpe |
| 5,677,953 A | 10/1997 | Dolphin |
| 5,686,920 A | 11/1997 | Hurta et al. |
| 5,689,100 A | 11/1997 | Carrithers |
| 5,691,731 A | 11/1997 | van Erven |
| 5,692,132 A | 11/1997 | Hogan |
| 5,694,596 A | 12/1997 | Campbell |
| 5,696,913 A | 12/1997 | Gove et al. |
| 5,697,649 A | 12/1997 | Dames et al. |
| 5,698,837 A | 12/1997 | Furuta |
| 5,699,528 A | 12/1997 | Hogan |
| 5,701,127 A | 12/1997 | Sharpe |
| 5,704,046 A | 12/1997 | Hogan |
| 5,705,101 A | 1/1998 | Oi et al. |
| 5,705,798 A | 1/1998 | Tarbox |
| 5,720,500 A | 2/1998 | Okazaki et al. |
| 5,721,781 A | 2/1998 | Deo et al. |
| 5,724,424 A | 3/1998 | Gifford |
| 5,727,140 A | 3/1998 | Ohtomo et al. |
| 5,727,696 A | 3/1998 | Valiulis |
| 5,729,053 A | 3/1998 | Orthmann |
| 5,729,236 A | 3/1998 | Flaxl |
| 5,731,957 A | 3/1998 | Brennan |
| 5,732,579 A | 3/1998 | dHont et al. |
| 5,734,838 A | 3/1998 | Robinson et al. |
| 5,737,439 A | 4/1998 | Lapsley et al. |
| 5,739,512 A | 4/1998 | Tognazzini |
| 5,742,756 A | 4/1998 | Dillaway et al. |
| 5,742,845 A | 4/1998 | Wagner |
| 5,748,137 A | 5/1998 | dHont |
| 5,748,737 A | 5/1998 | Daggar |
| 5,757,917 A | 5/1998 | Rose et al. |
| 5,758,195 A | 5/1998 | Balmer |
| 5,761,306 A | 6/1998 | Lewis |
| 5,761,493 A | 6/1998 | Blakeley et al. |
| 5,764,789 A | 6/1998 | Pare, Jr. et al. |
| 5,768,385 A | 6/1998 | Simon |
| 5,768,609 A | 6/1998 | Gove et al. |
| 5,774,882 A | 6/1998 | Keen et al. |
| 5,777,903 A | 7/1998 | Piosenka |
| 5,778,067 A | 7/1998 | Jones et al. |
| 5,778,069 A | 7/1998 | Thomlinson |
| 5,778,173 A | 7/1998 | Apte |
| 5,785,680 A | 7/1998 | Niezink et al. |
| 5,786,587 A | 7/1998 | Colgate, Jr. |
| 5,791,474 A | 8/1998 | Hansen |
| 5,792,337 A | 8/1998 | Padovani et al. |
| 5,793,324 A | 8/1998 | Aslanidis et al. |
| 5,794,095 A | 8/1998 | Thompson |
| 5,796,831 A | 8/1998 | Paradinas et al. |
| 5,797,060 A | 8/1998 | Thompson |
| 5,797,085 A | 8/1998 | Beuk et al. |
| 5,797,133 A | 8/1998 | Jones et al. |
| 5,798,709 A | 8/1998 | Flaxl |
| 5,799,087 A | 8/1998 | Rosen |
| 5,806,045 A | 9/1998 | Biorge et al. |
| 5,808,758 A | 9/1998 | Solmsdorf |
| 5,809,142 A | 9/1998 | Hurta et al. |
| 5,809,288 A | 9/1998 | Balmer |
| 5,809,633 A | 9/1998 | Mundigl et al. |
| 5,815,252 A | 9/1998 | Price-Francis |
| 5,815,657 A | 9/1998 | Williams et al. |
| 5,823,359 A | 10/1998 | Harris et al. |
| 5,825,007 A | 10/1998 | Jesadanont |
| 5,825,302 A | 10/1998 | Stafford |
| 5,826,077 A | 10/1998 | Blakeley et al. |
| 5,826,241 A | 10/1998 | Stein et al. |

| | | | | | |
|---|---|---|---|---|---|
| 5,826,242 A | 10/1998 | Montulli | 5,931,917 A | 8/1999 | Nguyen et al. |
| 5,828,044 A | 10/1998 | Jun et al. | 5,932,870 A | 8/1999 | Berson |
| 5,834,756 A | 11/1998 | Gutman et al. | 5,933,328 A | 8/1999 | Wallace et al. |
| 5,835,894 A | 11/1998 | Adcock et al. | 5,933,624 A | 8/1999 | Balmer |
| 5,838,812 A | 11/1998 | Pare, Jr. et al. | 5,936,226 A | 8/1999 | Aucsmith |
| 5,841,364 A | 11/1998 | Hagl et al. | 5,936,227 A | 8/1999 | Truggelmann et al. |
| 5,842,088 A | 11/1998 | Thompson | 5,938,010 A | 8/1999 | Osterbye |
| 5,844,218 A | 12/1998 | Kawan et al. | 5,942,761 A | 8/1999 | Tuli |
| 5,844,230 A | 12/1998 | Lalonde | 5,943,624 A | 8/1999 | Fox et al. |
| 5,845,267 A | 12/1998 | Ronen | 5,948,116 A | 9/1999 | Aslanidis et al. |
| 5,851,149 A | 12/1998 | Xidos et al. | 5,949,044 A | 9/1999 | Walker et al. |
| 5,852,812 A | 12/1998 | Reeder | 5,949,335 A | 9/1999 | Maynard |
| 5,854,891 A | 12/1998 | Postlewaite et al. | 5,949,876 A | 9/1999 | Ginter et al. |
| 5,856,048 A | 1/1999 | Tahara et al. | 5,950,174 A | 9/1999 | Brendzel |
| 5,857,079 A | 1/1999 | Claus et al. | 5,953,512 A | 9/1999 | Cai et al. |
| 5,857,709 A | 1/1999 | Chock | 5,955,717 A | 9/1999 | Vanstone |
| 5,858,006 A | 1/1999 | Van der AA et al. | 5,955,969 A | 9/1999 | dHont |
| 5,859,779 A | 1/1999 | Giordano et al. | 5,956,024 A | 9/1999 | Strickland et al. |
| 5,862,325 A | 1/1999 | Reed et al. | 5,956,693 A | 9/1999 | Geerlings |
| 5,864,323 A | 1/1999 | Berthon | 5,956,699 A | 9/1999 | Wong et al. |
| 5,864,830 A | 1/1999 | Armetta et al. | 5,958,004 A | 9/1999 | Helland et al. |
| 5,865,470 A | 2/1999 | Thompson | 5,960,411 A | 9/1999 | Hartman et al. |
| 5,867,100 A | 2/1999 | dHont | 5,960,416 A | 9/1999 | Block |
| 5,869,822 A | 2/1999 | Meadows et al. | 5,963,915 A | 10/1999 | Kirsch |
| 5,870,031 A | 2/1999 | Kaiser et al. | 5,963,924 A | 10/1999 | Williams et al. |
| 5,870,915 A | 2/1999 | dHont | 5,966,697 A | 10/1999 | Fergerson et al. |
| 5,875,432 A | 2/1999 | Sehr | 5,968,570 A | 10/1999 | Paulucci |
| D406,861 S | 3/1999 | Leedy, Jr. | 5,970,148 A | 10/1999 | Meier |
| 5,878,138 A | 3/1999 | Yacobi | 5,970,470 A | 10/1999 | Walker |
| 5,878,141 A | 3/1999 | Daly et al. | 5,970,471 A | 10/1999 | Hill |
| 5,878,215 A | 3/1999 | Kling et al. | 5,970,472 A | 10/1999 | Allsop et al. |
| 5,878,403 A | 3/1999 | DeFrancesco et al. | 5,970,473 A | 10/1999 | Gerszberg et al. |
| 5,880,675 A | 3/1999 | Trautner | 5,970,475 A | 10/1999 | Barnes et al. |
| 5,881,272 A | 3/1999 | Balmer | 5,971,276 A | 10/1999 | Sano et al. |
| 5,884,271 A | 3/1999 | Pitroda | 5,973,475 A | 10/1999 | Combaluzier |
| 5,884,280 A | 3/1999 | Yoshioka et al. | RE36,365 E | 11/1999 | Levine et al. |
| 5,884,292 A | 3/1999 | Baker et al. | 5,978,348 A | 11/1999 | Tamura |
| 5,884,310 A | 3/1999 | Brichta et al. | 5,978,840 A | 11/1999 | Nguyen et al. |
| 5,886,333 A | 3/1999 | Miyake | 5,979,942 A | 11/1999 | Ivicic |
| 5,887,266 A | 3/1999 | Heinonen et al. | 5,983,200 A | 11/1999 | Slotznick |
| 5,889,941 A | 3/1999 | Tushie et al. | 5,983,207 A | 11/1999 | Turk et al. |
| 5,890,137 A | 3/1999 | Koreeda | 5,983,208 A | 11/1999 | Haller |
| D408,054 S | 4/1999 | Leedy, Jr. | 5,984,180 A | 11/1999 | Albrecht |
| 5,892,211 A | 4/1999 | Davis et al. | 5,987,140 A | 11/1999 | Rowney et al. |
| 5,897,622 A | 4/1999 | Blinn et al. | 5,987,155 A | 11/1999 | Dunn et al. |
| 5,898,783 A | 4/1999 | Rohrbach | 5,987,498 A | 11/1999 | Athing et al. |
| 5,898,838 A | 4/1999 | Wagner | 5,988,497 A | 11/1999 | Wallace |
| 5,900,954 A | 5/1999 | Katz et al. | 5,989,950 A | 11/1999 | Wu |
| 5,901,239 A | 5/1999 | Kamei | 5,991,413 A | 11/1999 | Arditti et al. |
| 5,903,830 A | 5/1999 | Joao et al. | 5,991,608 A | 11/1999 | Leyten |
| 5,903,875 A | 5/1999 | Kohara | 5,991,750 A | 11/1999 | Watson |
| 5,903,880 A | 5/1999 | Biffar | 5,995,014 A | 11/1999 | DiMaria |
| 5,905,798 A | 5/1999 | Nerlikar et al. | 5,996,076 A | 11/1999 | Rowney et al. |
| 5,905,908 A | 5/1999 | Wagner | 5,999,914 A | 12/1999 | Blinn et al. |
| 5,907,620 A | 5/1999 | Klemba et al. | 6,000,832 A | 12/1999 | Franklin et al. |
| 5,909,492 A | 6/1999 | Payne et al. | 6,002,438 A | 12/1999 | Hocevar et al. |
| 5,912,446 A | 6/1999 | Wong et al. | 6,002,767 A | 12/1999 | Kramer |
| 5,912,678 A | 6/1999 | Saxena et al. | 6,003,014 A | 12/1999 | Lee et al. |
| 5,913,203 A | 6/1999 | Wong et al. | 6,005,942 A | 12/1999 | Chan et al. |
| 5,915,016 A | 6/1999 | Savalle et al. | 6,006,216 A | 12/1999 | Griffin et al. |
| 5,915,023 A | 6/1999 | Bernstein | 6,006,988 A | 12/1999 | Behrmann et al. |
| 5,915,973 A | 6/1999 | Hoehn-Saric et al. | 6,009,412 A | 12/1999 | Storey |
| 5,917,913 A | 6/1999 | Wang | 6,012,039 A | 1/2000 | Hoffman et al. |
| 5,917,925 A | 6/1999 | Moore | 6,012,049 A | 1/2000 | Kawan |
| 5,918,216 A | 6/1999 | Miksovsky et al. | 6,012,143 A | 1/2000 | Tanaka |
| 5,920,058 A | 7/1999 | Weber et al. | 6,014,634 A | 1/2000 | Scroggie et al. |
| 5,920,628 A | 7/1999 | Indeck et al. | 6,014,635 A | 1/2000 | Harris et al. |
| 5,920,629 A | 7/1999 | Rosen | 6,014,636 A | 1/2000 | Reeder |
| 5,920,847 A | 7/1999 | Kolling et al. | 6,014,645 A | 1/2000 | Cunningham |
| 5,924,624 A | 7/1999 | Martin | 6,014,646 A | 1/2000 | Vallee et al. |
| 5,928,788 A | 7/1999 | Riedl | 6,014,648 A | 1/2000 | Brennan |
| 5,929,801 A | 7/1999 | Aslanidis et al. | 6,014,650 A | 1/2000 | Zampese |
| 5,930,777 A | 7/1999 | Barber | 6,014,748 A | 1/2000 | Tushie et al. |

| Patent No. | Date | Inventor(s) | Patent No. | Date | Inventor(s) |
|---|---|---|---|---|---|
| 6,016,482 A | 1/2000 | Molinari et al. | 6,148,093 A | 11/2000 | McConnell et al. |
| 6,018,717 A | 1/2000 | Lee et al. | 6,148,484 A | 11/2000 | Andreae, Jr. |
| 6,018,718 A | 1/2000 | Walker et al. | 6,154,879 A | 11/2000 | Pare et al. |
| RE36,580 E | 2/2000 | Bogosian, Jr. | 6,155,168 A | 12/2000 | Sakamoto |
| 6,023,510 A | 2/2000 | Epstein | 6,171,138 B1 | 1/2001 | Lefebvre et al. |
| 6,024,286 A | 2/2000 | Bradley et al. | 6,173,272 B1 | 1/2001 | Thomas et al. |
| 6,024,385 A | 2/2000 | Goda | 6,181,287 B1 | 1/2001 | Beigel |
| 6,025,283 A | 2/2000 | Roberts | 6,182,895 B1 | 2/2001 | Albrecht |
| 6,027,028 A | 2/2000 | Pieterse et al. | 6,184,788 B1 | 2/2001 | Middlemiss et al. |
| 6,029,147 A | 2/2000 | Horadan et al. | 6,185,307 B1 | 2/2001 | Johnson, Jr. |
| 6,029,149 A | 2/2000 | Dykstra et al. | 6,189,779 B1 | 2/2001 | Verdicchio et al. |
| 6,029,150 A | 2/2000 | Kravitz | 6,195,006 B1 | 2/2001 | Bowers et al. |
| 6,029,175 A | 2/2000 | Chow | 6,196,465 B1 | 3/2001 | Awano |
| 6,029,890 A | 2/2000 | Austin | 6,197,396 B1 | 3/2001 | Haas et al. |
| 6,032,866 A | 3/2000 | Knighton et al. | 6,198,762 B1 | 3/2001 | Krasnov |
| 6,038,551 A | 3/2000 | Barlow et al. | 6,199,079 B1 | 3/2001 | Gupta et al. |
| 6,038,584 A | 3/2000 | Balmer | 6,199,762 B1 | 3/2001 | Hohle |
| 6,041,308 A | 3/2000 | Walker et al. | 6,200,272 B1 | 3/2001 | Linden |
| 6,041,410 A | 3/2000 | Hsu et al. | 6,222,914 B1 | 4/2001 | McMullin |
| 6,041,412 A | 3/2000 | Timson et al. | 6,223,977 B1 | 5/2001 | Hill |
| 6,044,388 A | 3/2000 | DeBellis et al. | 6,227,424 B1 | 5/2001 | Roegner |
| 6,047,888 A | 4/2000 | Dethloff | 6,233,348 B1 | 5/2001 | Fujii et al. |
| 6,050,605 A | 4/2000 | Mikelionis et al. | 6,247,030 B1 | 6/2001 | Suzuki |
| 6,052,675 A | 4/2000 | Checchio | 6,248,314 B1 | 6/2001 | Nakashimada et al. |
| 6,058,418 A | 5/2000 | Kobata | 6,255,031 B1 | 7/2001 | Yao et al. |
| 6,060,815 A | 5/2000 | Nysen | 6,257,486 B1 | 7/2001 | Teicher et al. |
| 6,061,789 A | 5/2000 | Hauser et al. | 6,263,446 B1 | 7/2001 | Kausik et al. |
| 6,064,320 A | 5/2000 | dHont et al. | 6,265,977 B1 | 7/2001 | Vega et al. |
| 6,064,751 A | 5/2000 | Smithies et al. | 6,268,788 B1 | 7/2001 | Gray |
| 6,064,981 A | 5/2000 | Barni et al. | 6,269,348 B1 | 7/2001 | Pare, Jr. et al. |
| 6,070,003 A | 5/2000 | Gove et al. | 6,277,232 B1 | 8/2001 | Wang et al. |
| 6,070,150 A | 5/2000 | Remington et al. | 6,296,188 B1 | 10/2001 | Kiekhaefer |
| 6,070,154 A | 5/2000 | Tavor et al. | 6,307,956 B1 | 10/2001 | Black |
| 6,072,870 A | 6/2000 | Nguyen et al. | 6,315,206 B1 | 11/2001 | Hansen et al. |
| 6,073,112 A | 6/2000 | Geerlings | 6,317,721 B1 | 11/2001 | Hurta et al. |
| 6,073,236 A | 6/2000 | Kusakabe et al. | 6,317,750 B1 | 11/2001 | Tortolani et al. |
| 6,073,840 A | 6/2000 | Marion | 6,317,755 B1 | 11/2001 | Rakers et al. |
| 6,076,078 A | 6/2000 | Camp et al. | 6,326,934 B1 | 12/2001 | Kinzie |
| 6,078,888 A | 6/2000 | Johnson, Jr. | 6,327,578 B1 | 12/2001 | Linehan |
| 6,078,906 A | 6/2000 | Huberman | 6,330,544 B1 | 12/2001 | Walker et al. |
| 6,081,790 A | 6/2000 | Rosen | 6,332,134 B1 | 12/2001 | Foster |
| RE36,788 E | 7/2000 | Mansvelt et al. | 6,332,193 B1 | 12/2001 | Glass et al. |
| 6,082,422 A | 7/2000 | Kaminski | D453,160 S | 1/2002 | Pentz et al. |
| 6,084,967 A | 7/2000 | Kennedy et al. | D453,161 S | 1/2002 | Pentz |
| 6,086,971 A | 7/2000 | Haas et al. | 6,336,095 B1 | 1/2002 | Rosen |
| 6,088,686 A | 7/2000 | Walker et al. | 6,338,048 B1 | 1/2002 | Mori |
| 6,088,717 A | 7/2000 | Reed et al. | 6,342,844 B1 | 1/2002 | Rozin |
| 6,088,797 A | 7/2000 | Rosen | D453,337 S | 2/2002 | Pentz et al. |
| 6,091,835 A | 7/2000 | Smithies et al. | D453,338 S | 2/2002 | Pentz et al. |
| 6,092,057 A | 7/2000 | Zimmerman et al. | D453,516 S | 2/2002 | Pentz |
| 6,092,198 A | 7/2000 | Lanzy et al. | D454,910 S | 3/2002 | Smith et al. |
| 6,095,413 A | 8/2000 | Tetro et al. | 6,360,953 B1 | 3/2002 | Lin et al. |
| 6,098,053 A | 8/2000 | Slater | 6,364,208 B1 | 4/2002 | Stanford et al. |
| 6,101,174 A | 8/2000 | Langston | 6,367,011 B1 | 4/2002 | Lee et al. |
| 6,101,477 A | 8/2000 | Hohle et al. | 6,374,245 B1 | 4/2002 | Park |
| 6,102,162 A | 8/2000 | Teicher | 6,377,034 B1 | 4/2002 | Ivanov |
| 6,102,672 A | 8/2000 | Woollenweber | D457,556 S | 5/2002 | Hochschild |
| 6,104,311 A | 8/2000 | Lastinger | 6,388,533 B2 | 5/2002 | Swoboda |
| 6,104,922 A | 8/2000 | Baumann | 6,390,375 B2 | 5/2002 | Kayanakis |
| 6,105,008 A | 8/2000 | Davis et al. | 6,397,198 B1 | 5/2002 | Hoffman et al. |
| 6,105,013 A | 8/2000 | Curry et al. | 6,400,272 B1 | 6/2002 | Holtzman et al. |
| 6,105,865 A | 8/2000 | Hardesty | 6,402,028 B1 | 6/2002 | Graham, Jr. et al. |
| 6,109,525 A | 8/2000 | Blomqvist et al. | 6,411,611 B1 | 6/2002 | Van der Tuijn |
| 6,112,984 A | 9/2000 | Snavely | D460,455 S | 7/2002 | Pentz |
| 6,115,458 A | 9/2000 | Taskett | 6,415,978 B1 | 7/2002 | McAllister |
| 6,116,655 A | 9/2000 | Thouin et al. | 6,419,158 B2 | 7/2002 | Hooglander |
| 6,116,736 A | 9/2000 | Stark et al. | 6,422,464 B1 | 7/2002 | Terranova |
| 6,120,461 A | 9/2000 | Smyth | 6,424,029 B1 | 7/2002 | Giesler |
| 6,122,625 A | 9/2000 | Rosen | 6,424,249 B1 | 7/2002 | Houvener |
| 6,125,352 A | 9/2000 | Franklin et al. | D461,477 S | 8/2002 | Pentz |
| D432,939 S | 10/2000 | Hooglander | 6,442,532 B1 | 8/2002 | Kawan |
| 6,128,604 A | 10/2000 | Sakamaki et al. | D462,965 S | 9/2002 | Pentz |
| 6,141,752 A | 10/2000 | Dancs et al. | D462,966 S | 9/2002 | Pentz et al. |

| | | |
|---|---|---|
| 6,446,862 B1 | 9/2002 | Mann |
| 6,457,000 B1 | 9/2002 | Witkowski et al. |
| 6,457,996 B1 | 10/2002 | Shih |
| 6,460,696 B1 | 10/2002 | Meyer |
| 6,466,804 B1 | 10/2002 | Pecen et al. |
| 6,473,500 B1 | 10/2002 | Risafi et al. |
| 6,480,100 B1 | 11/2002 | Frieden et al. |
| 6,480,101 B1 | 11/2002 | Kelly et al. |
| 6,480,825 B1 | 11/2002 | Sharma et al. |
| 6,481,621 B1 | 11/2002 | Herrendoerfer et al. |
| 6,481,623 B1 | 11/2002 | Grant et al. |
| 6,481,632 B2 | 11/2002 | Wentker et al. |
| 6,483,929 B1 | 11/2002 | Murakami et al. |
| 6,484,937 B1 | 11/2002 | Devaux et al. |
| 6,490,443 B1 | 12/2002 | Freeny, Jr. |
| 6,491,229 B1 | 12/2002 | Berney |
| 6,491,639 B1 | 12/2002 | Turcott |
| 6,494,380 B2 | 12/2002 | Jarosz |
| 6,496,594 B1 | 12/2002 | Prokoski |
| 6,501,832 B1 | 12/2002 | Saylor et al. |
| 6,507,662 B1 | 1/2003 | Brooks |
| 6,507,762 B1 | 1/2003 | Amro et al. |
| 6,510,983 B2 | 1/2003 | Horowitz et al. |
| 6,510,998 B1 | 1/2003 | Stanford et al. |
| 6,513,015 B2 | 1/2003 | Ogasawara |
| 6,519,565 B1 | 2/2003 | Clements et al. |
| 6,523,292 B2 | 2/2003 | Slavik |
| 6,529,880 B1 | 3/2003 | McKeen et al. |
| 6,535,726 B1 | 3/2003 | Johnson |
| 6,539,101 B1 | 3/2003 | Black |
| 6,546,373 B1 | 4/2003 | Cerra |
| 6,547,133 B1 | 4/2003 | DeVries, Jr. et al. |
| 6,549,912 B1 | 4/2003 | Chen |
| D474,234 S | 5/2003 | Nelms et al. |
| 6,560,581 B1 | 5/2003 | Fox et al. |
| 6,575,361 B1 | 6/2003 | Graves et al. |
| 6,577,229 B1 | 6/2003 | Bonneau et al. |
| 6,578,768 B1 | 6/2003 | Binder et al. |
| 6,581,839 B1 | 6/2003 | Lasch et al. |
| 6,588,660 B1 | 7/2003 | Buescher et al. |
| 6,588,673 B1 | 7/2003 | Chan et al. |
| 6,589,119 B1 | 7/2003 | Orus et al. |
| 6,591,249 B2 | 7/2003 | Zoka |
| 6,601,622 B1 | 8/2003 | Young |
| 6,601,759 B2 | 8/2003 | Fife et al. |
| 6,601,762 B2 | 8/2003 | Piotrowski |
| 6,608,995 B1 | 8/2003 | Kawasaki et al. |
| 6,609,655 B1 | 8/2003 | Harrell |
| 6,609,658 B1 | 8/2003 | Sehr |
| 6,626,356 B2 | 9/2003 | Davenport et al. |
| 6,628,961 B1 | 9/2003 | Ho et al. |
| 6,629,591 B1 | 10/2003 | Griswold et al. |
| 6,636,620 B1 | 10/2003 | Hoshino |
| 6,644,551 B2 | 11/2003 | Clayman et al. |
| 6,650,887 B2 | 11/2003 | McGregor et al. |
| 6,651,168 B1 | 11/2003 | Kao et al. |
| 6,651,813 B2 | 11/2003 | Vallans et al. |
| 6,651,892 B2 | 11/2003 | Hooglander |
| 6,657,614 B1 | 12/2003 | Ito et al. |
| 6,662,166 B2 | 12/2003 | Pare, Jr. et al. |
| 6,665,405 B1 | 12/2003 | Lenstra |
| 6,674,786 B1 | 1/2004 | Nakamura et al. |
| 6,679,427 B1 | 1/2004 | Kuroiwa |
| 6,681,926 B2 | 1/2004 | DeVolpi |
| 6,684,269 B2 | 1/2004 | Wagner |
| 6,687,714 B1 | 2/2004 | Kogen et al. |
| 6,687,875 B1 | 2/2004 | Suzuki |
| 6,690,930 B1 | 2/2004 | Dupre |
| 6,693,513 B2 | 2/2004 | Tuttle |
| 6,697,947 B1 | 2/2004 | Matyas, Jr. et al. |
| 6,703,918 B1 | 3/2004 | Kita |
| 6,704,039 B2 | 3/2004 | Pena |
| 6,705,530 B2 | 3/2004 | Kiekhaefer |
| 6,711,262 B1 | 3/2004 | Watanen |
| 6,725,202 B1 | 4/2004 | Hurta et al. |
| 6,732,936 B1 | 5/2004 | Kiekhaefer |
| 6,735,081 B1 | 5/2004 | Bishop et al. |
| 6,742,120 B1 | 5/2004 | Markakis et al. |
| 6,751,805 B1 | 6/2004 | Austion |
| 6,760,581 B2 | 7/2004 | Dutta |
| 6,763,500 B2 | 7/2004 | Black et al. |
| 6,765,470 B2 | 7/2004 | Shinzaki |
| 6,766,952 B2 | 7/2004 | Luu |
| 6,771,981 B1 | 8/2004 | Zalewski et al. |
| 6,789,012 B1 | 9/2004 | Childs et al. |
| 6,799,726 B2 | 10/2004 | Stockhammer |
| 6,816,058 B2 | 11/2004 | McGregor et al. |
| 6,819,219 B1 | 11/2004 | Bolle et al. |
| 6,823,910 B1 | 11/2004 | Elnekaveh |
| 6,834,270 B1 | 12/2004 | Pagani et al. |
| 6,834,795 B1 | 12/2004 | Rasmussen et al. |
| 6,843,415 B2 | 1/2005 | Vogler |
| 6,845,863 B1 | 1/2005 | Riley |
| 6,853,987 B1 | 2/2005 | Cook |
| 6,857,566 B2 | 2/2005 | Wankmueller |
| 6,873,974 B1 | 3/2005 | Schutzer |
| 6,877,097 B2 | 4/2005 | Hamid et al. |
| 6,883,715 B1 | 4/2005 | Fruhauf et al. |
| 6,898,299 B1 | 5/2005 | Brooks |
| H2120 H | 7/2005 | Cudlitz |
| 6,914,517 B2 | 7/2005 | Kinsella |
| 6,920,560 B2 | 7/2005 | Wallace |
| 6,925,439 B1 | 8/2005 | Pitroda |
| 6,925,565 B2 | 8/2005 | Black |
| 6,928,181 B2 | 8/2005 | Brooks |
| 6,931,538 B1 | 8/2005 | Sawaguchi |
| 6,934,861 B2 | 8/2005 | Haala |
| 6,940,461 B2 | 9/2005 | Nantz et al. |
| 6,944,402 B1 | 9/2005 | Baker et al. |
| 6,944,768 B2 | 9/2005 | Siegel et al. |
| 6,959,874 B2 | 11/2005 | Bardwell |
| 6,961,448 B2 | 11/2005 | Nichols et al. |
| 6,970,583 B2 | 11/2005 | Black |
| 6,986,099 B2 | 1/2006 | Todd |
| 6,990,480 B1 | 1/2006 | Burt |
| 6,997,378 B2 * | 2/2006 | Phillips et al. ............... 235/379 |
| 7,003,497 B2 | 2/2006 | Maes |
| 7,003,501 B2 | 2/2006 | Ostroff |
| 7,049,962 B2 | 5/2006 | Atherton et al. |
| 7,051,925 B2 | 5/2006 | Schwarz, Jr. |
| 7,059,159 B2 | 6/2006 | Lanigan et al. |
| 7,068,148 B2 | 6/2006 | Shanks et al. |
| 7,096,204 B1 | 8/2006 | Chen et al. |
| 7,096,494 B1 | 8/2006 | Chen |
| 7,100,821 B2 | 9/2006 | Rasti |
| 7,102,523 B2 | 9/2006 | Shanks et al. |
| 7,108,190 B2 | 9/2006 | Burgan et al. |
| 7,127,672 B1 | 10/2006 | Patterson et al. |
| 7,131,574 B1 | 11/2006 | Sciupac et al. |
| 7,132,946 B2 | 11/2006 | Waldner et al. |
| 7,136,835 B1 | 11/2006 | Flitcroft et al. |
| 7,150,407 B1 | 12/2006 | Berger et al. |
| 7,154,375 B2 | 12/2006 | Beenau et al. |
| 7,171,662 B1 | 1/2007 | Misra et al. |
| 7,213,748 B2 | 5/2007 | Tsuei et al. |
| 7,237,121 B2 | 6/2007 | Cammack et al. |
| 7,239,226 B2 | 7/2007 | Berardi et al. |
| 7,254,557 B2 | 8/2007 | Gillin et al. |
| 7,281,135 B2 | 10/2007 | Black |
| 7,287,271 B1 | 10/2007 | Riggins |
| 7,287,695 B2 | 10/2007 | Wankmueller |
| 7,299,364 B2 | 11/2007 | Noble et al. |
| 7,303,120 B2 | 12/2007 | Beenau et al. |
| 7,314,164 B2 | 1/2008 | Bonalle et al. |
| 7,314,165 B2 | 1/2008 | Bonalle et al. |
| 7,318,550 B2 | 1/2008 | Bonalle et al. |

| | | |
|---|---|---|
| 7,325,724 B2 | 2/2008 | Bonalle et al. |
| 7,341,181 B2 | 3/2008 | Bonalle et al. |
| 7,363,504 B2 | 4/2008 | Bonalle et al. |
| 7,363,505 B2 | 4/2008 | Black |
| 7,419,093 B1 | 9/2008 | Blackson et al. |
| 2001/0003071 A1 | 6/2001 | Mansutti et al. |
| 2001/0013542 A1 | 8/2001 | Horowitz et al. |
| 2001/0013546 A1 | 8/2001 | Ross |
| 2001/0013551 A1 | 8/2001 | Ramachandran |
| 2001/0017584 A1 | 8/2001 | Shinzaki |
| 2001/0018660 A1 | 8/2001 | Sehr |
| 2001/0022446 A1 | 9/2001 | Klure |
| 2001/0024157 A1 | 9/2001 | Hansmann et al. |
| 2001/0029493 A1 | 10/2001 | Pare, Jr. et al. |
| 2001/0032192 A1 | 10/2001 | Putta et al. |
| 2001/0034565 A1 | 10/2001 | Leatherman |
| 2001/0034720 A1 | 10/2001 | Armes |
| 2001/0036301 A1 | 11/2001 | Yamaguchi et al. |
| 2001/0036835 A1 | 11/2001 | Leedom, Jr. |
| 2001/0039617 A1 | 11/2001 | Buhrlen et al. |
| 2001/0040507 A1 | 11/2001 | Eckstein et al. |
| 2001/0045469 A1 | 11/2001 | Hooglander |
| 2001/0049628 A1 | 12/2001 | Icho |
| 2001/0053239 A1 | 12/2001 | Takhar |
| 2001/0055411 A1 | 12/2001 | Black |
| 2002/0002468 A1 | 1/2002 | Spagna et al. |
| 2002/0011519 A1 | 1/2002 | Shults |
| 2002/0014529 A1 | 2/2002 | Tanaka |
| 2002/0014952 A1 | 2/2002 | Terranova |
| 2002/0016687 A1 | 2/2002 | Felsenstein et al. |
| 2002/0024590 A1 | 2/2002 | Pena |
| 2002/0026419 A1 | 2/2002 | Maritzen et al. |
| 2002/0026575 A1 | 2/2002 | Wheeler et al. |
| 2002/0028704 A1 | 3/2002 | Bloomfield et al. |
| 2002/0030579 A1 | 3/2002 | Albert et al. |
| 2002/0030581 A1 | 3/2002 | Janiak et al. |
| 2002/0035548 A1 | 3/2002 | Hogan et al. |
| 2002/0036237 A1 | 3/2002 | Atherton et al. |
| 2002/0038818 A1 | 4/2002 | Zingher et al. |
| 2002/0041093 A1 | 4/2002 | Cox et al. |
| 2002/0042782 A1 | 4/2002 | Albazz et al. |
| 2002/0043566 A1 | 4/2002 | Goodman et al. |
| 2002/0046341 A1 | 4/2002 | Kazaks et al. |
| 2002/0052839 A1 | 5/2002 | Takatori |
| 2002/0062249 A1 | 5/2002 | Iannacci |
| 2002/0062284 A1 | 5/2002 | Kawan |
| 2002/0062291 A1 | 5/2002 | Zoka |
| 2002/0066784 A1 | 6/2002 | Segal et al. |
| 2002/0072349 A1 | 6/2002 | Geiselman et al. |
| 2002/0073025 A1 | 6/2002 | Tanner et al. |
| 2002/0074398 A1 | 6/2002 | Lancos et al. |
| 2002/0077837 A1 | 6/2002 | Krueger et al. |
| 2002/0077895 A1 | 6/2002 | Howell |
| 2002/0077992 A1 | 6/2002 | Tobin |
| 2002/0079367 A1 | 6/2002 | Montani |
| 2002/0083320 A1 | 6/2002 | Vatanen |
| 2002/0087869 A1 | 7/2002 | Kim |
| 2002/0092914 A1 | 7/2002 | Pentz et al. |
| 2002/0095298 A1 | 7/2002 | Ewing |
| 2002/0095343 A1 | 7/2002 | Barton et al. |
| 2002/0095389 A1 | 7/2002 | Gaines |
| 2002/0095587 A1 | 7/2002 | Doyle et al. |
| 2002/0095588 A1 | 7/2002 | Shigematsu et al. |
| 2002/0097142 A1 | 7/2002 | Janiak et al. |
| 2002/0097144 A1 | 7/2002 | Collins et al. |
| 2002/0099665 A1 | 7/2002 | Burger et al. |
| 2002/0107007 A1 | 8/2002 | Gerson |
| 2002/0107742 A1 | 8/2002 | Magill |
| 2002/0107791 A1 | 8/2002 | Nobrega et al. |
| 2002/0108062 A1 | 8/2002 | Nakajima et al. |
| 2002/0109580 A1 | 8/2002 | Shreve et al. |
| 2002/0111210 A1 | 8/2002 | Luciano, Jr. et al. |
| 2002/0111917 A1 | 8/2002 | Hoffman et al. |
| 2002/0111919 A1 | 8/2002 | Weller et al. |
| 2002/0112177 A1 | 8/2002 | Voltmer et al. |
| 2002/0113082 A1 | 8/2002 | Leatherman et al. |
| 2002/0116274 A1 | 8/2002 | Hind et al. |
| 2002/0120584 A1 | 8/2002 | Hogan et al. |
| 2002/0125164 A1 | 9/2002 | Bassinson |
| 2002/0126010 A1 | 9/2002 | Trimble et al. |
| 2002/0128977 A1 | 9/2002 | Nambiar et al. |
| 2002/0129248 A1 | 9/2002 | Wheeler et al. |
| 2002/0130186 A1 | 9/2002 | Lasch et al. |
| 2002/0130187 A1 | 9/2002 | Berg et al. |
| 2002/0131567 A1 | 9/2002 | Maginas |
| 2002/0133467 A1 | 9/2002 | Hobson et al. |
| 2002/0133725 A1 | 9/2002 | Roy et al. |
| 2002/0138351 A1 | 9/2002 | Houvener et al. |
| 2002/0138438 A1 | 9/2002 | Bardwell |
| 2002/0139839 A1 | 10/2002 | Catan |
| 2002/0140542 A1 | 10/2002 | Prokoski et al. |
| 2002/0145043 A1 | 10/2002 | Challa et al. |
| 2002/0147002 A1 | 10/2002 | Trop et al. |
| 2002/0147600 A1 | 10/2002 | Waters et al. |
| 2002/0147913 A1 | 10/2002 | Lun Yip |
| 2002/0148892 A1 | 10/2002 | Bardwell |
| 2002/0149467 A1 | 10/2002 | Calvesio et al. |
| 2002/0152123 A1 | 10/2002 | Giordano et al. |
| 2002/0153410 A1 | 10/2002 | Santini |
| 2002/0153424 A1 | 10/2002 | Li |
| 2002/0154795 A1 | 10/2002 | Lee et al. |
| 2002/0158747 A1 | 10/2002 | McGregor et al. |
| 2002/0163421 A1 | 11/2002 | Wang et al. |
| 2002/0166891 A1 | 11/2002 | Stoutenburg et al. |
| 2002/0166897 A1 | 11/2002 | Hooglander |
| 2002/0169673 A1 | 11/2002 | Prorock et al. |
| 2002/0174067 A1 | 11/2002 | Hoffman et al. |
| 2002/0175805 A9 | 11/2002 | Armstrong et al. |
| 2002/0176522 A1 | 11/2002 | Fan |
| 2002/0178063 A1 | 11/2002 | Gravelle et al. |
| 2002/0178124 A1 | 11/2002 | Lewis |
| 2002/0178369 A1 | 11/2002 | Black |
| 2002/0185543 A1 | 12/2002 | Pentz et al. |
| 2002/0186133 A1 | 12/2002 | Loof |
| 2002/0186838 A1 | 12/2002 | Brandys |
| 2002/0188501 A1 | 12/2002 | Lefkowith |
| 2002/0188854 A1 | 12/2002 | Heaven et al. |
| 2002/0188855 A1 | 12/2002 | Nakayama et al. |
| 2002/0190124 A1 | 12/2002 | Piotrowski |
| 2002/0190125 A1 | 12/2002 | Stockhammer |
| 2002/0191816 A1 | 12/2002 | Maritzen et al. |
| 2002/0194137 A1 | 12/2002 | Park et al. |
| 2002/0194303 A1 | 12/2002 | Suila et al. |
| 2002/0194503 A1 | 12/2002 | Faith et al. |
| 2002/0196963 A1 | 12/2002 | Bardwell |
| 2003/0001006 A1 | 1/2003 | Lee |
| 2003/0001755 A1 | 1/2003 | Tiernay et al. |
| 2003/0004866 A1 | 1/2003 | Huennekens et al. |
| 2003/0004881 A1 | 1/2003 | Shinzaki et al. |
| 2003/0005310 A1 | 1/2003 | Shinzaki |
| 2003/0006901 A1 | 1/2003 | Kim et al. |
| 2003/0009382 A1 | 1/2003 | DArbeloff et al. |
| 2003/0014307 A1 | 1/2003 | Heng |
| 2003/0014357 A1 | 1/2003 | Chrisekos et al. |
| 2003/0014891 A1 | 1/2003 | Nelms et al. |
| 2003/0018532 A1 | 1/2003 | Dudek et al. |
| 2003/0018567 A1 | 1/2003 | Flitcroft et al. |
| 2003/0025600 A1 | 2/2003 | Blanchard |
| 2003/0037264 A1 | 2/2003 | Ezaki et al. |
| 2003/0046228 A1 | 3/2003 | Berney |
| 2003/0046237 A1 | 3/2003 | Uberti |
| 2003/0046540 A1 | 3/2003 | Nakamura et al. |
| 2003/0047482 A1 | 3/2003 | Jones et al. |
| 2003/0057226 A1 | 3/2003 | Long |
| 2003/0057278 A1 | 3/2003 | Wong |
| 2003/0061172 A1 | 3/2003 | Robinson |

| | | | | | | |
|---|---|---|---|---|---|---|
| 2003/0069828 A1 | 4/2003 | Blazey et al. | | 2004/0041690 A1 | 3/2004 | Yamagishi |
| 2003/0069846 A1 | 4/2003 | Marcon | | 2004/0044627 A1 | 3/2004 | Russell et al. |
| 2003/0074317 A1 | 4/2003 | Hofi | | 2004/0049687 A1 | 3/2004 | Orsini |
| 2003/0086591 A1 | 5/2003 | Simon | | 2004/0050930 A1 | 3/2004 | Rowe |
| 2003/0093187 A1 | 5/2003 | Walker | | 2004/0052406 A1 | 3/2004 | Brooks |
| 2003/0097344 A1 | 5/2003 | Chaum et al. | | 2004/0059923 A1 | 3/2004 | ShamRao |
| 2003/0106935 A1 | 6/2003 | Burchette, Jr. | | 2004/0061593 A1 | 4/2004 | Lane |
| 2003/0112120 A1 | 6/2003 | Seifert | | 2004/0062423 A1 | 4/2004 | Doi |
| 2003/0112972 A1 | 6/2003 | Hattick et al. | | 2004/0073792 A1 | 4/2004 | Noble et al. |
| 2003/0120554 A1 | 6/2003 | Hogan et al. | | 2004/0083184 A1 | 4/2004 | Tsuei et al. |
| 2003/0120626 A1 | 6/2003 | Piotrowski | | 2004/2283380 | 4/2004 | Janke |
| 2003/0121969 A1 | 7/2003 | Wankmueller | | 2004/0084524 A1 | 5/2004 | Ramachandran |
| 2003/0122120 A1 | 7/2003 | Brazis et al. | | 2004/0089724 A1 | 5/2004 | Lasch et al. |
| 2003/0123714 A1 | 7/2003 | O'Gorman et al. | | 2004/0098336 A1 | 5/2004 | Flink |
| 2003/0124294 A1 | 7/2003 | Hodson et al. | | 2004/0104266 A1 | 6/2004 | Bolle et al. |
| 2003/0125054 A1 | 7/2003 | Garcia | | 2004/0104268 A1 | 6/2004 | Bailey |
| 2003/0130820 A1 | 7/2003 | Lane, III | | 2004/0118930 A1 | 6/2004 | Berardi et al. |
| 2003/0132132 A1 | 7/2003 | Small | | 2004/0124104 A1 | 7/2004 | DeVolpi |
| 2003/0132284 A1 | 7/2003 | Reynolds et al. | | 2004/0124246 A1 | 7/2004 | Allen et al. |
| 2003/0132297 A1 | 7/2003 | McCall et al. | | 2004/0129787 A1 | 7/2004 | Saito et al. |
| 2003/0140228 A1 | 7/2003 | Binder | | 2004/0131237 A1 | 7/2004 | Machida |
| 2003/0149661 A1 | 8/2003 | Mitchell et al. | | 2004/0133787 A1 | 7/2004 | Doughty et al. |
| 2003/0149662 A1 | 8/2003 | Shore | | 2004/0136573 A1 | 7/2004 | Sato |
| 2003/0150911 A1 | 8/2003 | Joseph | | 2004/0139021 A1 | 7/2004 | Reed et al. |
| 2003/0152252 A1 | 8/2003 | Kondo et al. | | 2004/0144841 A1 | 7/2004 | Tsukamoto et al. |
| 2003/0153356 A1 | 8/2003 | Liu | | 2004/0144846 A1 | 7/2004 | Lasch et al. |
| 2003/0155416 A1 | 8/2003 | Macklin et al. | | 2004/0149820 A1 | 8/2004 | Zuili |
| 2003/0159044 A1 | 8/2003 | Doyle et al. | | 2004/0155101 A1 | 8/2004 | Royer et al. |
| 2003/0163699 A1 | 8/2003 | Pailles et al. | | 2004/0158723 A1 | 8/2004 | Root |
| 2003/0167207 A1 | 9/2003 | Berardi et al. | | 2004/0161135 A1 | 8/2004 | Sano et al. |
| 2003/0173408 A1 | 9/2003 | Mosher, Jr. et al. | | 2004/0165753 A1 | 8/2004 | Takhiri et al. |
| 2003/0177102 A1 | 9/2003 | Robinson | | 2004/0169071 A1 | 9/2004 | Burgan et al. |
| 2003/0177347 A1 | 9/2003 | Schneier et al. | | 2004/0172541 A1 | 9/2004 | Ando et al. |
| 2003/0178495 A1 | 9/2003 | Jones et al. | | 2004/0188519 A1 | 9/2004 | Cassone |
| 2003/0183689 A1 | 10/2003 | Swift et al. | | 2004/0190757 A1 | 9/2004 | Murphy et al. |
| 2003/0183699 A1 | 10/2003 | Masui | | 2004/0195314 A1 | 10/2004 | Lee |
| 2003/0187786 A1 | 10/2003 | Swift et al. | | 2004/0199469 A1 | 10/2004 | Barillova et al. |
| 2003/0187787 A1 | 10/2003 | Freund | | 2004/0202354 A1 | 10/2004 | Togino |
| 2003/0187790 A1 | 10/2003 | Swift et al. | | 2004/0208343 A1 | 10/2004 | Golden et al. |
| 2003/0187796 A1 | 10/2003 | Swift et al. | | 2004/0215575 A1 | 10/2004 | Garrity |
| 2003/0191949 A1 | 10/2003 | Odagawa | | 2004/0222803 A1 | 11/2004 | Tartagni |
| 2003/0195842 A1 | 10/2003 | Reece | | 2004/0230488 A1 | 11/2004 | Beenau et al. |
| 2003/0195843 A1 | 10/2003 | Matsuda et al. | | 2004/0232220 A1 | 11/2004 | Beenau et al. |
| 2003/0197593 A1 | 10/2003 | Siegel et al. | | 2004/0232224 A1 | 11/2004 | Beenau et al. |
| 2003/0200184 A1 | 10/2003 | Dominguez et al. | | 2004/0233039 A1 | 11/2004 | Beenau et al. |
| 2003/0208439 A1 | 11/2003 | Rast | | 2004/0236680 A1 | 11/2004 | Luoffo et al. |
| 2003/0218066 A1 | 11/2003 | Fernandes et al. | | 2004/0236699 A1 | 11/2004 | Beenau et al. |
| 2003/0220876 A1 | 11/2003 | Burger et al. | | 2004/0236700 A1 | 11/2004 | Beenau et al. |
| 2003/0222153 A1 | 12/2003 | Pentz et al. | | 2004/0236701 A1 | 11/2004 | Beenau et al. |
| 2003/0223625 A1 | 12/2003 | Hillhouse et al. | | 2004/0236819 A1 | 11/2004 | Anati et al. |
| 2003/0225623 A1 | 12/2003 | Wankmueller | | 2004/0239480 A1 | 12/2004 | Beenau et al. |
| 2003/0225713 A1 | 12/2003 | Atkinson et al. | | 2004/0240711 A1 | 12/2004 | Hamza et al. |
| 2003/0226041 A1 | 12/2003 | Palmer et al. | | 2004/0255168 A1 | 12/2004 | Murashita et al. |
| 2003/0227550 A1 | 12/2003 | Manico et al. | | 2004/0257196 A1 | 12/2004 | Kotzin |
| 2003/0229793 A1 | 12/2003 | McCall et al. | | 2004/0258282 A1 | 12/2004 | Bjorn et al. |
| 2003/0233334 A1 | 12/2003 | Smith | | 2005/0001711 A1 | 1/2005 | Doughty et al. |
| 2003/0236704 A1 | 12/2003 | Antonucci | | 2005/0005172 A1 | 1/2005 | Haala |
| 2004/0006497 A1 | 1/2004 | Nestor et al. | | 2005/0011776 A1 | 1/2005 | Nagel |
| 2004/0006539 A1 | 1/2004 | Royer et al. | | 2005/0017068 A1 | 1/2005 | Zalewski et al. |
| 2004/0010462 A1 | 1/2004 | Moon et al. | | 2005/0018658 A1 | 1/2005 | Ikeda et al. |
| 2004/0014457 A1 | 1/2004 | Stevens | | 2005/0020304 A1 | 1/2005 | Shinzaki |
| 2004/0015451 A1 | 1/2004 | Sahota et al. | | 2005/0021457 A1 | 1/2005 | Johnson et al. |
| 2004/0017934 A1 | 1/2004 | Kocher | | 2005/0033687 A1 | 2/2005 | Beenau et al. |
| 2004/0019494 A1 | 1/2004 | Ridgeway et al. | | 2005/0033689 A1 | 2/2005 | Bonalle et al. |
| 2004/0019564 A1 | 1/2004 | Goldthwaite et al. | | 2005/0033992 A1 | 2/2005 | Inabe |
| 2004/0020982 A1 | 2/2004 | Hoffman et al. | | 2005/0036665 A1 | 2/2005 | Higuchi |
| 2004/0021552 A1 | 2/2004 | Koo | | 2005/0040221 A1 | 2/2005 | Schwarz, Jr. |
| 2004/0024694 A1 | 2/2004 | Lawrence et al. | | 2005/0050367 A1 | 3/2005 | Burger et al. |
| 2004/0029569 A1 | 2/2004 | Khan et al. | | 2005/0054438 A1 | 3/2005 | Rothschild et al. |
| 2004/0030601 A1 | 2/2004 | Pond et al. | | 2005/0058262 A1 | 3/2005 | Timmins et al. |
| 2004/0031856 A1 | 2/2004 | Atsmon et al. | | 2005/0060233 A1 | 3/2005 | Bonalle et al. |
| 2004/0039860 A1 | 2/2004 | Mills et al. | | 2005/0065842 A1 | 3/2005 | Summers |
| 2004/0041021 A1 | 3/2004 | Nugent, Jr. | | 2005/0065872 A1 | 3/2005 | Moebs et al. |

| | | |
|---|---|---|
| 2005/0071231 A1 | 3/2005 | Beenau et al. |
| 2005/0087597 A1 | 4/2005 | Gotfried et al. |
| 2005/0091325 A1 | 4/2005 | Kuwana et al. |
| 2005/0097038 A1 | 5/2005 | Yu et al. |
| 2005/0098621 A1 | 5/2005 | deSylva |
| 2005/0100199 A1 | 5/2005 | Boshra |
| 2005/0102524 A1 | 5/2005 | Haala |
| 2005/0103839 A1 | 5/2005 | Hewel |
| 2005/0109836 A1 | 5/2005 | Ben-Aissa |
| 2005/0116024 A1 | 6/2005 | Beenau et al. |
| 2005/0119978 A1 | 6/2005 | Ates |
| 2005/0123137 A1 | 6/2005 | McCallum |
| 2005/0125343 A1 | 6/2005 | Mendelovich |
| 2005/0137977 A1 | 6/2005 | Wankmueller |
| 2005/0139669 A1 | 6/2005 | Arnouse |
| 2005/0144133 A1 | 6/2005 | Hoffman et al. |
| 2005/0149926 A1 | 7/2005 | Saltz |
| 2005/0160271 A9 | 7/2005 | Brundage et al. |
| 2005/0160790 A1 | 7/2005 | Tanaka et al. |
| 2005/0165684 A1 | 7/2005 | Jensen et al. |
| 2005/0166062 A1 | 7/2005 | Sanchez-Cifuentes |
| 2005/0169504 A1 | 8/2005 | Black |
| 2005/0171787 A1 | 8/2005 | Zagami |
| 2005/0180618 A1 | 8/2005 | Black |
| 2005/0187883 A1 | 8/2005 | Bishop et al. |
| 2005/0187916 A1 | 8/2005 | Levin et al. |
| 2005/0197923 A1 | 9/2005 | Kilner et al. |
| 2005/0203857 A1 | 9/2005 | Friedman |
| 2005/0211784 A1 | 9/2005 | Justin |
| 2005/0212657 A1 | 9/2005 | Simon |
| 2005/0216424 A1 | 9/2005 | Gandre et al. |
| 2005/0223230 A1 | 10/2005 | Zick |
| 2005/0232471 A1 | 10/2005 | Baer |
| 2005/0240778 A1 | 10/2005 | Saito |
| 2005/0246292 A1 | 11/2005 | Sarcanin |
| 2005/0251688 A1 | 11/2005 | Nanavati et al. |
| 2005/0261972 A1 | 11/2005 | Black |
| 2005/0275505 A1 | 12/2005 | Himmelstein |
| 2005/0278222 A1 | 12/2005 | Nortrup |
| 2006/0000892 A1 | 1/2006 | Bonalle et al. |
| 2006/0000893 A1 | 1/2006 | Bonalle et al. |
| 2006/0000894 A1 | 1/2006 | Bonalle et al. |
| 2006/0000895 A1 | 1/2006 | Bonalle et al. |
| 2006/0000896 A1 | 1/2006 | Bonalle et al. |
| 2006/0000897 A1 | 1/2006 | Bonalle et al. |
| 2006/0000898 A1 | 1/2006 | Bonalle et al. |
| 2006/0000899 A1 | 1/2006 | Bonalle et al. |
| 2006/0005022 A1 | 1/2006 | Wakamori et al. |
| 2006/0005042 A1 | 1/2006 | Black |
| 2006/0016868 A1 | 1/2006 | Bonalle et al. |
| 2006/0016869 A1 | 1/2006 | Bonalle et al. |
| 2006/0016871 A1 | 1/2006 | Bonalle et al. |
| 2006/0016874 A1 | 1/2006 | Bonalle et al. |
| 2006/0016875 A1 | 1/2006 | Bonalle et al. |
| 2006/0016877 A1 | 1/2006 | Bonalle et al. |
| 2006/0033609 A1 | 2/2006 | Bridgelall |
| 2006/0034492 A1 | 2/2006 | Siegel et al. |
| 2006/0066444 A1 | 3/2006 | Steeves |
| 2006/0069635 A1 | 3/2006 | Ram et al. |
| 2006/0071756 A1 | 4/2006 | Steeves |
| 2006/0080552 A1 | 4/2006 | Lauper |
| 2006/0095369 A1 | 5/2006 | Hofi |
| 2006/0104485 A1 | 5/2006 | Miller et al. |
| 2006/0123240 A1 | 6/2006 | Chaiken |
| 2006/0136336 A1 | 6/2006 | Drummond et al. |
| 2006/0156395 A1 | 7/2006 | Fontaine |
| 2006/0158434 A1 | 7/2006 | Zank et al. |
| 2006/0173291 A1 | 8/2006 | Glossop |
| 2006/0173791 A1 | 8/2006 | Mann et al. |
| 2006/0177061 A1 | 8/2006 | Orsini et al. |
| 2006/0178937 A1* | 8/2006 | Rau et al. .................... 705/18 |
| 2006/0190419 A1 | 8/2006 | Bunn et al. |
| 2006/0202835 A1 | 9/2006 | Thibault |
| 2006/0208066 A1 | 9/2006 | Finn et al. |
| 2006/0213986 A1 | 9/2006 | Register et al. |
| 2006/0229988 A1 | 10/2006 | Oshima et al. |
| 2006/0237528 A1 | 10/2006 | Bishop et al. |
| 2006/0242423 A1 | 10/2006 | Kussmaul |
| 2006/0278723 A1 | 12/2006 | Dan et al. |
| 2007/0008131 A1 | 1/2007 | Doan et al. |
| 2007/0046468 A1 | 3/2007 | Davis |
| 2007/0057797 A1 | 3/2007 | Waldner et al. |
| 2007/0075841 A1 | 4/2007 | Maltsev et al. |
| 2007/0112957 A1 | 5/2007 | Shastri et al. |
| 2007/0119924 A1 | 5/2007 | Register et al. |
| 2007/0241861 A1 | 10/2007 | Venkatanna et al. |
| 2007/0252001 A1 | 11/2007 | Kail et al. |
| 2007/0252010 A1 | 11/2007 | Gonzalez et al. |
| 2007/0284432 A1 | 12/2007 | Abouyounes |
| 2007/0296544 A1 | 12/2007 | Beenau et al. |
| 2007/0296551 A1 | 12/2007 | Beenau et al. |
| 2007/0299782 A1 | 12/2007 | Beenau et al. |
| 2007/0299783 A1 | 12/2007 | Beenau et al. |
| 2008/0006691 A1 | 1/2008 | Bonalle et al. |
| 2008/0008359 A1 | 1/2008 | Beenau et al. |
| 2008/0008363 A1 | 1/2008 | Bonalle et al. |
| 2008/0010214 A1 | 1/2008 | Bonalle et al. |
| 2008/0011830 A1 | 1/2008 | Bonalle et al. |
| 2008/0011831 A1 | 1/2008 | Bonalle et al. |
| 2008/0013796 A1 | 1/2008 | Bonalle et al. |
| 2008/0013807 A1 | 1/2008 | Bonalle et al. |
| 2008/0015941 A1 | 1/2008 | Beenau et al. |
| 2008/0015992 A1 | 1/2008 | Bonalle et al. |
| 2008/0015993 A1 | 1/2008 | Bonalle et al. |
| 2008/0015994 A1 | 1/2008 | Bonalle et al. |
| 2008/0016002 A1 | 1/2008 | Beenau et al. |
| 2008/0033722 A1 | 2/2008 | Beenau et al. |
| 2008/0067242 A1 | 3/2008 | Bonalle et al. |
| 2008/0072065 A1 | 3/2008 | Bonalle et al. |

FOREIGN PATENT DOCUMENTS

| | | |
|---|---|---|
| EP | 0927945 | 7/1999 |
| EP | 1017030 | 7/2000 |
| EP | 1115095 | 7/2001 |
| EP | 1610273 | 12/2005 |
| GB | 2088110 | 6/1982 |
| GB | 2281714 | 3/1995 |
| GB | 2347537 | 9/2000 |
| GB | 2350021 | 11/2000 |
| GB | 2361790 | 10/2001 |
| JP | 61-100436 | 5/1986 |
| JP | 10302610 | 11/1998 |
| JP | 2002-032687 | 1/2002 |
| JP | 2002-133336 | 5/2002 |
| JP | 2002-163585 | 6/2002 |
| JP | 2002-183443 | 6/2002 |
| JP | 2004-164347 | 6/2004 |
| JP | 2004-348478 | 12/2004 |
| WO | WO 91/08910 | 6/1991 |
| WO | WO 95/32919 | 12/1995 |
| WO | WO 96/06409 | 2/1996 |
| WO | WO 97/09688 | 3/1997 |
| WO | WO 98/21683 | 5/1998 |
| WO | WO 98/22291 | 5/1998 |
| WO | WO 98/45778 | 10/1998 |
| WO | WO 99/21321 | 4/1999 |
| WO | WO 99/49424 | 9/1999 |
| WO | WO 00/49586 | 8/2000 |
| WO | WO 00/73989 | 12/2000 |
| WO | WO 01/13320 | 2/2001 |
| WO | WO 01/18745 | 3/2001 |
| WO | WO 01/25872 | 4/2001 |
| WO | WO 01/78024 | 10/2001 |
| WO | WO 01/86599 | 11/2001 |
| WO | WO 02/067190 | 8/2002 |

WO  WO 2004/052657  6/2004

OTHER PUBLICATIONS

Final Office Action issued May 25, 2006 in U.S. Appl. No. 10/708,841.
Notice of Allowance issued Oct. 6, 2006 in U.S. Appl. No. 10/708,841.
Non-Final Office Action issued Mar. 11, 2008 in U.S. Appl. No. 11/164,352.
Final Office Action issued Aug. 18, 2008 in U.S. Appl. No. 11/164,352.
ISR/WO dated Jul. 11, 2008 for PCT/US06/07570.
Non-Final Office Action issued Aug. 11, 2004 in U.S. Appl. No. 10/611,563.
Final Office Action issued Mar. 24, 2005 in U.S. Appl. No. 10/611,563.
Advisory Action issued May 18, 2005 in U.S. Appl. No. 10/611,563.
Non-Final Office Action issued Jul. 27, 2005 in U.S. Appl. No. 10/611,563.
Non-Final Office Action issued Nov. 16, 2005 in U.S. Appl. No. 10/611,563.
Final Office Action issued May 31, 2006 in U.S. Appl. No. 10/611,563.
Advisory Action issued Oct. 6, 2006 in U.S. Appl. No. 10/611,563.
Non-Final Office Action issued Jan. 8, 2007 in U.S. Serial No. 10/611,563.
Non-Final Office Action issued Jun. 18, 2007 in U.S. Serial No. 10/611,563.
Notice of Allowance issued Sep. 24, 2007 in U.S. Serial No. 10/611,563.
ISR dated Mar. 26, 2004 for PCT/US03/34602.
WO dated Oct. 13, 2004 for PCT/US03/34602.
IPER dated Jan. 20, 2005 for PCT/US03/34602.
Office Action dated Feb. 16, 2005 for TW092131042.
Office Action dated May 18, 2006 for AR 041912 A1.
Office Action dated Mar. 8, 2007 for AR 041912 A1.
Non-Final Office Action issued Apr. 1, 2008 in U.S. Appl. No. 10/810,473.
Non-Final Office Action issued Oct. 17, 2007 in U.S. Appl. No. 10/710,611.
Final Office Action issued May 28, 2008 in U.S. Appl. No. 10/710,611.
Advisory Action issued Sep. 5, 2008 in U.S. Appl. No. 10/710,611.
Non-Final Office Action issued Mar. 4, 2008 in U.S. Appl. No. 10/711,720.
Final Office Action issued Jul. 23, 2008 in U.S. Appl. No. 10/711,720.
Non-Final Office Action issued Jul. 7, 2005 in U.S. Appl. No. 10/708,548.
Notice of Allowance issued Jan. 31, 2006 in U.S. Appl. No. 10/708,548.
Non-Final Office Action issued Feb. 25, 2008 in U.S. Appl. No. 10/708,569.
Non-Final Office Action issued Sep. 24, 2007 in U.S. Appl. No. 10/708,547.
Final Office Action issued Feb. 14, 2008 in U.S. Appl. No. 10/708,547.
Advisory Action issued Jul. 29, 2008 in U.S. Appl. No. 10/708,547.
Non-Final Office Action issued Mar. 22, 2006 in U.S. Appl. No. 10/708,597.
Final Office Action issued Oct. 10, 2006 in U.S. Appl. No. 10/708,597.
Restriction Requirement issued Mar. 22, 2007 in U.S. Appl. No. 10/708,597.
Non-Final Office Action issued Aug. 8, 2007 in U.S. Appl. No. 10/708,597.
Final Office Action issued Mar. 17, 2008 in U.S. Appl. No. 10/708,597.
Advisory Action issued Jul. 11, 2008 in U.S. Appl. No. 10/708,597.
Non-Final Office Action issued Nov. 1, 2007 in U.S. Appl. No. 10/746,781.
Final Office Action issued Jul. 10, 2008 in U.S. Appl. No. 10/746,781.
*Ex-Parte Quayle* Action issued Dec. 14, 2005 in U.S. Appl. No. 10/708,549.
Notice of Allowance issued May 8, 2006 in U.S. Appl. No. 10/708,549.
Non-Final Office Action issued May 17, 2007 in U.S. Appl. No. 10/810,469.
Final Office Action issued Jan. 11, 2008 in U.S. Appl. No. 10/810,469.
Advisory Action issued Apr. 30, 2008 in U.S. Appl. No. 10/810,469.
Notice of Allowance issued Aug. 5, 2008 in U.S. Appl. No. 10/810,469.
Final Office Action issued Jul. 28, 2005 in U.S. Appl. No. 10/710,307.
Final Office Action issued Nov. 21, 2005 in U.S. Appl. No. 10/710,307.
Advisory Action issued Feb. 10, 2006 in U.S. Appl. No. 10/710,307.
Advisory Action issued Mar. 8, 2006 in U.S. Appl. No. 10/710,335.
Non-Final Office Action issued May 9, 2006 in U.S. Appl. No. 10/710,335.
Final Office Action issued Oct. 19, 2006 in U.S. Appl. No. 10/710,335.
Advisory Action issued Jan. 12, 2007 in U.S. Appl. No. 10/710,335.
Non-Final Office Action issued Apr. 19, 2007 in U.S. Appl. No. 10/710,335.
Notice of Allowance issued Sep. 19, 2007 in U.S. Appl. No. 10/710,335.
Supplemental Notice of Allowance issued Oct. 25, 2007 in U.S. Appl. No. 10/710,335.
Non-Final Office Action issued May 1, 2008 in U.S. Appl. No. 11/862,268.
Non-Final Office Action issued Aug. 4, 2008 in U.S. Appl. No. 11/306,617.
ISR/WO dated Jul. 9, 2008 for PCT/US06/45362.
Non-Final Office Action issued Jun. 24, 2008 in U.S. Appl. No. 11/161,295.
Non-Final Office Action issued Sep. 8, 2005 in U.S. Appl. No. 10/906,732.
Final Office Action issued Mar. 8, 2006 in U.S. Appl. No. 10/906,732.
Advisory Action issued Jul. 5, 2006 in U.S. Appl. No. 10/906,732.
Notice of Allowance issued Aug. 11, 2006 in U.S. Appl. No. 10/906,732.
Non-Final Office Action issued Oct. 15, 2007 in U.S. Appl. No. 11/161,105.
Final Office Action issued Apr. 21, 2008 in U.S. Appl. No. 11/161,105.
Notice of Allowance issued Jul. 3, 2008 in U.S. Appl. No. 11/161,105.
Non-Final Office Action issued Apr. 11, 2008 in U.S. Appl. No. 11/552,886.
Final Office Action issued Aug. 6, 2008 in U.S. Appl. No. 11/552,886.
Advisory Action issued Sep. 18, 2008 in U.S. Appl. No. 11/552,886.
Non-Final Office Action issued Sep. 19, 2006 in U.S. Appl. No. 10/710,319.
Notice of Abandonment issued Aug. 9, 2007 in U.S. Appl. No. 10/710,319.
Non-Final Office Action issued Mar. 9, 2006 in U.S. Appl. No. 10/710,323.
Notice of Abandonment issued Dec. 12, 2006 in U.S. Appl. No. 10/710,323.
Non-Final Office Action issued Oct. 10, 2006 in U.S. Appl. No. 10/710,324.
Notice of Abandonment issued Oct. 11, 2007 in U.S. Appl. No. 10/710,324.
Non-Final Office Action issued Oct. 10, 2006 in U.S. Appl. No. 10/710,325.
Notice of Abandonment issued Jun. 4, 2007 in U.S. Appl. No. 10/710,325.
Non-Final Office Action issued Mar. 22, 2006 in U.S. Appl. No. 10/710,326.

Final Office Action issued Oct. 10, 2006 in U.S. Appl. No. 10/710,326.
Advisory Action issued Jan. 12, 2007 in U.S. Appl. No. 10/710,326.
Non-Final Office Action issued May 1, 2007 in U.S. Appl. No. 10/710,326.
Notice of Allowance issued Oct. 4, 2007 in U.S. Appl. No. 10/710,326.
Supplemental Notice of Allowance issued Nov. 8, 2007 in U.S. Appl. No. 10/710,326.
Non-Final Office Action issued May 1, 2008 in U.S. Appl. No. 11/861,347.
Non-Final Office Action issued May 2, 2008 in U.S. Appl. No. 11/861,351.
Non-Final Office Action issued May 1, 2008 in U.S. Appl. No. 11/861,354.
Non-Final Office Action issued May 25, 2007 in U.S. Appl. No. 10/710,327.
Notice of Allowance issued Nov. 13, 2007 in U.S. Appl. No. 10/710,327.
Non-Final Office Action issued May 1, 2008 in U.S. Appl. No. 11/861,463.
Non-Final Office Action issued May 8, 2008 in U.S. Appl. No. 11/861,481.
Non-Final Office Action issued Sep. 21, 2006 in U.S. Appl. No. 10/710,328.
Notice of Abandonment issued Jun. 28, 2007 in U.S. Appl. No. 10/710,328.
Non-Final Office Action issued Sep. 19, 2006 in U.S. Appl. No. 10/710,329.
Notice of Abandonment issued Aug. 23, 2007 in U.S. Appl. No. 10/710,329.
Non-Final Office Action issued Mar. 9, 2006 in U.S. Appl. No. 10/710,330.
Notice of Abandonment issued Nov. 17, 2006 in U.S. Appl. No. 10/710,330.
Non-Final Office Action issued Jul. 29, 2005 in U.S. Appl. No. 10/710,331.
Final Office Action issued Nov. 29, 2005 in U.S. Appl. No. 10/710,331.
Advisory Action issued Feb. 9, 2006 in U.S. Appl. No. 10/710,331.
Non-Final Office Action issued May 3, 2006 in U.S. Appl. No. 10/710,331.
Notice of Abandonment issued Jan. 10, 2007 in U.S. Appl. No. 10/710,331.
Non-Final Office Action issued Jul. 19, 2005 in U.S. Appl. No. 10/710,332.
Final Office Action issued Nov. 21, 2005 in U.S. Appl. No. 10/710,332.
Advisory Action issued Feb. 10, 2006 in U.S. Appl. No. 10/710,332.
Non-Final Office Action issued May 3, 2006 in U.S. Appl. No. 10/710,332.
Final Office Action issued Oct. 10, 2006 in U.S. Appl. No. 10/710,332.
Advisory Action issued Jan. 5, 2007 in U.S. Appl. No. 10/710,332.
Non-Final Office Action issued Apr. 20, 2007 in U.S. Appl. No. 10/710,332.
Notice of Allowance issued Oct. 4, 2007 in U.S. Appl. No. 10/710,332.
Supplemental Notice of Allowance issued Nov. 8, 2007 in U.S. Appl. No. 10/710,332.
Non-Final Office Action issued May 2, 2008 in U.S. Appl. No. 11/861,600.
Non-Final Office Action issued May 1, 2008 in U.S. Appl. No. 11/861,626.
Non-Final Office Action issued Jan. 27, 2005 in U.S. Appl. No. 10/710,334.
Final Office Action issued Sep. 30, 2005 in U.S. Appl. No. 10/710,334.
Advisory Action issued Dec. 19, 2005 in U.S. Appl. No. 10/710,334.
Non-Final Office Action issued Apr. 10, 2006 in U.S. Appl. No. 10/710,334.
Notice of Abandonment issued Nov. 6, 2006 in U.S. Appl. No. 10/710,334.
Non-Final Office Action issued Aug. 8, 2005 in U.S. Appl. No. 10/710,335.
Final Office Action issued Dec. 15, 2005 in U.S. Appl. No. 10/710,335.
Office Action dated Oct. 4, 2007 for JP2007-026166.
Non-Final Office Action issued Mar. 26, 2008 in U.S. Appl. No. 10/905,005.
Non-Final Office Action issued Nov. 1, 2006 in U.S. Appl. No. 10/905,006.
Notice of Allowance issued Jul. 12, 2007 in U.S. Appl. No. 10/905,006.
Non-Final Office Action issued Jun. 20, 2006 in U.S. Appl. No. 10/318,480.
Notice of Allowance issued Jan. 24, 2007 in U.S. Appl. No. 10/318,480.
Supplemental Notice of Allowance issued Mar. 13, 2007 in U.S. Appl. No. 10/318,480.
ISR dated Apr. 22, 2004 for PCT/US03/21447.
Non-Final Office Action issued Nov. 22, 2005 in U.S. Appl. No. 10/876,822.
Final Office Action issued Aug. 3, 2006 in U.S. Appl. No. 10/876,822.
Non-Final Office Action issued Feb. 6, 2007 in U.S. Appl. No. 10/876,822.
Final Office Action issued Jul. 18, 2007 in U.S. Appl. No. 10/876,822.
Non-Final Office Action issued Jan. 28, 2008 in U.S. Appl. No. 10/876,822.
Final Office Action issued Aug. 22, 2008 in U.S. Appl. No. 10/876,822.
Non-Final Office Action issued Mar. 23, 2006 in U.S. Appl. No. 10/318,432.
Restriction Requirement issued Jan. 17, 2007 in U.S. Appl. No. 10/318,432.
Non-Final Office Action issued May 1, 2007 in U.S. Appl. No. 10/318,432.
Non-Final Office Action issued Dec. 13, 2007 in U.S. Appl. No. 10/318,432.
Non-Final Office Action issued Jun. 27, 2008 in U.S. Appl. No. 10/318/432.
ISR dated Apr. 22, 2004 for PCT/US03/21280.
Non-Final Office Action issued Mar. 10, 2008 in U.S. Appl. No. 11/160,627.
Final Office Action issued Jun. 24, 2008 in U.S. Appl. No. 11/160,627.
Advisory Action issued Aug. 6, 2008 in U.S. Appl. No. 11/160,627.
Restriction Requirement issued Apr. 30, 2008 in U.S. Appl. No. 11/160,548.
Non-Final Office Action issued Aug. 21, 2008 in U.S. Appl. No. 11/160,548.
Non-Final Office Action issued Jul. 8, 2005 in U.S. Appl. No. 10/708,839.
Final Office Action issued Nov. 21, 2005 in U.S. Appl. No. 10/708,839.
Advisory Action issued Feb. 9, 2006 in U.S. Appl. No. 10/708,839.
Non-Final Office Action issued May 2, 2006 in U.S. Appl. No. 10/708,839.
Final Office Action issued Jan. 25, 2007 in U.S. Appl. No. 10/708,839.
Notice of Abandonment issued Oct. 11, 2007 in U.S. Appl. No. 10/708,839.
Non-Final Office Action issued Sep. 7, 2006 in U.S. Appl. No. 10/708,585.
Notice of Allowance issued May 11, 2007 in U.S. Appl. No. 10/708,585.
Non-Final Office Action issued Nov. 28, 2005 in U.S. Appl. No. 10/708,823.
Final Office Action issued May 17, 2006 in U.S. Appl. No. 10/708,823.
Notice of Abandonment issued Jan. 5, 2007 in U.S. Appl. No. 10/708,823.
Non-Final Office Action issued May 13, 2008 in U.S. Appl. No. 10/708,545.

ISR/WO dated Aug. 19, 2008 for PCT/US05/07905.
Non-Final Office Action issued Sep. 7, 2006 in U.S. Appl. No. 10/708,550.
Notice of Allowance issued May 11, 2007 in U.S. Appl. No. 10/708,550.
ISR/WO dated Feb. 16, 2007 for PCT/US05/36848.
IPRP (Ch 1) dated Apr. 26, 2007 for PCT/US05/36848.
Non-Final Office Action issued Apr. 4, 2007 in U.S. Appl. No. 10/711,965.
Non-Final Office Action issued Oct. 16, 2007 in U.S. Appl. No. 10/711,965.
Final Office Action issued Mar. 28, 2008 in U.S. Appl. No. 10/711,965.
Advisory Action issued Jul. 31, 2008 in U.S. Appl. No. 10/711,965.
Final Office Action issued Aug. 18, 2008 in U.S. Appl. No. 10/711,965.
Non-Final Office Action issued May 4, 2006 in U.S. Appl. No. 10/711,970.
Notice of Allowance issued Feb. 2, 2007 in U.S. Appl. No. 10/711,970.
ISR/WO dated Aug. 17, 2006 for PCT/US05/36828.
Functional Specification, Standard Card IC MF1 IC S50, Philips Semiconductors, Product Specification Rev. 5.1 May 2001.
"Biometrics: Speaker Verification", by Kulkarni, et al., http://biometrics.cse.msu.edu/speaker.html, Mar. 8, 2004, 5 pages.
"Judge Dismisses FTC Suit Against Rambus", Evers, IDG New Service, http://www.infoworld.com/article/04/02/18/HNjudgedismisses_1.html, Feb. 18, 2004, 3 pages.
"Credit on Your Key Ring, Buy Gas at Mobil, Exxon and Soon Burgers at McDonald's", by Krakow, MSNBC, http://www.msnbc.msn.com/id/3072638, Feb. 17, 2004, 4 pages.
"The Evolution of Mobile Payment", by McPherson, Financial Insights, Feb. 2, 2004, http://www.banktech.com./story/mews/showArticle/jhtml?article ID=17601432, 2 pages.
"Pay By Touch Press Releases", http://www.paybytouch.com/press.html, Feb. 10, 2004, 3 pages.
"Putting Their Finger on It", by Wilson, http://sanfrancisco.bizjournals.com/sanfrancisco/stories/2003/10/20/story6.html?t=printable, Feb. 9, 2004, 2 pages.
"Paying It By Ear", The Guardian, Jan. 18, 2003, http://money.guardian.co.uk/creditanddebt/creditcards/story/0,1456,876908,00,html, 3 pages.
Pay By Touch—Company, http://www.paybytouch.com/company.html.
"Identix Inc.—Empowering Identification™—Understanding Biometrics", http://www.identix.com/newsroom/news_biometrics_face.html, 1 page.
"International Biometric Group—Signature Biometrics: How It Works", http://www.ibgweb.com./reports/public/reports/signature-scan_tech.html, Feb. 18, 2004, 1 page.
"International Biometric Group—Voice Recognition Technology: How It Works", http://www.ibgweb.com/reports/public/reports/voice-scan_tech.html, Feb. 18, 2004, 1 page.
"The Henry Classification System", International Biometric Group, 7 pages.
"Individual Biometrics—Hand Geometry", http://ctl.ncsc.dni.us/biomet%20web/BMHand.html, Feb. 18, 2004, 2 pages.
"Individual Biometrics—Retinal Scan", http:ctl.ncsc.dni.us/biomet%20web/BMRetinal.html, Feb. 18, 2004, 2 pages.
"Individual Biometrics—Iris Scan", http:ctl.ncsc.dni.us/biomet%20web/BMIris.html, Feb. 18, 2004, 2 pages.
"Individual Biometrics—Vascular Patterns", http:ctl.ncsc.dni.us/biomet%20web/BMVascular.html, Feb. 18, 2004, 1 page.
"Individual Biometrics—Fingerprint", http:ctl.ncsc.dni.us/biomet%20web/BMFingerprint.html, Feb. 18, 2004, 3 pages.
"Fingerprint Technology—Indentix Inc.—Empowering Identification™—Understanding Biometrics", http://www.identix.com/newsroom/news_biometrics_finger.html, Feb. 18, 2004, 1 page.
"Individual Biometrics—Facial Recognition", http:ctl.ncsc.dni.us/biomet%20web/BMfacial.html, Feb. 18, 2004, 2 pages.
"Fingerprint Analysis—The Basics", http://www.crimtrac.gov.au/fingerprintanalysis.htm, Feb. 18, 2004, 3 pages.
"Visual Speech and Speaker Recognition", by Luettin, Jun. 30, 2000, http://herens.idiap.ch/~luettin/luettin-thesis.bib.abs.html, 1 page.
"Automatic Ear Recognition by Force Field Transformations", by Hurley, et al., The Institution of Electrical Engineers, 2000, pp. 7/1-7/5.
"Everything You Need to Know About Biometrics", by Bowman, Identix Croproation, Jan. 2000, 8 pages.
"How Fingerprint Scanners Work", by Harris, http:computer.howstuffworks.com/fingerprint-scanner.htm/printable, Feb. 18, 2004, 6 pages.
"How Facial Recognition Systems Work", by Bonsor, http://computer.howstuffworks.com/facial-recognition.htm/printable, Feb. 18, 2004, 6 pages.
"Biometrics: Hand Geometry", by Ross, et al., http://biometrics.cse.msu.edu/hand_geometry.html, Feb. 26, 2004, 2 pages.
"Biometric Person Authentication: Odor", by Korotkaya, Department of Information Technology, Laboratory of Applied Mathematics, Lappeenranta University of Technology, 18 pages.
"ISO Magnetic Stripe Card Standards", http://www.cyberd.co.uk/support./technotes/ioscards.htm, Feb. 9, 2004, 4 pages.
"Smart Card Developer's Kit: Some Basic Standards for Smart Cards", http:unix.be.eu.org/docs/smart-card-developer-kit/ch03/033-035.html, Feb. 9, 2004, 2 pages.
"Smart Card Technology and Applications"; http://disc.cba.uh.edu/~rhirsch/fall96/lara.htm (8 pages).
Goldman, J., "Internet Security, The Next Generation, When Software Encryption is not Enough," Web Techniques, Nov. 1997, pp. 43-46.
Simmons, J., "Smart Cards Hold the Key to Secure Internet Commerce," EC World, Dec. 1998, pp. 36-38.
Wayner, P., "Digital Cash," AP Professional, 1996, pp. 76-83, 85-100.
"ISO Standards," available from http://www.iso.ch/projects/loading.html.
Turban, et al., "Using Smartcards in Electronic Commerce," Proc. 31st Annual Hawaii Inter. Conf. on System Sciences, vol. 4, 1998, pp. 62-69.
Dhem, et al., "SCALPS: Smart Card for Limited Payment Systems," IEEE Micro, Jun. 1996, pp. 42-51.
Smith, M T., "Smart Cards: Integrating for Portable Complexity," Computer-Integrated Engineering, Aug. 1998, pp. 110-115.
Geer, et al., "Token-Mediated Certification and Electronic Commerce," Proc. 2nd USENIX Workshop on Electronic Commerce, Nov. 18-21, 1996, pp. 13-22.
Gobioff, et al., "Smart Cards in Hostile Environments," Proc. 2nd USENIX Workshop in Electronic Commerce, Nov. 18-21, 1996, pp. 23-28.
Fancher, C.H., "In Your Pocket Smartcards," IEEE Spectrum, Feb. 1997, pp. 47-53.
Blythe, I., "Smarter, More Secure Smartcards," BYTE, Jun. 1997, pp. 63-64.
Leach, Dr. J., "Dynamic Authentication for Smartcards," Computers and Security, vol. 14, No. 5, 1995, pp. 385-389.
Wu, et al., "Authenticating Passwords Over an Insecure Channel," Computers and Security, vol. 15, No. 5, 1996, pp. 431-439.
Manninger, et al., "Adapting an Electronic Purse for Internet Payments," ACISP '98 Proceedings, Jul. 13-15, 1998, pp. 205-214.
Yan, et al., "Banking on the Internet and Its Applications," Proc. 13th Annual Hawaii International Conference on System Sciences, vol. 4, 1997, pp. 275-284.
Transport Layer Security Working Group, "The SSL Protocol, Version 3.0," Nov. 18, 1996 (also available at http://home.netscape.com/eng/ss13/draft302.txt).
Business Wire (press release), "Master Card E-Wallet," Jul. 11, 2000.
Obongo.com Website, "Obongo," Aug. 8, 2000 (Description of wallet toolbar also available at http://www.obongo.com/chabi/website/index.htm).
PR Newswire (press release), "Providian Launches Nation's First Clear Chip Card," Sep. 12, 2000. The press release may be related to the art of the invention, but based upon the information in the press release, it is unclear if the press release is prior art. However, in an abundance of caution the Applicant desires to put the press release into the file wrapper.

"RFID Take Priority With Wal-Mart", by DocMemory, http://www.simmtester.com/page/news/shownews.asp?num=6550, Feb. 9, 2004, 2 pages.

"Microsoft, IBM and Phillips Test RFID Technology", by Rohde, IDG New Service, http:www.computerweekly.com/Article127889.htm, Feb. 9, 2004, 3 pages.

"PowerPay RFID Payment and Marketing Solution Speeds Purchases at Seahawks Stadium with Technology from Texas Instruments", http://www.powerpayit.com/news/Seahawks_pr.html, Feb. 9, 2004, 2 pages.

Derfler, "How Networks Work," Bestseller Edition 1996, Ziff-Davis Press, Emeryville, CA, all pages.

White, "How Computers Work," Millennium Edition, 1999, Que Corporation, Indianapolis, IN, all pages.

Gralia, "How the Internet Works," Millennium Edition, 1999, Que Corporation, Indianapolis, IN, all pages.

Muller, "Desktop Encyclopedia of the Internet," 1999, Artech House Inc., Norwood, MA, all pages.

"The Bank Credit Card Business," American Bankers Association, 1996, all pages.

Menezes, et al., "Handbook of Applied Cryptography," 1997, CRC Press, Chapter 10.

U.S. Appl. No. 60/395,606, filed Jul. 15, 2002.

"Credit Card Offer Travelers New Benefit," PR Newswire, Aug. 5, 1987.

"Inside's Next Gen Smart Card: The French company plans to introduce an RFID card that uses a 16-bit microprocessor and new encryption technology," RFID Journal, Oct. 29, 2002.

Non-Final Office Action issued May 17, 2005 in U.S. Appl. No. 10/711,773.
Final Office Action issued Nov. 1, 2005 in U.S. Appl. No. 10/711,773.
Advisory Action issued Feb. 15, 2006 in U.S. Appl. No. 10/711,773.
Notice of Allowance issued May 17, 2006 in U.S. Appl. No. 10/711,773.
ISR/WO dated Jun. 20, 2005 for PCT/US05/07195.
IPRP (Ch 1) dated Apr. 19, 2007 for PCT/US05/07195.
Non-Final Office Action issued Feb. 28, 2006 in U.S. Appl. No. 10/709,815.
Notice of Allowance issued Sep. 26, 2006 in U.S. Appl. No. 10/709,815.
Non-Final Office Action issued Jul. 10, 2008 in U.S. Appl. No. 11/163,595.
Non-Final Office Action issued Jul. 12, 2005 in U.S. Appl. No. 10/708,822.
Final Office Action issued Nov. 2, 2005 in U.S. Appl. No. 10/708,822.
Advisory Action issued Dec. 20, 2005 in U.S. Appl. No. 10/708,822.
Non-Final Office Action issued Apr. 7, 2006 in U.S. Appl. No. 10/708,822.
Final Office Action issued Oct. 19, 2006 in U.S. Appl. No. 10/708,822.
Advisory Action issued Jan. 10, 2007 in U.S. Appl. No. 10/708,822.
Non-Final Office Action issued Apr. 23, 2007 in U.S. Appl. No. 10/708,822.
Notice of Allowance issued Sep. 19, 2007 in U.S. Appl. No. 10/708,822.
ISR/WO dated Nov. 16, 2005 for PCT/US05/09452.
IPRP dated Aug. 16, 2006 for PCT/US05/09452.
IPRP dated Jan. 5, 2007 for PCT/US05/09452.
Non-Final Office Action issued Jan. 22, 2008 in U.S. Appl. No. 11/858,958.
Non-Final Office Action issued Jun. 6, 2005 in U.S. Appl. No. 10/708,830.
Non-Final Office Action issued Oct. 4, 2005 in U.S. Appl. No. 10/708,830.
Notice of Allowance issued Mar. 2, 2006 in U.S. Appl. No. 10/708,830.
Supplemental Notice of Allowance issued Aug. 4, 2006 in U.S. Appl. No. 10/708,830.
Non-Final Office Action issued May 15, 2007 in U.S. Appl. No. 10/708,831.
Notice of Allowance issued Oct. 31, 2007 in U.S. Appl. No. 10/708,831.
Notice of Abandonment issued Mar. 6, 2008 in U.S. Appl. No. 10/708,831.
Non-Final Office Action issued Jun. 6, 2005 in U.S. Appl. No. 10/708,833.
Notice of Allowance issued Dec. 9, 2005 in U.S. Appl. No. 10/708,833.
Supplemental Notice of Allowance issued Feb. 23, 2006 in U.S. Appl. No. 10/708,833.
Non-Final Office Action issued Mar. 22, 2006 in U.S. Appl. No. 10/708,837.
Final Office Action issued Oct. 10, 2006 in U.S. Appl. No. 10/708,837.
Advisory Action issued Jan. 12, 2007 in U.S. Appl. No. 10/708,837.
Non-Final Office Action issued Apr. 23, 2007 in U.S. Appl. No. 10/708,837.
Notice of Allowance issued Oct. 12, 2007 in U.S. Appl. No. 10/708,837.
Supplemental Notice of Allowance issued Dec. 20, 2007 in U.S. Appl. No. 10/708,837.
Non-Final Office Action issued Dec. 11, 2007 in U.S. Appl. No. 11/851,533.
Final Office Action issued Jul. 25, 2008 in U.S. Appl. No. 11/851,533.
Advisory Action issued Aug. 29, 2008 in U.S. Appl. No. 11/851,533.
Non-Final Office Action issued Jan. 4, 2008 in U.S. Appl. No. 11/851,556.
Final Office Action issued Jul. 31, 2008 in U.S. Appl. No. 11/851,556.
Non-Final Office Action issued Jan. 10, 2008 in U.S. Appl. No. 10/708,840.
Final Office Action issued Jul. 17, 2008 in U.S. Appl. No. 10/708,840.
Advisory Action issued Sep. 5, 2008 in U.S. Appl. No. 10/708,840.
Non-Final Office Action issued Feb. 8, 2008 in U.S. Appl. No. 11/851,580.
Non-Final Office Action issued Feb. 11, 2008 in U.S. Appl. No. 11/851,623.
Restriction Requirement issued Aug. 20, 2008 in U.S. Appl. No. 11/851,623.
Non-Final Office Action issued Feb. 15, 2008 in U.S. Appl. No. 11/858,393.
Non-Final Office Action issued Jan. 30, 2006 in U.S. Appl. No. 10/708,841.
IPRP (Ch 1) dated Apr. 26, 2007 for PCT/US05/36828.
Non-Final Office Action issued Feb. 25, 2008 in U.S. Appl. No. 10/711,964.
Final Office Action issued Jun. 30, 2008 in U.S. Appl. No. 10/711,964.
Advisory Action issued Sep. 10, 2008 in U.S. Appl. No. 10/711,964.
Non-Final Office Action issued Oct. 3, 2006 in U.S. Appl. No. 10/711,966.
Final Office Action issued May 21, 2007 in U.S. Appl. No. 10/711,966.
Non-Final Office Action issued Dec. 11, 2007 in U.S. Appl. No. 10/711,966.
Non-Final Office Action issued Nov. 28, 2005 in U.S. Appl. No. 10/708,824.
Final Office Action issued May 17, 2006 in U.S. Appl. No. 10/708,824.
Notice of Abandonment issued Jan. 5, 2007 in U.S. Appl. No. 10/708,824.
Non-Final Office Action issued Dec. 13, 2005 in U.S. Appl. No. 10/708,825.
Final Office Action issued May 11, 2006 in U.S. Appl. No. 10/708,825.
Notice of Abandonment issued Jan. 25, 2007 in U.S. Appl. No. 10/708,825.
Non-Final Office Action issued Nov. 29, 2005 in U.S. Appl. No. 10/708,826.
Final Office Action issued May 17, 2006 in U.S. Appl. No. 10/708,826.
Notice of Abandonment issued Jan. 5, 2007 in U.S. Appl. No. 10/708,826.

Non-Final Office Action issued Jan. 10, 2006 in U.S. Appl. No. 10/708,827.
Final Office Action issued May 9, 2006 in U.S. Appl. No. 10/708,827.
Notice of Abandonment issued Jan. 5, 2007 in U.S. Appl. No. 10/708,827.
Non-Final Office Action issued Jan. 27, 2006 in U.S. Appl. No. 10/708,828.
Final Office Action issued Jul. 21, 2006 in U.S. Appl. No. 10/708,828.
Notice of Abandonment issued Mar. 22, 2007 in U.S. Appl. No. 10/708,828.
Non-Final Office Action issued Dec. 15, 2005 in U.S. Appl. No. 10/708,829.
Final Office Action issued May 25, 2006 in U.S. Appl. No. 10/708,829.
Notice of Abandonment issued Jan. 5, 2007 in U.S. Appl. No. 10/708,829.
Non-Final Office Action issued Nov. 27, 2006 in U.S. Appl. No. 10/708,832.
Notice of Abandonment issued Aug. 16, 2007 in U.S. Appl. No. 10/708,832.
Non-Final Office Action issued Jan. 20, 2006 in U.S. Appl. No. 10/708,834.
Final Office Action issued May 25, 2006 in U.S. Appl. No. 10/708,834.
Notice of Abandonment issued Jan. 5, 2007 in U.S. Appl. No. 10/708,834.
Non-Final Office Action issued Dec. 16, 2005 in U.S. Appl. No. 10/708,835.
Final Office Action issued May 17, 2006 in U.S. Appl. No. 10/708,835.
Notice of Abandonment issued Jan. 5, 2007 in U.S. Appl. No. 10/708,835.
Non-Final Office Action issued Dec. 16, 2005 in U.S. Appl. No. 10/708,836.
Final Office Action issued May 25, 2006 in U.S. Appl. No. 10/708,836.
Notice of Abandonment issued Jan. 5, 2007 in U.S. Appl. No. 10/708,836.
Non-Final Office Action issued Aug. 8, 2005 in U.S. Appl. No. 10/708,838.
Final Office Action issued Nov. 29, 2005 in U.S. Appl. No. 10/708,838.
Advisory Action issued Feb. 9, 2006 in U.S. Appl. No. 10/708,838.
Non-Final Office Action issued Apr. 18, 2006 in U.S. Appl. No. 10/708,838.
Notice of Abandonment issued Nov. 1, 2006 in U.S. Appl. No. 10/708,838.
ISR/WO issued Jan. 29, 2008 in PCT/US06/22542.
Non-Final Office Action issued Dec. 9, 2003 in U.S. Appl. No. 10/242,584.
Notice of Allowance issued Jul. 9, 2004 in U.S. Appl. No. 10/242,584.
Office Action dated May 23, 2008 for JP2004-543166.
ISR dated Mar. 7, 2003 for PCT/US02/32653.
WO dated Aug. 27, 2004 for PCT/US02/32653.
IPER dated Jan. 10, 2005 for PCT/US02/32653.
*Ex-Parte Quayle* Action issued Jun. 6, 2005 in U.S. Appl. No. 10/710,484.
Notice of Allowance issued Aug. 2, 2005 in U.S. Appl. No. 10/710,484.
"New Evidence about Positive Three-Tier Co-Pay Performance Presented at Express Scripts 2000 Outcomes Conference," PR Newswire Association, Inc., Jun. 28, 2000.
"Prestige Credit Cards: Those Pricey Plastics," Changing Times, Apr. 1986.
"Shell Introduces Optional Credit Card," The Associated Press, Sep. 3, 1985.
"Shell Introducing Expanded 'Signature' Credit Card," Tulsa Business Chronicle, Sep. 5, 1985.
"Shell-Oil: Introduces Shell Signature Travel and Entertainment Credit Card," Business Wire, Sep. 3, 1985.
"The Chase Manhattan Bank Today Announced a Comprehensive Program to Enhance the Value of All of its Credit Cards," PR Newswire, Dec. 18, 1986.
Carey, Gordon, "Multi-tier Copay," Pharmaceutical Executive, Feb. 2000.
Crumbaugh, Darlene M., "Effective Marketing Positions: Check card as consumer lifeline," Hoosier Banker, Apr. 1998, p. 10, vol. 82, issue 4.
Gabber, et al., "Agora: A Minimal Distributed Protocol for Electronic Commerce," USENIX Oakland, CA, Nov. 18, 1996.
Goldwasser, Joan, "Best of the Cash-Back Cards," Kiplinger's Personal Finance Magazine, Apr. 1999.
Kuntz, Mary, "Credit Cards as Good as Gold," Forbes, Nov. 4, 1985.
Lahey, Liam, "Microsoft Bolsters Rebate Structure," Computer Dealer News, Feb. 8, 2002.
Lamond, "Credit Card Transactions Real World and Online," Copyright 1996.
Nyman, Judy, "Free Income Tax Clinics are Opening as Apr. 30 Deadline Draws Nearer," The Toronto Star, Final Edition, Mar. 25, 1986.
Obel, Michael, "Oil Companies Push Marketing, Cost Cutting to Fortify Earnings," Oil & Gas Journal, Sep. 16, 1985.
Schmuckler, Eric, "Playing Your Cards Right," Forbes, Dec. 28, 1987.
"Core One Credit Union—Discover The Advantage," http://coreone.org/2visa.html, Copyright 2001 (last visited Oct. 9, 2002).
Non-Final Office Action issued Apr. 20, 2005 in U.S. Appl. No. 10/192,488.
Final Office Action issued Sep. 8, 2005 in U.S. Appl. No. 10/192,488.
Advisory Action issued Nov. 10, 2005 in U.S. Appl. No. 10/192,488.
Non-Final Office Action issued Jan. 18, 2006 in U.S. Appl. No. 10/192,488.
Final Office Action issued Sep. 25, 2006 in U.S. Appl. No. 10/192,488.
Notice of Allowance issued Feb. 2, 2007 in U.S. Appl. No. 10/192,488.
Examiner's Report dated Oct. 5, 2006 for AU2002318293.
Office Action dated Jun. 28, 2007 in CA 2,452,351.
Office Action dated Apr. 25, 2008 in CA 2,452,351.
Supplemental Search Report dated Nov. 16, 2004 for EP02748120.9.
Examination Report dated Mar. 8, 2005 for EP02748120.9.
Examination Report dated Feb. 8, 2006 for EP02748120.9.
Examination Report dated Oct. 24, 2007 for EP02748120.9.
Office Action dated Mar. 9, 2006 in JP2003-513257.
Office Action dated Oct. 20, 2006 in JP2003-513257.
Office Action dated Aug. 1, 2007 in JP2003-513257.
Office Action dated Jan. 29, 2008 in JP2003-513257.
Office Action dated Jul. 11, 2007 for MX PA/a/2004/000253.
Office Action dated Jan. 27, 2005 in NZ530497.
ISR dated Dec. 30, 2002 for PCT/US02/0219903.
Office Action dated Dec. 30, 2005 for CN02813783.3.
Office Action dated May 16, 2007 for CN02813783.3.
Non-Final Office Action mailed Feb. 8, 2008 in U.S. Appl. No. 10/340,352.
Final Office Action mailed Jun. 13, 2008 in U.S. Appl. No. 10/340,352.
Advisory Action mailed Aug. 19, 2008 in U.S. Appl. No. 10/340,352.
Office Action dated Jan. 29, 2007 for CA2458143.
Office Action dated Dec. 19, 2007 for CA2458143.
Supplemental Search Report dated May 26, 2006 for EP03763325.2.
Examination Report dated Oct. 26, 2006 for EP03763325.2.
Office Action dated Aug. 3, 2006 in JP2004-562629.
Office Action dated Mar. 8, 2007 in JP2004-562629.
Final Office Action dated Oct. 4, 2007 in JP2004-562629.
ISR dated Apr. 22, 2004 for PCT/US03/21279.

* cited by examiner

RECURRENT BILLING MAINTENANCE WITH RADIO FREQUENCY PAYMENT DEVICES

CROSS-REFERENCE TO RELATED APPLICATIONS

The present application is a continuation-in-part of U.S. patent application Ser. No. 09/865,878, entitled "RECURRENT BILLING MAINTENANCE SYSTEM," filed on May 25, 2001, (issued as U.S. Pat. No. 7,035,872 on Apr. 25, 2006). The present application is also a continuation-in-part of U.S. patent application Ser. No. 10/340,352, entitled "AUTHORIZING PAYMENTS SUBSEQUENT TO RF TRANSACTIONS," filed Jan. 10, 2003, which is a non-provisional of U.S. Provisional No. 60/396,577 filed Jul. 16, 2002. The '352 application is also a continuation-in-part of U.S. patent application Ser. No. 10/192,488, entitled "SYSTEM AND METHOD FOR RFID PAYMENT USING RADIO FREQUENCY IDENTIFICATION IN CONTACT AND CONTACTLESS TRANSACTIONS," filed Jul. 9, 2002 (issued as U.S. Pat. No. 7,239,226 on Jul. 3, 2007), which is a non-provisional of U.S. Provisional No. 60/304,216, filed Jul. 10, 2001. All of the above-referenced applications are incorporated herein by reference.

FIELD OF INVENTION

This invention generally relates to a recurrent billing maintenance system, and more particularly, to a system for automatically providing updates to a customer billing account information via a computer network.

BACKGROUND OF INVENTION

An increasing number of service organizations, stores, merchants, utilities, banks, Internet merchants and others (collectively "merchants") are enrolling repeat customers in a recurrent billing program, where a customer's transaction card (e.g., credit card) is automatically billed on a periodic basis. If a customer agrees to the recurrent billing feature, the customer provides the merchant with a credit card account number to which the billing amount is applied. The merchant may then establish a customer database of account numbers or customer numbers with additional information for charging the customer account.

Over time, authorization for some of the established recurrent billing accounts may be declined because the information in the merchant database is outdated. For example, a credit card provider may change a credit card account number or expiration date or simply cancel the customer's credit card privileges. Upon receiving the "authorization declined" response from the transaction card company (e.g., the provider), the merchant typically contacts the customer to determine the cause of the decline. Alternatively, a merchant may continuously try to re-authorize the charge, hoping that the discrepancy which led to the "authorization declined" is removed and that the charge will eventually be accepted by the provider.

However, where the merchant attempts to contact the customer, several problems may arise. For example, the customer may not be available or may not be aware that his credit card privilege status has changed. Further, the customer may be unwilling to provide the merchant with a supplemental or secondary transaction card suitable for recurrent billing. Moreover, for the merchant, updating of the information by attempting to contact the customer may be inefficient and costly. The merchant may be faced with allotting additional workforce for carrying out a customer contact program which returns little in the way of answers and revenues. Further, where the customer's charge privileges have been revoked by a provider, it is often a difficult task for the merchant to secure another form of payment when the customer may just as well cancel the customer's enrollment in the merchant's recurrent billing program. That is, the declined authorization may provide the customer the opportunity to cancel the order or cancel the merchant's access to the transaction card. Consequently, a need exists for a system which would allow a merchant to update the merchant's recurrent billing database as changes to a customer's transaction card information occurs.

Presently, no known sufficient system or method for automatically providing updated recurrent billing customer database information to a merchant exists. There are various systems and methods described in the prior art, however, which address a similar problem. One such system which teaches a Distributed Information Logistics Service (DILS) that automatically retrieves updated files from a remote server for delivery to local client programs is disclosed in U.S. Pat. No. 6,029,175, issued Feb. 22, 2000, to Chow et al., herein incorporated by reference. The system disclosed in Chow et al., uses a software agent called a Revision Manager which aids in insuring that a merchant may retrieve the most recent version of a document the merchant has previously accessed over a network.

The Revision Manager software disclosed in Chow et al., acts as a kind of client connected to a network server, which is capable of sending updated documents to a merchant who has previously accessed an older version of the document. In Chow et al., the merchant is able to identify for storage in a cache managed by the Revision Manager, frequently used individual network retrievable documents. In one embodiment, the merchant is able to designate the frequency at which the Revision Manager notifies the merchant of changes to the identified documents. In another embodiment, the merchant will be automatically notified of changes when the merchant attempts to access a document's older version.

While the Chow et al. system may be adequate for automatically receiving updated documents over a network, the system is insufficient for use in updating a recurrent billing customer database. For example, the Chow et al. system does not enable a merchant to make changes to the documents stored in the Revision Manager Cache. Consequently, where a merchant wishes make a change to a recurrent billing customer's information (e.g., the customer account number), the Chow et al. system is insufficient for providing a means to make the change.

Moreover, the Chow et al. system provides update services for only those documents specified by the Revision Manager system user. For a merchant who wishes to add a customer to a customer update database, Chow et al. offers no way of ensuring that the customer (e.g., document) maintains a valid transaction account. That is, where a merchant wishes to pre-authorize a customer transaction account prior to adding the customer to a system for providing updates, the Chow et al. system would be insufficient to accomplish the pre-authorization task.

It is therefore desired to create a system which will update a merchant's customer recurrent billing database in response to changes made to the customer billing information, particularly for Radio Frequency (RF) payment devices. It is preferred to have a system providing convenience and control by reducing or eliminating the need to contact each merchant for a change in an account. A system of great advantage to the merchant may be able to update the merchant's customer database in response to changes made by the transaction account provider or by the merchant. It is also desired, more particularly, to provide a system which allows an account holder to "charge" transactions to the accountholder's recurrent billing account without the need to use a conventional "charge card" system. This type of desired system may be useful for customers who do not have a charge card account or would prefer to having multiple billings on one bill, for example.

SUMMARY OF INVENTION

The present invention provides a method and system for updating a merchant's recurrent billing customer database which addresses many of the shortcomings of the related art. In accordance with various aspects of the present invention, a merchant's recurrent billing customer database update system is provided, wherein the system may be used to update the merchant's customer database in response to changes made to an account (e.g., transaction account) information or privilege status for transactions involving RF payment devices. In particular, a merchant may create a customer database storing the billing or credit card information of customers enrolled in the merchant's recurrent billing program. In addition, a corresponding database may be stored on a server managed and maintained by a customer's credit card or RF payment device provider. The credit card provider is preferably one selected by the customer to receive the merchant's recurrent bills. In accordance with this invention, updates which are made to the merchant customer database or to the provider customer database may be duplicated on the corresponding merchant or provider database. This feature can provide for reduced costs, and increased charge volume and retention.

In accordance with one aspect of the invention, an update system is provided wherein a file containing information pertaining to customers enrolled in a merchant's recurring billing program is stored in a predetermined location on a credit card or RF payment device provider's database. The customer file is managed, updated and maintained by the provider. The provider is further able to update the customer information stored in the customer file in response to actions taken by the provider which alter the customer credit card information or privilege status. The provider is then able to provide updated credit card information or status to the merchant for use in updating a corresponding merchant customer database for transactions by the customer involving RF payment devices. In accordance with this invention, the updated credit card or RF payment device information or status may be provided to the merchant on a fixed periodic basis (e.g., daily, weekly, monthly, etc.) or upon request by the merchant.

In accordance with another aspect of the invention, an update system is provided wherein a merchant may update the customer information stored on a merchant system database and further have the updated information checked against an existing provider customer database. In response to actions taken by the merchant to alter the customer credit card or RF payment device information, the provider is then able confirm the merchant's changes and update a customer database located on the provider server to reflect the changes made to the corresponding merchant customer database on the merchant system.

With an RF recurrent billing system, consistent with the present invention, an account number associated with a recurrent billing account is stored within an RF transaction device. The user of the RF transaction device may present the device for completing a transaction, and the transaction, if successfully completed, is billed to the user's recurrent billing account. The user is billed for the transaction during a billing cycle, typically occurring on a regular basis according to the recurrent billing account.

BRIEF DESCRIPTION OF DRAWINGS

A more complete understanding of the present invention may be derived by referring to the various exemplary embodiments of the present invention which are described in conjunction with the appended drawing Figures in which like numerals denote like elements, and in which.

DETAILED DESCRIPTION

Figure 1:
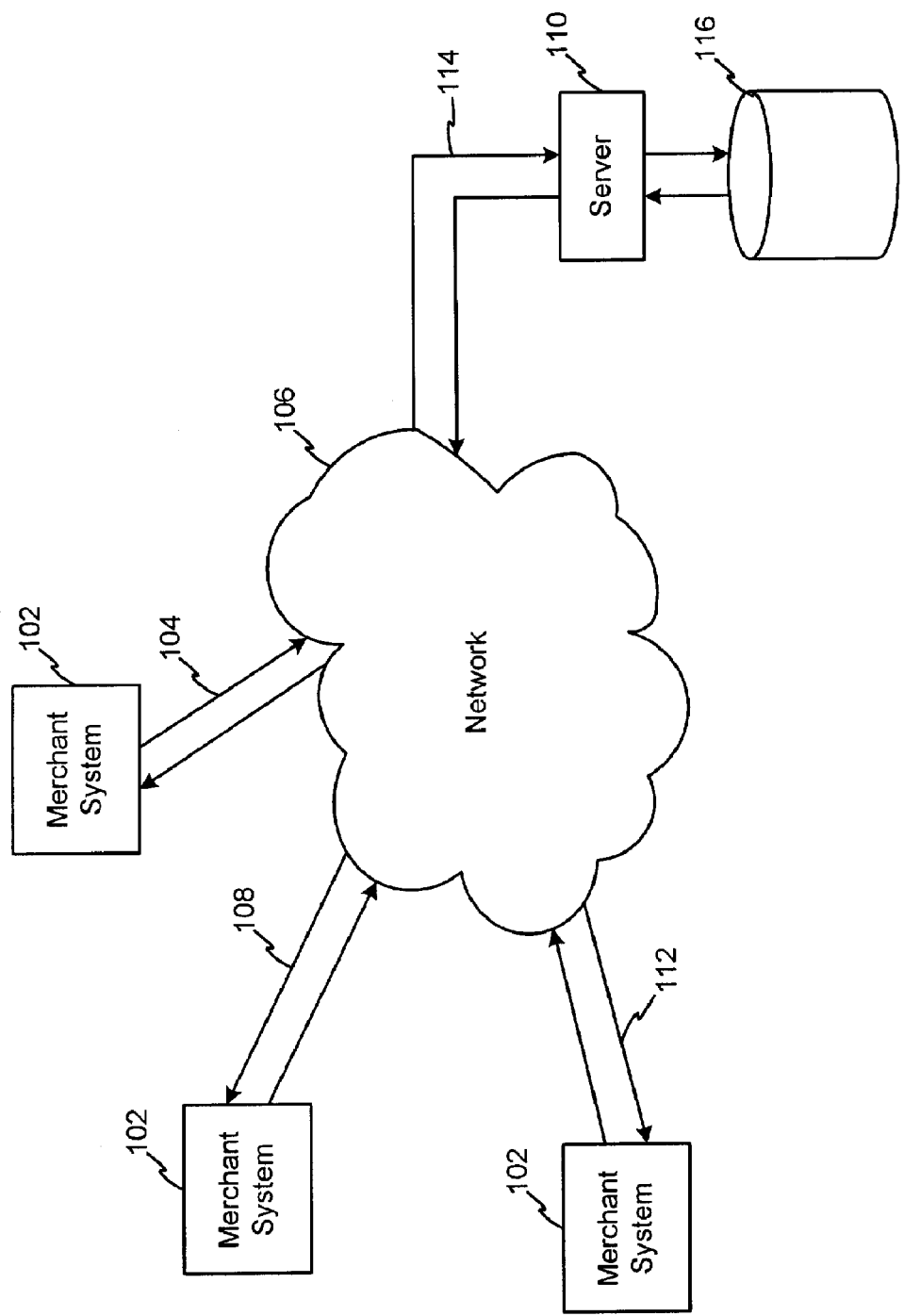
FIG. 1 is a block diagram of an exemplary embodiment of the merchant recurrent billing customer database update system in accordance with the present invention.

The present invention may be described herein in terms of functional block components and various processing steps. It should be appreciated that such functional blocks may be realized by any number of hardware and/or software components configured to perform the specified functions. For example, the present invention may employ various integrated circuit (IC) components, (e.g., memory elements, processing elements, logic elements, look-up tables, and the like), which may carry out a variety of functions under the control of one or more microprocessors or other control devices. Similarly, the software elements of the present invention may be implemented with any programming or scripting language such as C, C++, Java, COBOL, assembler, PERL, or the like, with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a scripting language, such as JavaScript, VBScript or the like. For a basic introduction of cryptography, please review a text written by Bruce Schneider which is entitled "Applied Cryptography: Protocols, Algorithms, And Source Code In C," published by John Wiley & Sons (second edition, 1996), which is hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various Figures contained herein are intended to represent exemplary functional relationships and/or physical couplings between the various elements. It should be noted that many alternative or additional functional relationships or physical connections may be present in a practical electronic transaction or file transmission system.

To simplify the description of the exemplary embodiment, the invention is described as pertaining to a system for updating an individual credit cardholder's account information using a system running over a computer network such as the Internet. It will be appreciated, however, that many applications of the present invention could be formulated. For example, the system could be used to automatically update a group membership information database, any relevant demographic database, or any other purpose. Further, it should be appreciated that the network described herein may include any system for exchanging data or transacting business, such as the Internet, an intranet, an extranet, WAN, LAN, satellite communications, and/or the like. That is, communication between the parties to the transaction and the system of the present invention is accomplished through any suitable communication means, such as, for example, a telephone network, intranet, Internet, point-of-interaction device (point-of-sale device, personal digital assistant, cellular phone, kiosk, etc.), online communications, off-line communications, wireless communications, and/or the like. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like, running any operating system such as any version of Windows, Windows NT, Windows 2000, Windows 98, Windows 95, MacOS, OS/2, BeOS, Linux, UNIX, or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols. Further, the present invention might employ any number of conventional techniques for data transmission, signaling, data processing, network control, and the like. For example, radio frequency (RF) or other wireless techniques could be used in place of any network technique described herein.

Further still, the terms "Internet" or "network" may refer to the Internet, any replacement, competitor or successor to the Internet, or any public or private internetwork, intranet or extranet that is based upon open or proprietary protocols. Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); LOSHIN, TCP/IP CLEARLY EXPLAINED (1997). All of these texts are hereby incorporated by reference.

Furthermore, the merchant and the provider, described herein, may represent individual people, entities, or businesses, and while reference is made to American Express®, or any other credit card provider, this is by way of example and the financial authorization entity may represent various types of card-issuing institutions, such as banks, credit card companies, card sponsoring companies, or third-party issuers under contract with financial institutions. The payment network includes existing proprietary networks that presently accommodate transactions for credit cards, debit cards, and other types of financial/banking cards, such as, for example, the American Express®, and VisaNet® network.

FIG. 1 is a block diagram of an exemplary merchant data file transfer and update system 100 in accordance with this invention. With reference to FIG. 1, in general, a number of merchant systems 102 communicate with a server system 110 via a network 106 to send and/or receive database files containing information related to individual customer credit card accounts. In an exemplary embodiment, server 110 suitably maintains distinct data file groupings for each individual merchant system 102 and retrieves the distinct data files to perform updating as requested by merchant systems 102. While the terms "credit card accounts" or "credit card" may be used in the exemplary embodiments, the invention contemplates the use of any type of financial or transaction account, whether or not associated with a physical card, such as, for example, debit card, charge card, smart card, bar coded card, magnetic stripe card, temporary use account number, brokerage account, 401K plan, stock account, telephone account, utility account, loyalty point account, and/or the like. One such transaction account which is suitable for use with this invention is described by Bishop et al., in the U.S. patent application Ser. No. 09/652,899, entitled "METHODS AND APPARATUS FOR CONDUCTING ELECTRONIC TRANSACTIONS," filed Aug. 31, 2000, incorporated herein in its entirety by reference.

Merchant system 102 may include any convenient combination of hardware and software components configured to allow a merchant to communicate over network 106. For example, merchant system 102 might include a standard personal computer (PC) comprising a CPU, monitor, storage, keyboard, mouse, and communication hardware appropriate for the given data link 104 (e.g., V.90 modem, network card, cable modem, etc.). In alternate embodiments, merchant system 102 is a personal data assistant (PDA) capable of manipulating images and communicating with server 110. Merchant system 102 typically includes an operating system (e.g., Windows 95/98/2000, Linux, Solaris, MacOS, and/or the like) as well as various conventional support software modules and drivers typically associated with computers. Merchant system 102 may also include application software configured to communicate over network 106 with server 110, for example, a world wide web (WWW) browser or any other communication software. In an exemplary embodiment, merchant system 102 includes a conventional Internet browser application that operates in accordance with HTML and HTTP protocols such as Netscape Navigator (available from the Netscape Corporation of Mountain View, Calif.) or Microsoft Internet Explorer (available from the Microsoft Corporation of Redmond, Wash.).

Merchant system 102 and server 110 are suitably coupled to network 106 via data links 104, 108, 112 and 114, respectively. A variety of conventional communications media and protocols may be used for data links 104, 108, 112 and 114. Such links might include, for example, a connection to an Internet Service Provider (ISP) over the local loop as is typically used in connection with standard modem communication, cable modem, Dish networks, ISDN, Digital Subscriber Line (DSL), or various wireless communication methods. Merchant system 102 might also reside within a local area network (LAN) which interfaces to network 106 via a leased line (T1, D3, etc.). Such communication methods are well known in the art, and are covered in a variety of standard texts. See, e.g., GILBERT HELD, UNDERSTANDING DATA COMMUNICATIONS (1996), hereby incorporated by reference.

Server 110 comprises any number of hardware, software, and networking components suitable to provide a user interface to a network that is accessible by users, and which provides the functionality described in further detail below. In one embodiment, Sun Ultra SPARC Enterprise 250 and 450 servers are used in conjunction with a Sun Solaris 7 or Linux operating system, Apache web server software, and an Oracle 8 or MySQL database system. Of course particular hardware and software components used in server 110 will vary widely from embodiment to embodiment. Furthermore, server 110 may represent a "cluster" or group of separate computer systems providing the functionalities described herein.

The merchant database locations maintained on database 116 by server 110 are provided a distinct merchant identifier. Database 116 may be a graphical, hierarchical, relational, object-oriented or other database, and may be maintained on a local drive of server 110 or on a separate computer coupled to server 110 via a local area or other network (not shown). In one embodiment, database 116 is a collection of ASCII or other text files stored on a local drive of server 110. Merchant database information is suitably retrieved from database 116 and provided to user systems 102 upon request via a server application, as described more fully below.

In one embodiment, the server 110 is managed by a credit card provider with which the merchant has established a billing account. The billing account may be associated with any suitable credit card service such as Visa®, MasterCard®, American Express®, Discover®, or the like. Further, the billing account may additionally allow the merchant to recover payment for charges made through the merchant by an individual customer who is a subscriber of the credit card service. It should be noted that although the present invention is described with relation to a credit card service, the invention is not so limited. That is, the invention is suitable for use with any system wherein the customer is billed on a periodic basis.

Within each merchant database location on database 116, there is stored a plurality of individual data locations corresponding to the credit card accounts of credit cardholders who have elected to enroll in the merchant's recurrent billing program. For example, a merchant may have a plurality of American Express® cardmembers who have elected to subscribe to the merchant's recurrent billing program. Where American Express® manages the credit card server 110, American Express® establishes a unique database location on database 116, which houses current information related to the merchant's recurrent billing customers (e.g., merchant-assigned customer number, credit card number and expiration date) who are using their American Express for recurrent billings. The database location will be assigned an identifier which can be recognized as belonging to a particular merchant. However, in order for American Express® to maintain a database location for a particular merchant, the merchant database information (e.g., customer number, credit card number and expiration date) is first provided to the database 116. That is, in an exemplary embodiment, a merchant performs an "initial registry" process for providing the information to the credit card provider.

Figure 2:
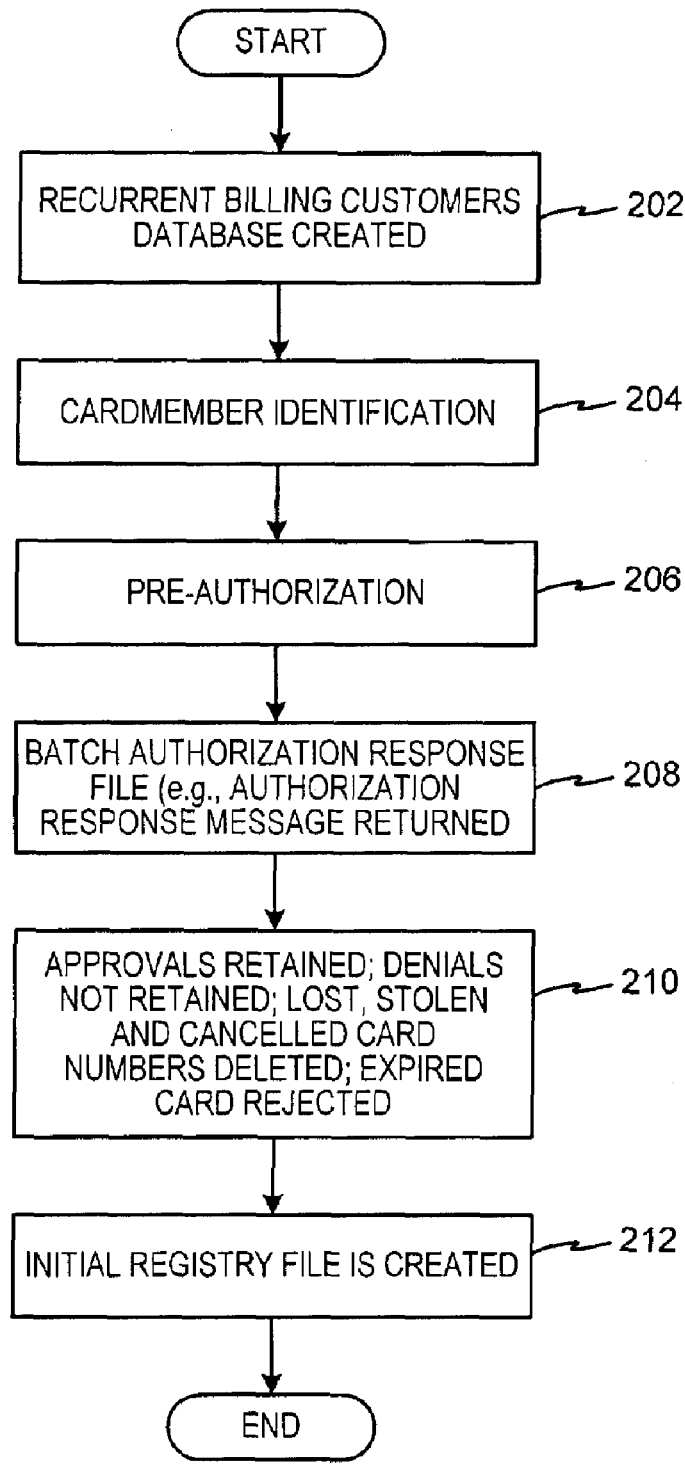
FIG. 2 is a block diagram of an initial registry process in accordance with the present invention.

FIG. 2 is an exemplary initial registry process for obtaining merchant database information from merchant system 102 for storage on database 116 via network 106. As shown, the merchant creates a customer data base of all customers enrolled in the merchant's recurrent billing program (step 202). Typically, this database will have varying customers using different recurrent credit card services for billing purposes. That is, the merchant system 102 database may comprise a database where a first plurality of customers are using Visa®, a second plurality of customers are using MasterCard®, a third plurality of customers are using American Express®, and so on.

The merchant further creates a cardmember working file of those customers who are using one particular credit card provider as their credit card for recurrent billing (for example, American Express®) (step 204). The American Express® cardmember working file contains cardmember information such as merchant-assigned customer number, corresponding cardmember credit card number and card expiration date which are used to identify the cardmember at the merchant location on database 116. However, prior to storing the cardmember information on database 116, the cardmember information may be pre-authorized (step 206) to insure that the information being provided by the customer is valid.

Figure 3:
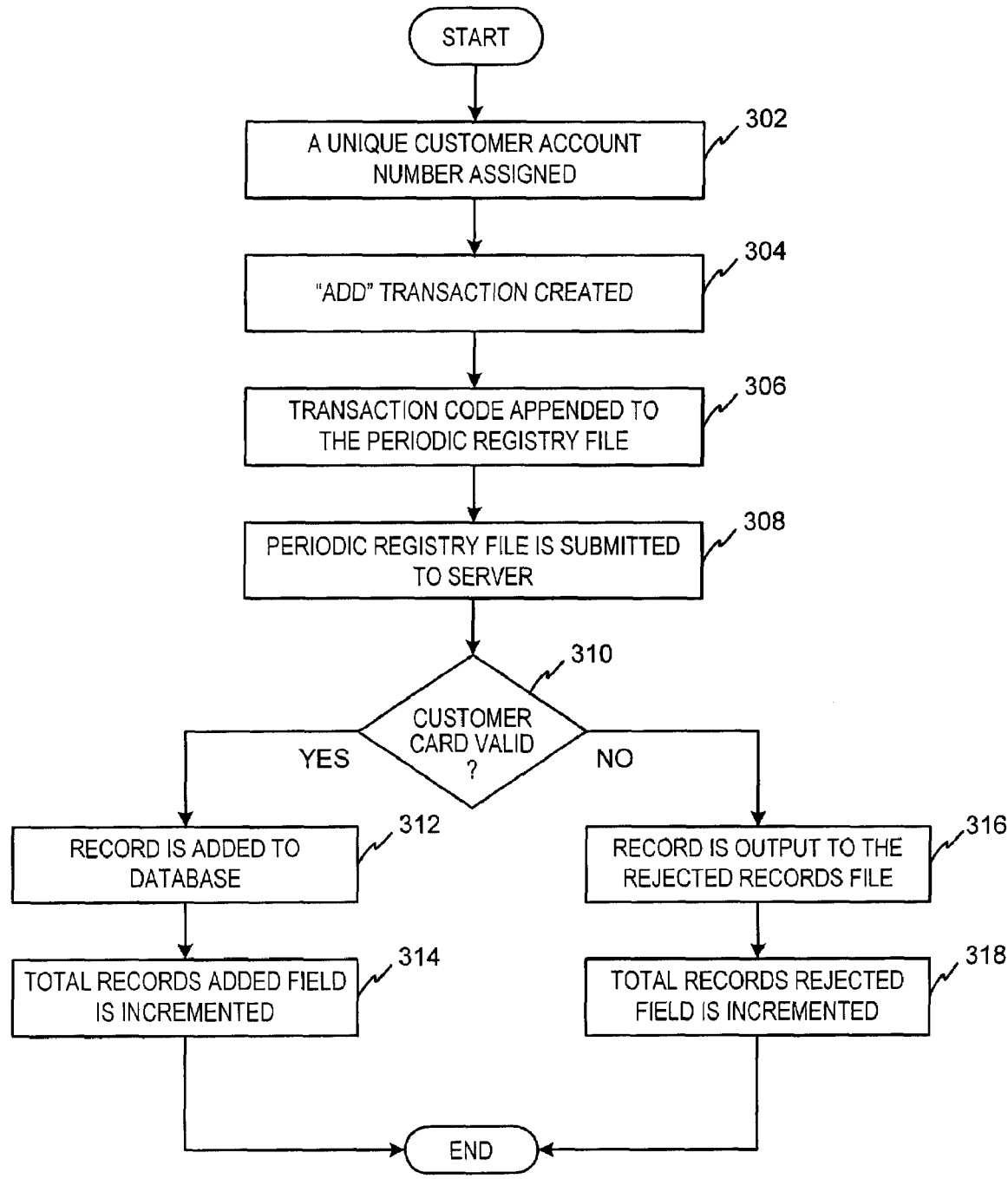
FIG. 3 is an exemplary embodiment of a process for performing a merchant "add" transaction in response to a merchant "add" transaction code in accordance with the present invention.

In an exemplary pre-authorization process (step 206), the merchant creates a batch authorization request in the form of an Authorization Request Message for forwarding to the credit card service provider. FIG. 3 is a flowchart of an exemplary process which may be used by a merchant for creating an addition to their registry file (i.e. the Authorization Request Message). The merchant further assigns a unique customer number to customer credit card information to aid in identifying the customer credit card information throughout the initial registry and update process (step 302). Further, the merchant creates an "add" transaction for the customer credit card information (step 304) by appending a merchant "add" transaction code to the customer account number and related customer credit card information (step 306). The customer account information and customer credit card information with the appended merchant "add" transaction code is then forwarded to the credit card provider server 110 (step 308) where the customer credit card information (e.g., credit card and expiration date, etc.) is compared to the credit card provider's own database of current cardmember credit card information (step 310). If a merchant provides customer credit card information which is also found on (e.g., matches) the credit card provider's own database of current cardmembers, the customer credit card information is deemed valid and is then added to the merchant's database location (also called "billing database" location) on the credit card provider's database 116 (step 312). If the customer credit card information is not found on the credit card provider's database of current cardmembers, the specific customer credit card information is rejected and is then placed in a rejected records file (step 316) for later reporting to the merchant.

In order to assist the merchant in determining which files are accepted and which files are rejected, the credit card provider's server 110 generates an Authorization Response Message (also called a "Summary Report") containing the decision codes appended to each customer account operated on by the server 110 (step 208). The Authorization Response Message may contain a numerical tally of the number of customer accounts which are deemed valid and which are rejected (steps 314 and 318). In one embodiment, the number of rejected files may be placed in a rejected records file and included in the Summary Report provided to the merchant. In another embodiment the rejected Records file may be provided to merchant independently of the Summary Report.

The decision codes which are appended to the customer accounts in the Authorization Response Message may aid the merchant in determining whether a particular customer credit card information has been accepted or rejected, and further, what the appropriate action should be for the merchant with regards to the particular customer credit card information. Table 1 below shows typical decision codes which may be used in an Authorization Response Message in accordance with this invention.

TABLE 1

Decision Codes

| Decision Code | Decision Code Description | Eligible for Update Service |
| --- | --- | --- |
| ab | Approved | Yes |
| cd | Please Call Credit Card Issuer | Yes |
| ef | Approved - Authorization Plus Program | Yes |
| gh | Deny-New Card Issued | No |
| ij | Deny Confiscate Card | No |
| kl | Deny | No |
| mn | Deny - Account Cancelled | No |
| op | Approve with Positive ID | Yes |
| qr | Please Wait | N/A |
| st | Edit Error | N/A |

Once the Authorization Response Message is received by the merchant, the merchant may create a registry file on the merchant system 102 containing all customer credit card information which has been accepted by the credit card server 110 in step 208 (step 210). Further, the information contained in the merchant registry file may be duplicated in the form of an initial registry file in the merchant database location on database 116 using the customer account numbers and customer credit card information (steps 312 and 220). In one embodiment, the initial registry file may be created when all accepted customer information is stored on the merchant location in database 116. In another embodiment, the initial registry file may be created prior to providing the Authorization Response Message back to the merchant. In yet another embodiment, the merchant may create the initial registry file by compiling a duplicate file including the customers the merchant currently has stored on the merchant's recurring customer database. This should be done after going through pre-authorization process. Merchant sends Initial Registry file to BillingWatch (server 110) to be added to database 116.

As previously mentioned, it may be desirable for a merchant to update the initial registry file in response to the merchant's daily activities. For example, where a merchant wishes to add a customer to his initial registry file, change a customer's credit card information, or delete a customer from his initial registry file, the merchant may submit a batch file to the credit card server comprising the relevant customer's or customers' information. Such a file, called a periodic registry file, may be submitted periodically (e.g., daily, weekly, monthly, etc.) to the server 110. In addition, the periodic registry file may contain a plurality of individual customer numbers and related customer credit card information, appended with a merchant transaction code used to indicate what action should be taken with the customer file. One method of submitting the periodic registry file to the server 110 involves placing the periodic registry file on a drop-off location on the server where it may be later accessed and retrieved by the merchant. In one embodiment, the server monitors the frequency at which a merchant submits periodic registry files to aid in determining the value of the server 110 service to the merchant, or to assist in determining the amount of database storage space to allot the merchant on database 116, and the like.

In this instance, the merchant transaction code identifies for the server 110 the appropriate action to be performed with respect to a particular customer information stored in the merchant billing database location on the database 116. For example, where a merchant wishes to "add" a new customer to his billing database location, the merchant appends merchant transaction code "A" to the customer number and customer credit card information. Other possible merchant transaction codes may be used, and are shown below in Table 2.

TABLE 2

Merchant Transaction Codes

| Transaction Type | Transaction Code | Events or Actions That Might Warrant this Transaction |
| --- | --- | --- |
| Add | A | New customer enrolling in recurrent billing<br>Existing customer enrolling in recurring billing |
| Change | C | Customer notifies merchant of change in credit card information |
| Delete | D | Customer cancels enrollment in recurring billing program<br>Merchant wants to change merchant-assigned customer number associated with a recurring billing enrollee. This delete transaction may be followed up with an "add" transaction to add new merchant assigned customer account number. |

It should be understood that the above list of merchant transactions is not exhaustive, and as such, other merchant transaction codes may exist. For example, a merchant transaction code "NC" may exist for a transaction which changes an enrollee's billing card from a personal to a corporate card, or the like. Further, while not shown above, the merchant transaction codes may be used in combination for instance where a merchant may wish to perform more than one transaction on a customer account. That is, it should be understood that other possible combinations of merchant transaction codes may exist, and the ones listed in Table 2 are used herein merely for illustrative purposes.

Figure 4:
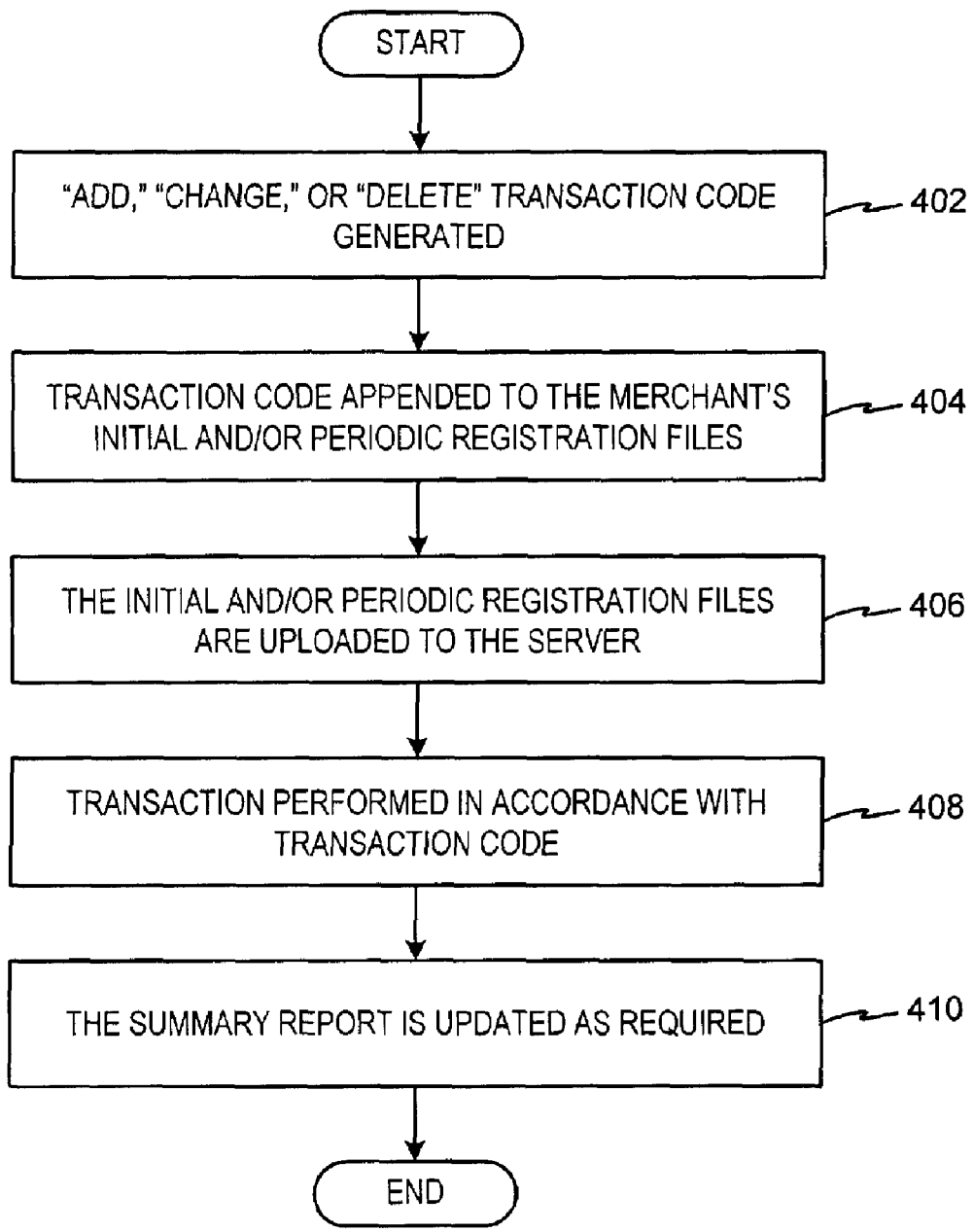
FIG. 4 is an exemplary embodiment of a process for updating a merchant billing database and generating a Summary Report in accordance with the present invention.
Figure 5:
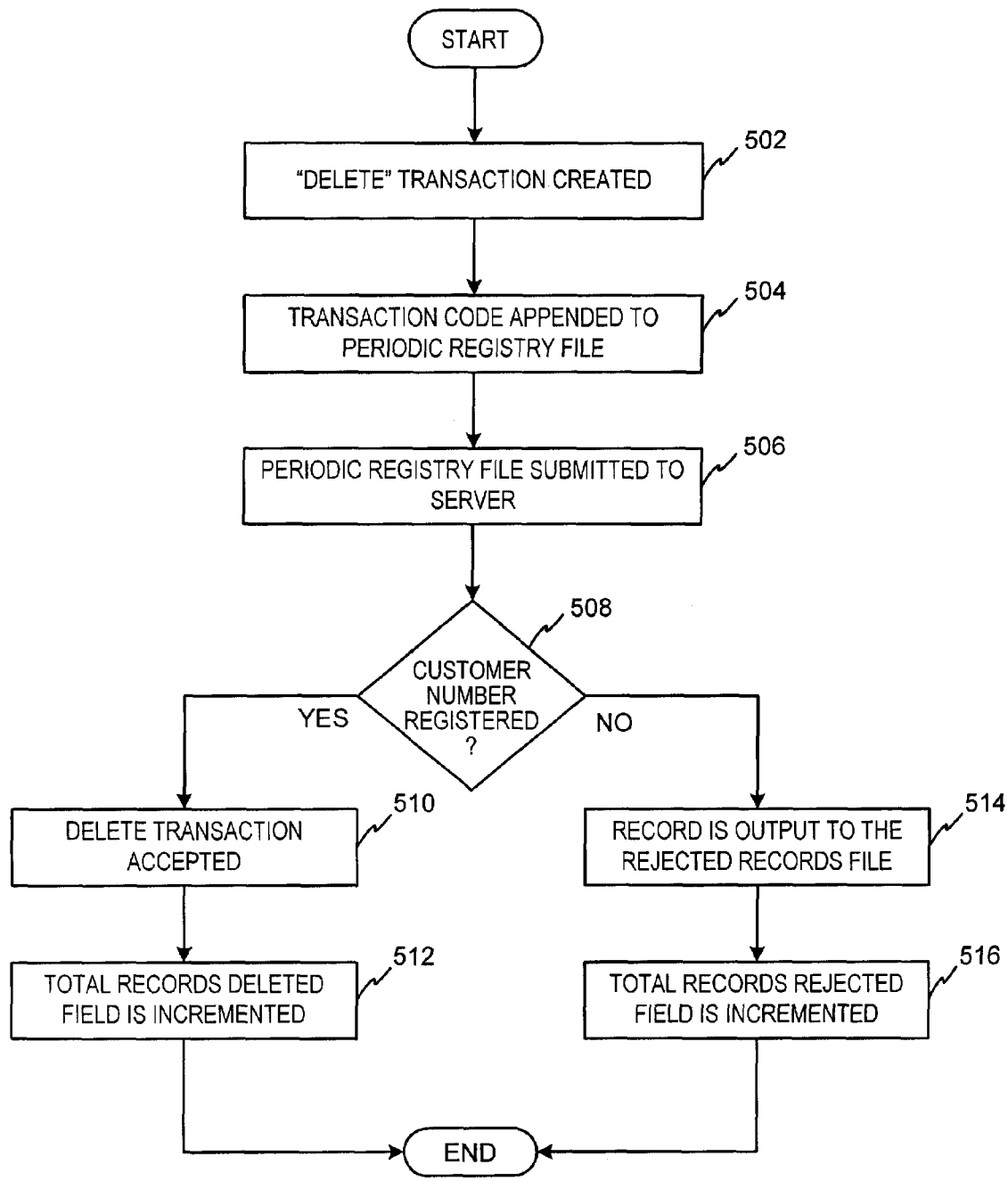
FIG. 5 is an exemplary embodiment of a process for performing a merchant "delete" transaction in response to a merchant "delete" transaction code in accordance with the present invention.

As noted, a merchant who wishes to update its billing database location will engage in a periodic registry process. Illustrated in FIG. 4 are the steps of an exemplary periodic registry process for use with this invention. The merchant may generate a periodic registry file as described above (step 402). The periodic registry file may append a merchant transaction to the individual customer accounts indicating the appropriate server transaction to be taken (step 404). The periodic registry file is then uploaded on the server 110 (step 406) and the server 110 performs the appropriate action as indicated (step 408). As with the initial registry process, the server prepares a Summary Report enumerating for the merchant which transaction requests were performed and which were rejected (step 410).

As noted above, the server 110 performs the appropriate transaction as indicated by the merchant transaction code (step 408). FIGS. 5-7B illustrate the exemplary steps which may be performed for a given merchant transaction. For example, the steps shown in FIG. 5 may be performed by database 116 where a merchant wants to "delete" a cardmember from the merchant's billing database location (e.g., card holder dis-enrolls in recurrent billing service). In this exemplary process, the merchant creates a "delete" transaction by appending the transaction code to a customer number and customer credit card information file (step 502). The merchant may append the "delete" transaction to the periodic registry file and submit the file to the credit card provider server 110 (step 506). The database 116 may then be checked to determine if the customer number or customer credit card information is included on the merchant files stored on the merchant's billing database location (step 508). That is, with respect to database 116, the server 110 may compare the customer number and/or related customer credit card information with those stored in the merchant's billing database location to determine if the customer may be found on the database. If the customer number and/or information is found on the billing database, then the server will accept the merchant's "delete" transaction (e.g., delete the customer from the billing database location) and increment the Summary Report accordingly (steps 510 and 512). In one embodiment, the Summary Report may contain a data field for use by the server 110 to note which record has been deleted. In addition, Summary Report may contain a counter for incrementing in accordance with the number of merchant "delete" transactions which were accepted on database 116.

It should be noted, that in the instance where the customer number and/or information is not found on the billing database location by the server 110, the merchant "delete" transaction request is placed in a rejected records file (step 514) in similar fashion as was done in the initial registry process described above. In addition, the rejected records file may contain a counter which may be incremented in accordance with the number of merchant "delete" transactions rejected on the database 116.

Figure 6:
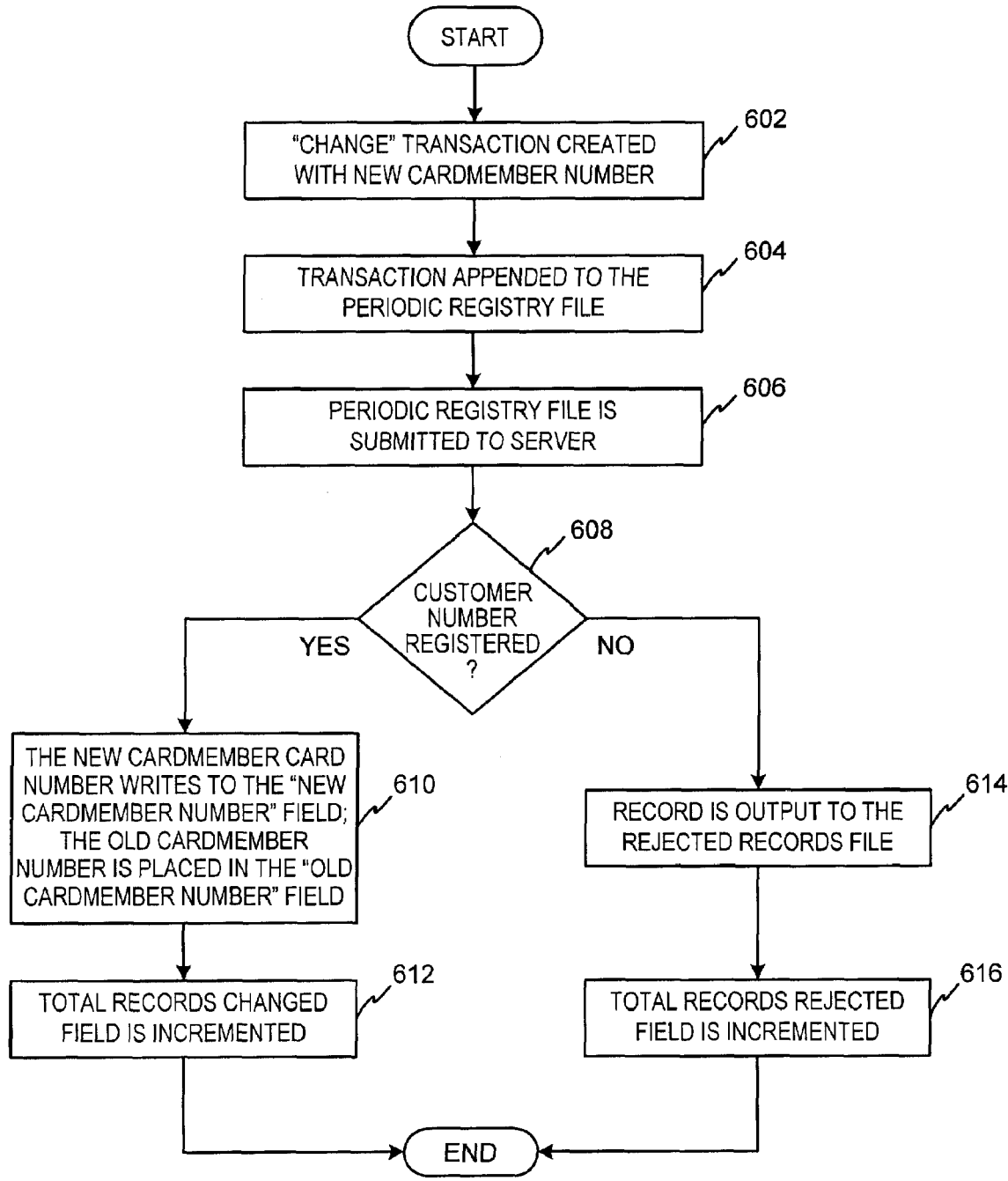
FIG. 6 is an exemplary embodiment of a process for performing a merchant "change" transaction in response to a merchant "change" transaction code in accordance with the present invention.

FIG. 6 shows an exemplary merchant "change" transaction process which may be used with the present invention. Where a merchant wishes to make a "change" to a customer's information stored on the billing database location, the merchant may create a "change" transaction by appending the transaction code to a customer number and customer credit card information file (step 602). The merchant may then append the "change" transaction to the periodic registry file (step 604) and submit the file to the server 110 (step 606). The server 110 may then check the customer number or customer credit card information against the merchant files stored on the merchant's billing database location (step 608). That is, the server 110 may compare the customer number and/or related customer credit card information with those stored in the billing database location to determine if the customer may be found on the database. If the customer number and/or information is found on the billing database location, then the server will accept the merchant's "change" transaction (e.g., change the customer information in the billing database location) and increment the Summary Report accordingly (steps 610 and 612). In one embodiment, the Summary Report may contain a data field for use in noting which record has been changed. In addition, the Summary Report may contain a counter for incrementing in accordance with the number of merchant "change" transactions which were accepted on database 116.

Similar to the action taken with the merchant "delete" command described above, in the instance where the customer number and/or information is not found on the billing database location, the merchant "change" transaction request may be placed in a rejected records file (step 614) in similar fashion as was done in the initial registry process. The rejected records file may contain a counter which may be incremented in accordance with the number of merchant "change" transactions which were rejected on database 116.

Where a merchant has a new enrollee in his recurring billing system, the merchant may wish to "add" the customer to his billing database location for management by the server 110. In this instance, the merchant would create a merchant "add" transaction in substantially similar manner as was done during the initial registry process. That is, a new enrollee to the merchant recurrent billing system may be added to the merchant billing database location in much the same way as was illustrated and described in FIG. 2. As such, the description will not be repeated here in the interest of brevity.

Figure 7A:
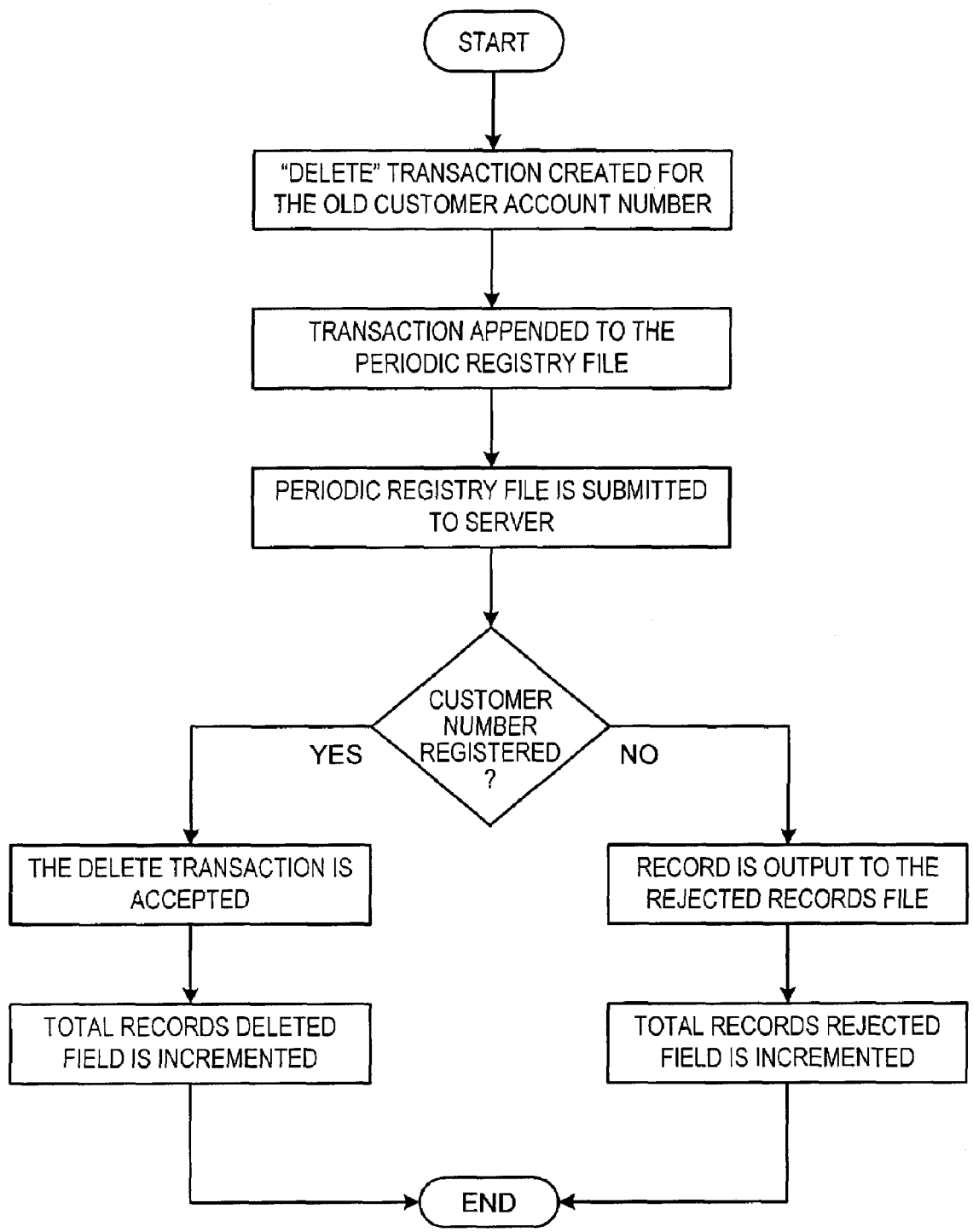
FIGS. 7A and 7B are another exemplary embodiment of a process for performing a merchant "change" transaction in response to a merchant "change" transaction code in accordance with the present invention.
Figure 7B:
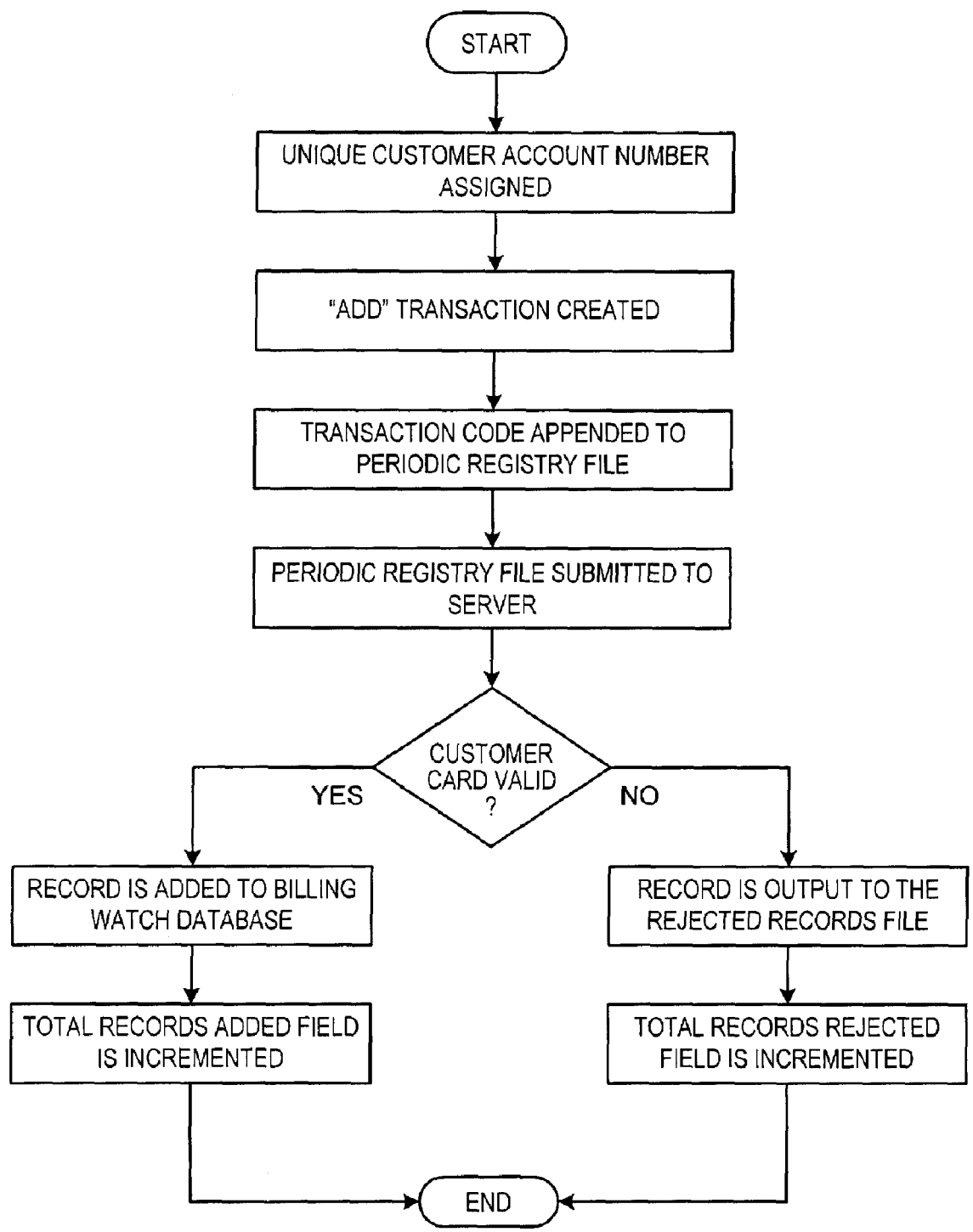

In addition to the above transactions, it may be desirable for a merchant to perform two merchant transactions for the same customer number, such as, where the merchant may wish to submit a new customer number when the merchant has reassigned the customer's merchant-assigned customer number (e.g., account number). In this case, the merchant will want to change only the account number associated with the customer on the billing database location. As noted with respect to Table 2 above, this transaction may be performed in two parts. FIGS. 7A and 7B illustrate how the two functions may be performed on the database. In particular, the merchant may first create a merchant "delete" transaction (FIG. 7A) followed closely by an "add" transaction (FIG. 7B). As can be seen, the merchant "delete" transaction of FIG. 7A and the "add" transaction of 7B are such that they may be performed in substantially the same way as similar steps of FIGS. 3 and 5. As such, the descriptions of FIGS. 7A and 7B will not be repeated here in the interest of brevity. That is, it should be understood that a server 110 which changes a customer's number in accordance with a merchant's request may perform the steps associated with the merchant's "delete" and "add" commands as described above.

With reference now to FIG. 4, at the completion of the merchant transaction request, a Summary Report is generated by server 110 (step 410). The Summary Report includes a compilation of information related to the actions performed on the database 116 in accordance with the merchant request. Accordingly, the Summary Report may have a listing of all files which were added, deleted, or changed as a result of the submission of the periodic report. The listing may include a string field wherein each accepted transaction is shown as having been accepted or performed. In addition, the Summary Report may have a counter for each one of the merchant grouped transactions (e.g., "add," "delete" or "change") indicating the number of times the grouped transaction was performed. For example, where the server 110 has added to database 116 five files as a result of the periodic registry report, the counter may indicate under the "add" field that indeed five files were added. In this way, the merchant may discern the percentage of accepted "add" transactions to rejected "add" transactions.

In addition, the Summary Report may have a separate file for returning to the merchant the files which were rejected on the database. These files may be stored in a rejected file and provided to the merchant independent of the Summary Report or the file may be appended to the Summary Report indicating which files were rejected on the database. Upon receipt of the rejected files information the merchant may check and correct any transaction on the rejected file as desired and resubmit the corrected transactions with the next periodic registry report to be submitted by the merchant.

As with the merchant transactional groupings, the rejected file may contain a rejected counter for enumerating the number of files rejected on the database. It should be noted that in one embodiment of the present invention, the rejected counter may be used to control the quality of the periodic registry files provided to the server 110 by the merchant system 102. That is, where a merchant's registry file causes the server 110 to perform multiple rejects with respect to database 116, the server 110 may notify the merchant system that the registry file may be unacceptable for processing by the server 110. Such a situation may arise when the registry file is corrupt, contains a proliferation of errors, or is incompatible with the database 116 processing system, and the like. To aid in notifying the merchant that the registry file is unacceptable for processing, the server 110 may include a rejection threshold. The rejection threshold may be a predetermined number of rejections after which the server 110 will no longer attempt to process the merchant's periodic registry file. Upon reaching or surpassing the rejection threshold, the server 110 may take some action to notify the merchant that a problem has occurred with his periodic registry file. Typical actions may include placing all of the merchant's requests in a rejection file and appending the file to the Summary Report which may be downloaded by the merchant system 102.

The providing of the Summary Report may typically be done periodically (e.g., daily, weekly, or monthly, etc.). In accordance with one embodiment, the server 110 places the Summary Report on a pick-up directory on server 110 on a periodic basis (e.g., daily, weekly or monthly, etc.). The merchant system 102 then is able to access the pick-up directory and retrieve the Summary Report in accordance with any of the accepted file retrieval protocols. In one aspect of this embodiment, the server 110 may include a predetermined time period during which a Summary Report will be allowed to be stored in the pick-up directory. For example, a Summary Report which has been stored in the pick up directory for more than five days may be removed from that directory entirely. In another aspect of the embodiment, where five successive days of Summary Reports are stored in the pick-up directory, the server 110 may remove all five days of Summary Reports from the pick-up directory and notify the merchant accordingly.

In another embodiment, the Summary Report may be delivered to the merchant system 102 once its compilation is complete (e.g., daily, weekly or monthly), eliminating the need for the merchant system 102 to sign onto the server 110 and download a waiting file.

Figure 8:
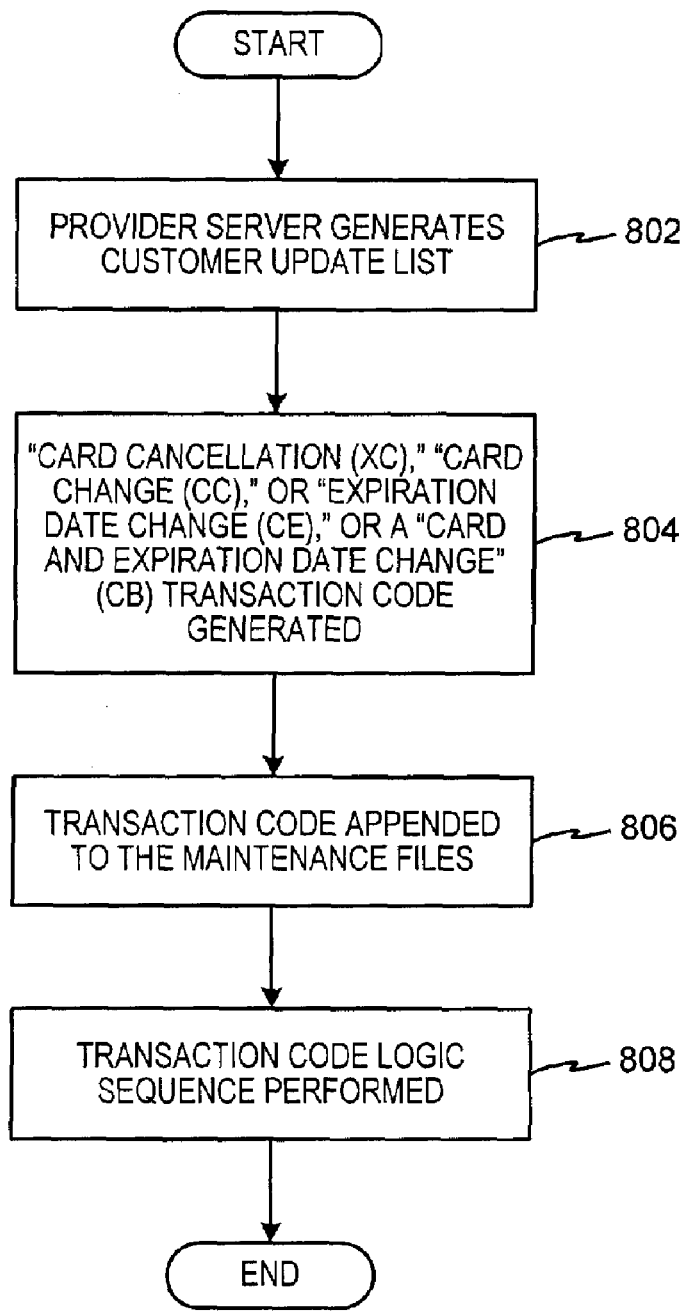
FIG. 8 is an exemplary embodiment of a process for updating a merchant billing database location and generating a periodic maintenance report for updating a corresponding merchant recurrent billing customer database in response to a provider transaction code in accordance with the present invention.

Another embodiment of the invention addresses the case where the customer credit card information or status is altered unbeknownst to the merchant system 102. For example, the credit card provider may cancel a customer's credit card privileges, or change a customer's credit card number or expiration date, and the like. In that instance, the credit card provider may alter the customer information on the provider customer database independent of any action taken by the merchant. The server 110 may then generate a maintenance file containing the new customer information to be provided to the merchant system 102. To insure accuracy and consistency between the merchant customer recurrent billing database stored on the merchant system 102 and the merchant billing database location on the database 116, the maintenance file may preferably be downloaded periodically (e.g., daily, weekly, monthly, etc.) by the merchant. The merchant may further use the daily maintenance file to update the merchant's recurrent billing customer database on the merchant system 102. FIG. 8 is a flowchart of an exemplary process enabling the server 110 to generate a maintenance file in accordance with the present invention. It should be noted that the server may generate the maintenance file on a periodic basis (e.g., daily, monthly, weekly, etc.) or any other basis as necessary (e.g., on request of the card provider or the merchant).

As shown in FIG. 8, where a credit card provider has altered a credit card customer's information (e.g., card status, card number or expiration date), the provider may generate a file containing the altered credit card information (step 802). The server 110 may then generate a transaction code for use by the server 110 and/or by the merchant in updating the customer information stored in the merchant's billing database location (step 804). The server 110 may then append the customer information and related transaction code to the maintenance file which may be downloaded to the merchant system 102 (step 806). Upon downloading the maintenance file, the merchant may perform a sequence of steps designed to insure that the merchant's recurrent billing customer database is updated in accordance with the information contained on the periodic maintenance report (step 806).

In one embodiment, the merchant may submit a periodic registry report containing the updated information appended with the appropriate merchant transaction code, which in turn may prompt the server 110 to perform the desired sequence of steps for updating the merchant billing database location (e.g., "change" sequence performed by server 110 for change transaction). In another embodiment, the customer information is updated on the merchant billing database location subsequent to, or simultaneous with, the alteration of the customer information on the provider database by the credit card provider.

Table 3 is a list of typical provider transaction codes which may be used with the present invention.

TABLE 3

Provider Transaction Code

| Transaction Type | Transaction Code | Event That Initiates This Transaction |
|---|---|---|
| Card Cancellation | XC | Cardmember/Provider cancels card |
| Card Change | CC | New credit card number issued |
| Expiration Date Change | CE | The credit card expiration date changed. (Card numbers do not change when only the Card Expiration Date changes) |
| Card Number and Expiration Date Changes | CB | New card number and expiration date issued to card holder |

As previously noted, each provider transaction code is appended to the customer information provided to the merchant in the periodic maintenance report. Each provider transaction code may further prompt the merchant system to perform a sequence of steps for updating the merchant customer database to reflect the changes made by the provider. FIGS. 9-12 depict typical sequences of steps which may be performed by the merchant system 102 in response to the above exemplary transactions.

Figure 9:
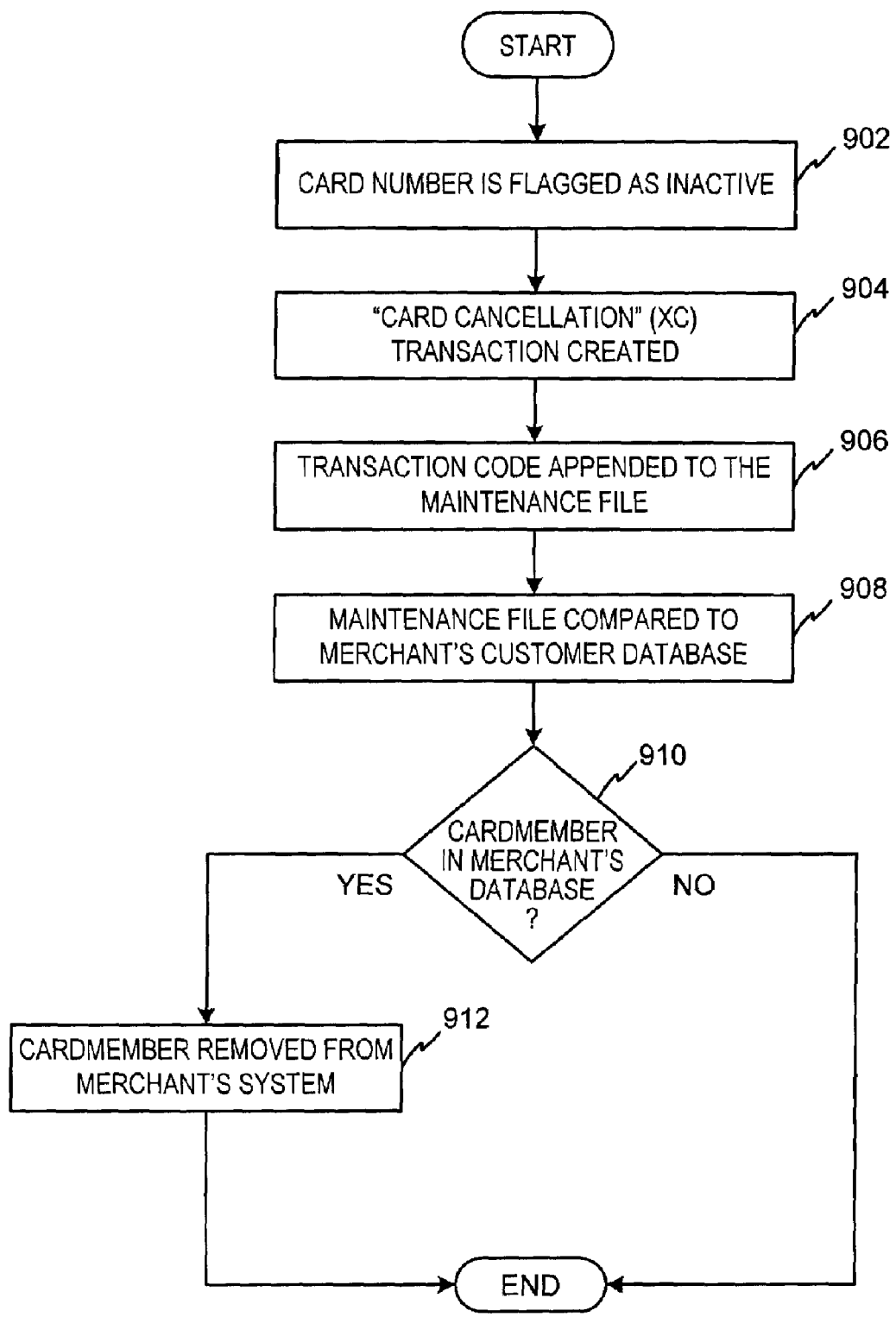
FIG. 9 is an exemplary embodiment of a process for performing a provider "card cancellation" transaction in response to a provider "card cancellation" transaction code in accordance with the present invention.

With reference to FIG. 9, what is shown are process steps which may be performed in an exemplary "card cancellation" transaction ("XC") in accordance with this present invention. As shown, the provider may indicate that a particular card number is now inactive and should be purged from the billing database location after 180 days (step 902). For example, a marker card number (e.g., a digital flag or other indicator) may be appended to the card number identifying the card number for cancellation. The server 110 may then create a "card cancellation" transaction by appending to the card number a cancellation ("XC") transaction code (TC) (step 904). The server may then append the transaction to the daily maintenance file for downloading to the merchant system 102 (step 906). The merchant system 102 may then execute a program file comparing the maintenance file to the merchant customer database (steps 908 and 910). If the cardmember is found on the merchant customer database, the merchant system 102 removes the cardmember information from the merchant system files. If the cardmember information is not found on the merchant system 102 customer database, then the merchant system 102 does not perform the removal action.

Figure 10:
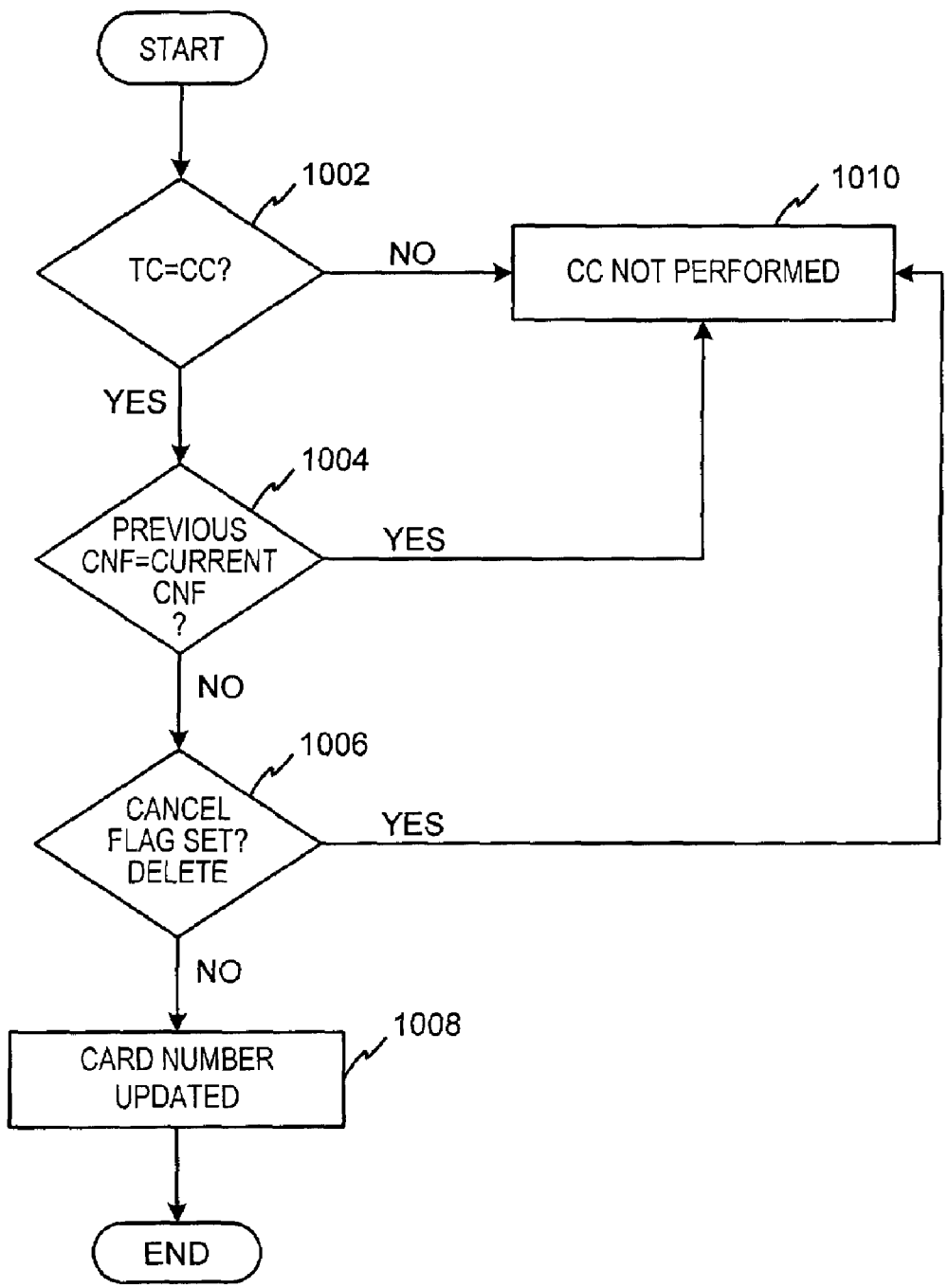
FIG. 10 is an exemplary embodiment of a process for performing a provider "change card number" transaction in response to a provider "change card number" transaction code in accordance with the present invention.

Referring now to FIG. 10, what is shown is an exemplary process sequence which may be performed by merchant system 102 in response to "change card number" ("CC") provider transaction. Upon receiving the periodic maintenance report from database 116 via server 110, merchant system 102 may check to see if the provider transaction code for a particular customer number corresponds to the "change card number" transaction (e.g., "CC") (step 1002). If the provider transaction code corresponds to the change card number transaction "CC", the process may require the merchant system 102 to evaluate whether the existing credit card number and the proposed credit card number provided by server 110 are the same (e.g., card number file (CNF)) (step 1004). In one embodiment, where the numbers are not equal, then the system may check to ensure that the credit card number corresponding to the "CC" transaction has not been targeted for cancellation (step 1006). Where the card number has not been targeted for cancellation by server 110, the merchant system 102 may update the card number on the merchant system 102 as required by the maintenance file (step 1008).

It should be noted, however, that the process disclosed in FIG. 10 may be further designed to ensure that the "change card number" transaction is performed only when desired. For example, the transaction may not be performed if the transaction code does not initiate the change card number sequence (step 1002), the previous card number and the proposed card number are the same (e.g., the change has already been made) (step 1004), or if the card is marked for cancellation (step 1006).

Figure 11:
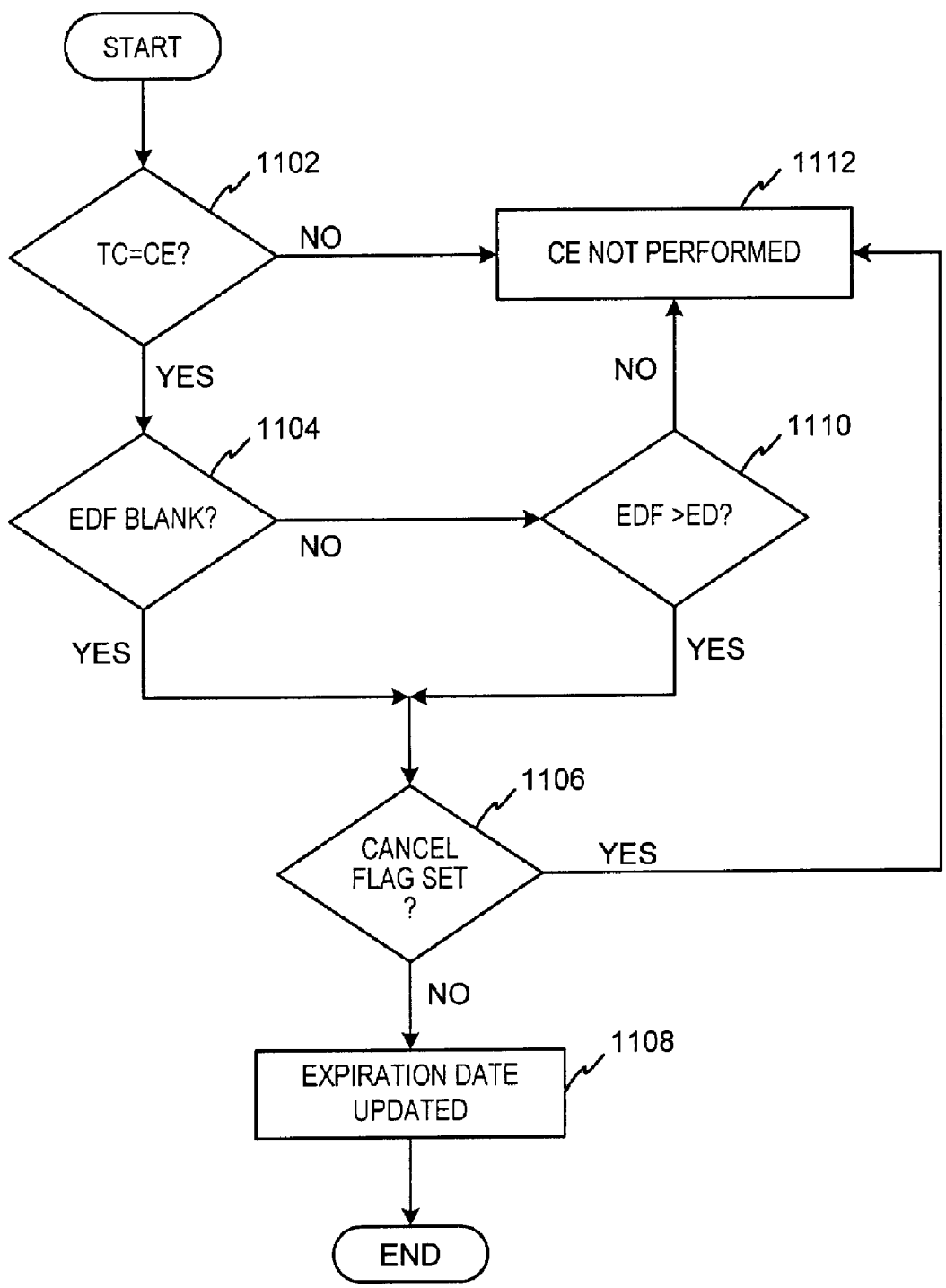
FIG. 11 is an exemplary embodiment of a process for performing a provider "change expiration date" transaction in response to a provider "change expiration date" transaction code in accordance with the present invention.

FIG. 11 shows an exemplary process which may be performed by merchant system 102 in response to a "change expiration date" ("CE") provider transaction code (TC). As with the "change card number" transaction ("CC"), the "change expiration date" transaction ("CE") may call for the merchant system 102 to ensure that the change expiration "CE" transaction code is present on the maintenance file (step 1102). Where the "change expiration date" transaction code exists, the merchant system 102 may determine whether the expiration date for the customer information as it is stored in the merchant customer database is blank (step 1104). That is, the merchant system 102 may determine whether an expiration date exists for a particular customer credit card number on the merchant system 102. If no expiration date exists, the merchant system 102 may determine whether the customer number file has been targeted for cancellation by server 110 (step 1106). If the customer file is not to be cancelled, then the expiration date corresponding to the customer file may be updated (step 1108).

Notably, in accordance with the process steps of FIG. 4, the expiration date corresponding to a customer number may be updated when the file already contains an expiration date. For example, upon evaluating whether the expiration date field (EDF) of a customer information file is targeted for the "CE" transaction (step 1104) the merchant system 102 may further evaluate whether the proposed new EDF is greater (e.g., later in time) than the existing expiration date (ED) (step 1110). If the proposed EDF is greater than the existing expiration date, then the merchant system may determine if the customer number has been targeted for cancellation (step 1106) and change the expiration date if the customer file is not to be cancelled (step 1108).

However, as with the change number ("CC") process shown in FIG. 11, the process disclosed in FIG. 11 may be further designed to ensure that the change expiration date transaction is performed only when desired. For example, the "CE" transaction may not be performed if the transaction code does not initiate the change expiration date sequence (step 1102), the proposed expiration date is less than the existing expiration date (e.g., the proposed expiration date is earlier in time than the existing expiration date) (step 1110), or if the card is targeted for cancellation (step 1106).

In addition to the aforementioned provider transactions described above, it may also be desired to change both the credit card number and the expiration date corresponding to a customer number in a merchant customer database. Such a situation may arise when the customer has lost or misplaced his card and the provider issues the customer a replacement credit card having a new credit card number and expiration date. In that instance, it may be advantageous for the merchant to be able to perform a process capable of changing his customer database to reflect the information contained on the replacement credit card.

Figure 12:
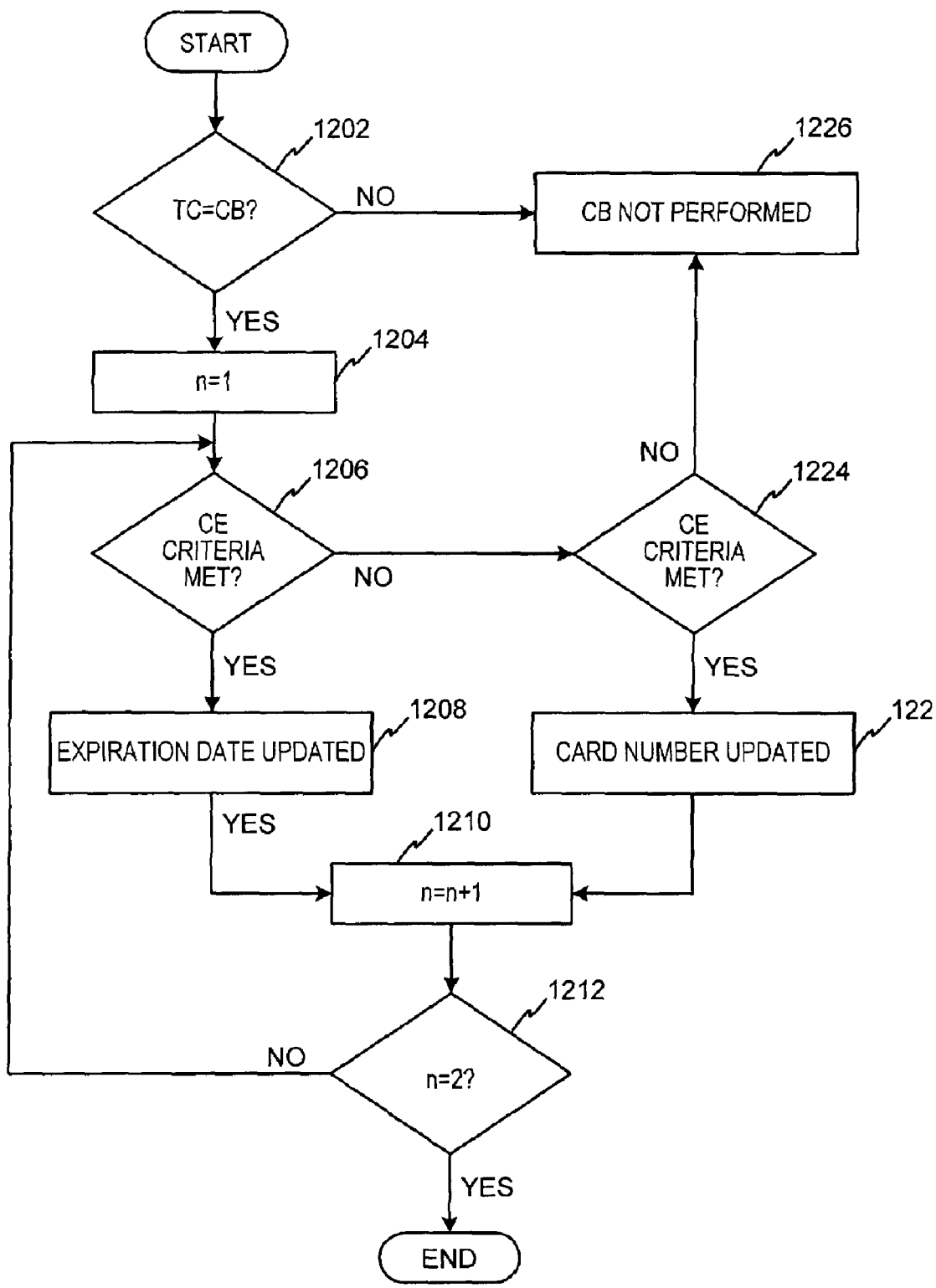
FIG. 12 is an exemplary embodiment of a process for performing a provider "change both" transaction in response to a provider "change both" transaction code in accordance with the present invention.

FIG. 12 illustrates an exemplary process which may be performed by the merchant to change both the credit card number and the expiration date corresponding (e.g., "CB" transaction) to a recurrent billing customer on merchant system 102. As shown in FIG. 12, the merchant system 102 may first determine if the "CB" transaction is present on the maintenance file (step 1202). Where the "CB" transaction is present, the "CB" transaction may be performed in two sequences where the merchant system 102 may determine if the criteria exist for changing the expiration date (step 1206) and also if the criteria exist for changing the credit card number (step 1224). Consequently, merchant system 102 may establish a counter n for tracking the number of times the "CB" transaction sequence is performed. For example, since the "CB" sequence is to be performed twice (e.g., one time for "CE" transaction and a second time for "CC" transaction), the counter may be initially set at one "1" (step 1204) and later incremented by one until the counter n indicates that the sequence has been performed twice (e.g., n=2) (steps 1210 and 1212). Once the "CB" sequence has been performed for the second time, then the counter may be reset to zero prior to performing subsequent "CB" transactions.

Once the merchant system 102 determines that a "CB" transaction exists on the periodic maintenance report (step 1202), the merchant system 102 may then evaluate whether the "change expiration date" criteria are satisfied (step 1206) such that the system 102 would perform a "change expiration date" process and update the expiration date in the merchant customer database (step 1208). An exemplary "change expiration date" process may be substantially similar to that described with respect to FIG. 11.

As noted, at the completion of the "change expiration date" process, the merchant system may increment the counter n (step 1210) and determine if the "CB" process is complete. That is, the system 102 may determine whether the "CB" process has been performed twice (n=2) such that the system is made aware that the criteria for both the "change expiration date" ("CE") and the "change credit card number" ("CC") have been evaluated. Where the counter n does not indicate that the merchant system 102 has evaluated both the "CE" and the "CC" criteria, the system 102 may then perform the criteria that has yet to be performed (step 1212). For example, where the system 102 has evaluated whether the "CE" criteria are met, but has not evaluated whether the "CC" criteria are met, the system 102 may seek to evaluate the "CC" criteria. Similarly, where the system 102 has evaluated whether the "CC" criteria are met, but has not evaluated whether the "CE" criteria are met, the system 102 may seek to evaluate the "CE" criteria. In particular, where the "CC" criteria has not been evaluated, the system 102 will evaluate the "CC" criteria (step 1224) and, if the "CC" criteria are met, the merchant system 102 may update the card number (step 1222) on the merchant customer database.

Figure 13:
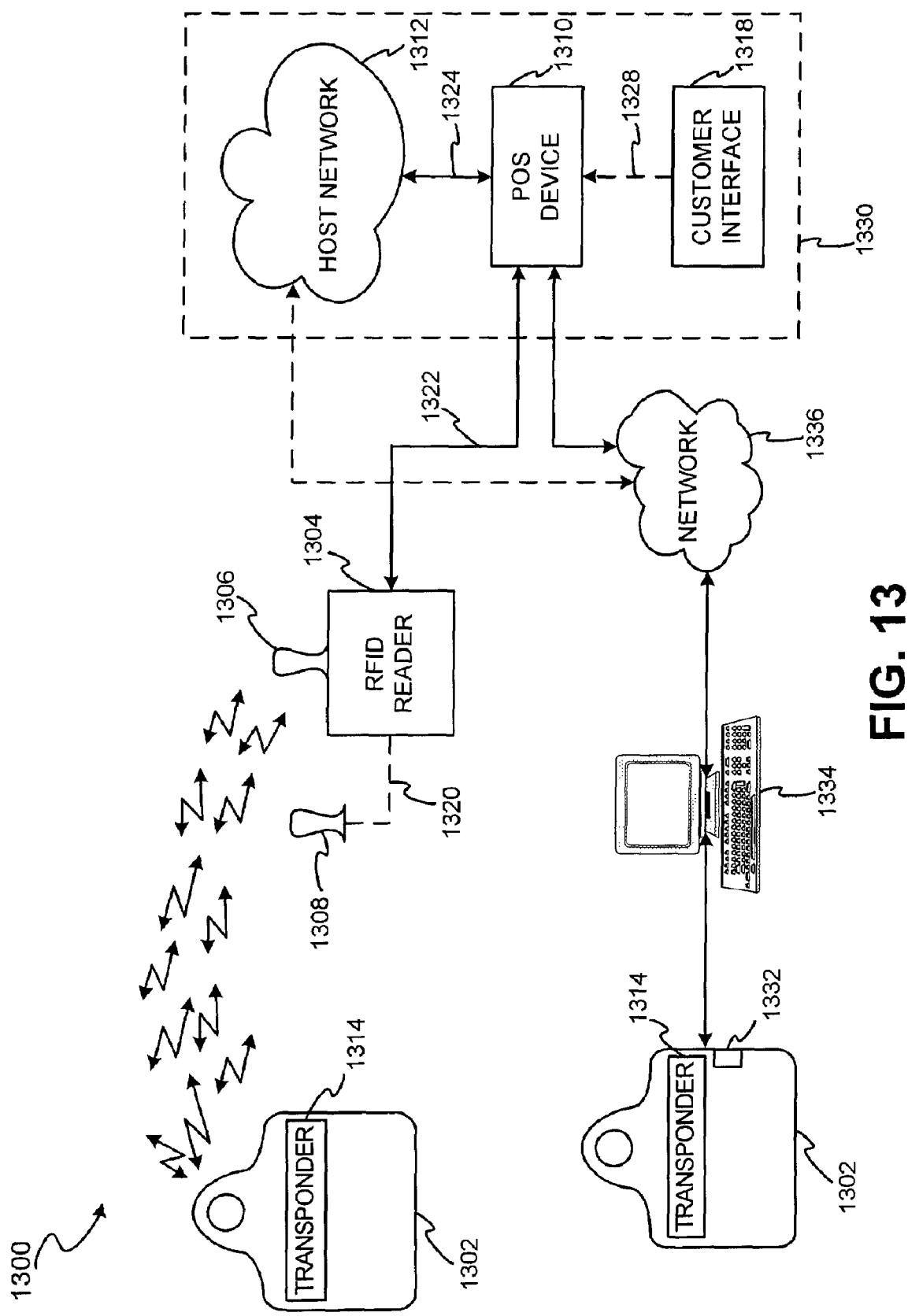
FIG. 13 is a diagram illustrating a system for providing transactions using RF payment devices.

FIG. 13 is a diagram illustrating a system 1300 for providing transactions using RF payment devices, wherein exemplary components for use in completing a fob transaction are depicted. In general, the operation of system 1300 may begin when fob 1302 is presented for payment, and is interrogated by RFID reader 1304 or, alternatively, interface 1334. Fob 1302 and RFID reader 1304 may then engage in mutual authentication after which the transponder 1302 may provide the transponder identification and/or account identifier to the RFID reader 1304 which may further provide the information to the merchant system 1330 POS device 1310. In this context, mutual authentication means that reader 1304 verifies that the fob 1302 is authorized to complete a transaction on system 1300, and the fob 1302 verifies that the reader 1304 is also authorized to complete a transaction on system 1300. The system, in certain embodiments, can operate independent of an RFID.

System 1300 may include a fob 1302 having a transponder 1314 and a RFID reader 1304 in RF communication with fob 1302. Although the present invention is described with respect to a fob 1302, the invention is not to be so limited. Indeed, system 1300 may include any device having a transponder which is configured to communicate with a RFID reader 1304 via RF communication. Typical devices may include, for example, a key ring, tag, card, cell phone, wristwatch or any such form capable of being presented for interrogation.

The RFID reader 1304 may be configured to communicate using a RFID internal antenna 1306. Alternatively, RFID reader 1304 may include an external antenna 1308 for communications with fob 1302, where the external antenna may be made remote to the RFID reader 1304 using a suitable cable and/or data link 1320. RFID reader 1304 may be further in communication with a merchant system 1330 via a data link 1322. The system 1300 may include a transaction completion system including a point-of-interaction device such as, for example, a merchant point-of-sale (POS) device 1310 or a computer interface (e.g., user interface) 1334. In one exemplary embodiment the transaction completion system may include a merchant system 1330 including the POS device 1310 in communication with a RFID reader 1304 (via data link 1322). As described more fully below, the transaction completion system may include the user interface 1334 connected to a network 1336 and to the transponder via a USB connector 1332.

Although the point-of-interaction device is described herein with respect to a merchant point-of-sale (POS) device, the invention is not to be so limited. Indeed, a merchant POS device is used herein by way of example, and the point-of-interaction device may be any device capable of receiving fob account data. In this regard, the POS may be any point-of-interaction device enabling the user to complete a transaction using a fob 1302. POS device 1310 may be in further communication with a customer interface 1318 (via data link 1328) for entering at least a customer identity verification information. In addition, POS device 1310 may be in communication with a merchant host network 1312 (via data link 1324) for processing any transaction request. In this arrangement, information provided by RFID reader 1304 is provided to the POS device 1310 of merchant system 1330 via data link 1322. The POS device 1310 may receive the information (and alternatively may receive any identity verifying information from customer interface 1318 via data link 1328) and provide the information to host system 1312 for processing.

A variety of conventional communications media and protocols may be used for data links 1320, 1322, 1324 and 1328. For example, data links 1320, 1322, 1324 and 1328 may be an Internet Service Provider (ISP) configured to facilitate communications over a local loop as is typically used in connection with standard modem communication, cable modem, dish networks, ISDN, Digital Subscriber Lines (DSL), or any wireless communication media. In addition, the merchant system 1330 including the POS device 1310 and host network 1312 may reside on a local area network which interfaces to a remote network (not shown) for remote authorization of an intended transaction. The merchant system 1330 may communicate with the remote network via a leased line, such as a T1, D3 line, or the like. Such communications lines are described in a variety of texts, such as "Understanding Data Communications," by Gilbert Held, which is incorporated herein by reference.

An account number, in accordance with this exemplary embodiment, may include any identifier correlated to a recurring billing account. The recurring billing account may be any account in which the accountholder receives periodic bills where the recurring billing account is not primarily a credit, charge debit, checking, savings, reward, loyalty, or the like. For example, the recurring billing account may be maintained by a transaction account provider (e.g., payment authorization center) such as, for example, a utility company, members only club, or the like. A typical account number in accordance with this embodiment may be formatted in a similar format as a continual credit or debit account, loyalty account, or rewards account, maintained and serviced by such entities as American Express, Visa and/or MasterCard, or the like. For ease in understanding, the present invention may be described with respect to a utility account, such as a monthly cellular phone bill provided to a cellular phone bill account provider. However, it should be noted that the invention is not so limited and other recurring billing which provide a monthly or regular recurring bill (not a credit, debit, or charge account) is contemplated to be within the scope of the present invention.

In addition, the account number (e.g., account data) may be associated with any device, code, or other identifier/indicia suitably configured to allow the consumer to interact or communicate with the system, such as, for example, authorization/access code, personal identification number (PIN), Internet code, digital certificate, biometric data, and/or other identification indicia. The account number may be optionally located on an RF device (as described more fully below), a rewards card, charge card, credit card, debit card, prepaid card, telephone card, smart card, magnetic stripe card, bar code card, and/or the like. In one exemplary embodiment, the account number may be distributed and stored in any form of plastic, electronic, magnetic, and/or optical device capable of transmitting or downloading data to a second device.

As noted, the account number may take similar form as a continual credit or charge card account number. A customer account number may resemble, for example, a sixteen-digit credit card number, although each account provider may have its own numbering system. Thus, the account number may use the fifteen-digit numbering system used by American Express. To ensure that the account numbers may be by merchant system POS 1310, each account number preferably complies with that company's standardized format such that the company using a sixteen-digit format will generally use four spaced sets of numbers, as represented by the number "0000 0000 0000 0000". In a typical example, the first five to seven digits are reserved for processing purposes and identify the issuing recurrent billing system, etc. In this example, the last sixteenth digit is used as a sum check for the sixteen-digit number. The intermediary eight-to-ten digits are used to uniquely identify the customer. The account number stored as Track 1 and Track 2 data as defined in ISO/IEC 7813, and further may be made unique to fob 1302. In one exemplary embodiment, the account number may include a unique fob serial number and user identification number, as well as specific application applets. The account number may be stored in fob 1302 inside a database 1314, as described more fully below. Database 1314 may be configured to store multiple account numbers issued to the fob 1302 user by the same or different account providing institutions. Where the account data corresponds to a loyalty or rewards account, the database 1314 may be configured to store the attendant loyalty or rewards points data.

RF payment devices and associated systems are described in more detail in U.S. patent application Ser. No. 10/192,488, entitled "SYSTEM AND METHOD FOR PAYMENT USING RADIO FREQUENCY IDENTIFICATION IN CONTACT AND CONTACTLESS TRANSACTIONS," and filed Jul. 9, 2002, which is incorporated herein by reference. The process for adding distinct account numbers to a database 1314 is described in U.S. patent application Ser. No. 10/708, 585, entitled "SYSTEMS AND METHODS FOR MANAGING MULTIPLE ACCOUNTS ON AN RF TRANSACTION INSTRUMENT," and filed Mar. 12, 2004, which is also incorporated herein by reference.

Figure 14:
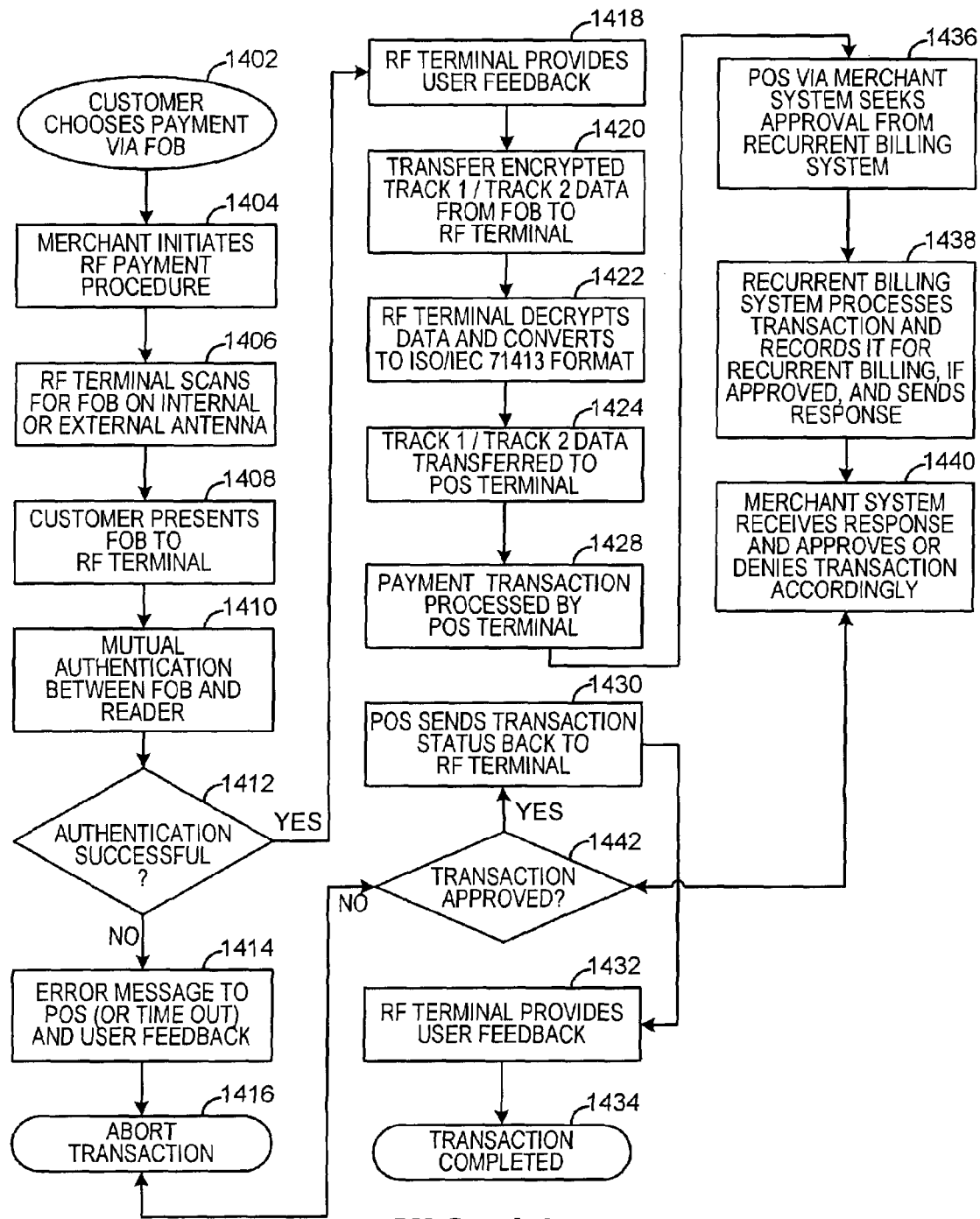
FIG. 14 is a flow chart of a method to provide for recurrent billing for transactions occurring via RF payment devices.

FIG. 14 is a flow chart of a method for the operation of system 1300 to provide for recurrent billing for transactions occurring via RF payment devices. This method can be implemented within, for example, software modules for execution by a corresponding network and computer system to process transactions occurring via RF payment devices.

The operation may be understood with reference to FIG. 13, which depicts the elements of system 1300 which may be used in an exemplary transaction. The process is initiated when a customer desires to present a fob 1302 for payment (step 1402). Upon presentation of the fob 1302, the merchant initiates the RF payment procedure via an RFID reader 1304 (step 1404). In particular, the RFID reader sends out an interrogation signal to scan for the presence of fob 1302 (step 1406). The RF signal may be provided via the RFID reader antenna 1306 or optionally via an external antenna 1308. The customer then may present the fob 1302 for payment (step 1408) and the fob 1302 is activated by the RF interrogation signal provided.

The fob 1302 and the RFID reader 1304 may then engage in mutual authentication (steps 1410 and 1412). Where the mutual authentication is unsuccessful, an error message may be provided to the customer via the RFID optical and/or audible indicator (step 1414) and the transaction may be aborted (step 1416). Where the mutual authentication is successful (steps 1412 and 1414), the RFID reader 1304 may provide the customer with an appropriate optical and/or audible message (e.g., "transaction processing" or "wait") (step 1418). The fob protocol/sequence controller 1308 may then retrieve from database 1314 an encrypted fob account number and provide the encrypted account number to the RFID reader 1304 (step 1420).

The RFID reader 1304 may then decrypt the account number and convert the account number into magnetic stripe (ISO/IEC 7813) format (steps 1422 and 1424) and provide the unencrypted account number to the merchant system 1330 (step 1428). In particular, the account number may be provided to the POS 1310 device for transmission to the merchant network 1312 for processing under known business transaction standards. The POS device 1310 via the merchant system 1330 seeks approval from the recurrent billing system, as described above, for the transaction (step 1436). The recurrent billing system processes the transaction and records it for recurrent billing, if approved, and sends a response (step 1438). This processing may occur using, for example, the recurrent billing system described above. For example, the account number is received, and the recurring billing system correlates the account number to the user's recurring billing account. The recurring billing system attempts to approve the transaction and, if successful, it adds the amount of the transaction to the user's recurring bill, which the user will see upon receiving the bill according to regular issuance of the recurring bill. If unsuccessful, the recurring billing system denies the transaction.

The merchant system 1330 receives the response from the recurrent billing system and approves or denies the transaction accordingly (step 1440). If the transaction is denied, then it is aborted (step 1416). If the transaction is approved (step 1442), the POS device 1310 may then send an optical and/or audible transaction status message to the RFID reader 1304 (step 1430) for communication to the customer (step 1432), and the transaction is completed (step 1434).

It should be noted that the transaction account associated with the fob 1302 may include a restriction, such as, for example, a per purchase spending limit, a time of day use, a day of week use, certain merchant use and/or the like, wherein an additional verification is required when using the fob outside of the restriction. The restrictions may be personally assigned by the fob 1302 user, or the account provider. For example, in one exemplary embodiment, the account may be established such that purchases above $X (i.e., the spending limit) must be verified by the customer. Such verification may be provided using a suitable personal identification number (PIN) which may be recognized by the RFID reader 1304 or a payment authorization center (not shown) as being unique to the fob 1302 holder (e.g., customer) and the correlative fob 1302 transaction account number. Where the requested purchase is above the established per purchase spending limit, the customer may be required to provide, for example, a PIN, biometric sample and/or similar secondary verification to complete the transaction.

Where a verification PIN is used as secondary verification the verification PIN may be checked for accuracy against a corroborating PIN which correlates to the fob 1302 transaction account number. The corroborating PIN may be stored locally (e.g., on the fob 1302, or on the RFID reader 1304) or may be stored on a database (not shown) at the payment authorization center. The payment authorization center database may be any database maintained and operated by the fob 1302 transaction account provider.

The verification PIN may be provided to the POS device 1310 using a conventional merchant (e.g., POS) PIN key pad 1318 in communication with the POS device 1310 as shown in FIG. 13, or a RFID keypad in communication with the RFID reader 1304. PIN keypad may be in communication with the POS device 1310 (or alternatively, RFID reader 1304) using any conventional data link described above. Upon receiving the verification PIN, the RFID reader 1304 may seek to match the PIN to the corroborating PIN stored on the RFID reader 1304 at database 1310 or 1320. Alternatively, the verification PIN may be provided to a payment authorization center to determine whether the PIN matches the PIN stored on the payment authorization center database which correlates to the fob 1302 account. If a match is made, the purchase may no longer be restricted, and the transaction may be allowed to be completed.

It should be understood that the present invention has been described above with reference to various exemplary embodiments and process steps as they concern database updating. Those skilled in the art, however, will recognize that changes and modifications may be made to the exemplary embodiments and process steps without departing from the scope of the present invention. For example, the various processing steps, as well as the components for carrying out the processing steps, may be implemented in alternate ways depending upon the particular application or in consideration of any number of cost functions associated with the operation of the system (e.g., various of the steps may be deleted, modified, or combined with other steps), such as providing that a blank expiration date field (EDF) is acceptable in applications involving in a predetermined processing. In particular, updates to the merchant billing database location may take place before the periodic maintenance report is provided to the merchant system. Alternatively, the merchant billing database location may be updated after the maintenance file has been provided to the merchant system and in response to the merchant's periodic registry report. In addition, the rejected records file may be provided to the merchant as a sub-file of the Summary Report, or it may be provided to the merchant as a file independent of any other provided files. Moreover, it should be understood that although the database updates are described herein as being updated automatically using the provider server or merchant system, updates and alterations to the merchant customer database and the merchant billing database location may be performed manually.

Further, it should be understood that the merchant billing database location may be updated in response to either a merchant transaction code provided with the periodic (e.g., daily, weekly, monthly, etc.) registry or in response to an alteration made to the credit card provider's main database. That is, where the provider has altered his main database (e.g., cancelled a customer's credit card privileges or issued a replacement card) the server 110 may update the merchant billing database location in response to a provider transaction code.

Further, it should be noted that other merchant or provider transactions may be performed for the purpose of updating the merchant billing database location. For example, where a merchant submits an outdated credit card number as a part of an "add" transaction, the provider may add the credit card number to the merchant BillingWatch Database location and retain the number as a record which may be ineligible for updating.

Further still, it should be noted that while the merchant recurrent billing credit card information update system described above is suitable for use by any suitable credit card provider, the system is not limited to use with credit card databases. For example, the system may be used with any system wherein a merchant has established a recurrent billing database, such as, recurrent billing to a checking or savings account. In this instance, the system described above may be used to update customer checking account numbers and billing addresses stored in a merchant customer database as the need arises.

Furthermore, while the present invention has been described with respect to a provider server for managing a database of provider customer subscribers, the invention is not to be so limited. For example, a server which manages a database containing customer information provided by multiple transaction card providers, is contemplated to be within the scope of the invention. In this embodiment, a server managing the multiple transaction card providers may operate in substantially a similar way as the provider server described herein.

These and other changes or modifications are intended to be included within the scope of the present invention, as set forth in the following claims.

What is claimed is:

1. A method comprising:

receiving, at a radio frequency identification (RFID) reader, a recurring billing transaction request from a radio frequency (RF) transaction device, wherein the recurring billing transaction request comprises an encrypted RF transaction device identifier and a recurring billing amount;

decrypting, at the RFID reader, the encrypted RF transaction device identifier to produce an RF transaction device identifier;

converting, at the RFID reader, the RF transaction device identifier into a magnetic stripe formatted identifier;

transmitting the magnetic stripe formatted identifier from the RFID reader via a point of sale (POS) device to a merchant server that includes a processor;

requesting, by the RFID reader, a secondary verification in response to a transaction restriction associated with the RF transaction device identifier;

receiving, at the RFID reader, the secondary verification; and indicating, at the RFID reader, approval of the recurring billing transaction request in response to the receiving the secondary verification, wherein the recurring billing amount is added to the total recurring billing amount in response to the merchant server approving the recurring billing transaction request, to create an updated total recurring billing amount, and wherein the updated total recurring billing amount is submitted via a network interface to a provider system for payment processing.

2. The method of claim 1, wherein a billing account record comprises a customer transaction account number, a customer merchant account number, and a customer transaction account expiration date.

3. The method of claim 2, wherein the recurring billing transaction request is approved in response to the customer transaction account expiration date in a merchant database on the merchant server.

4. The method of claim 1, wherein a recurring billing account record that is associated with a total recurring billing amount is stored in a database in the merchant server.

5. The method of claim 4, wherein the magnetic stripe formatted identifier is associated with the recurring billing account record and the total recurring billing amount.

6. The method of claim 4, wherein the recurring billing account record is associated with a recurring billing account in which an account holder receives periodic bills, wherein the recurring billing account is not primarily a credit account, charge account, debit account, checking account, savings account, reward account, loyalty account, or a financial account.

7. The method of claim 4, wherein the recurring billing account record is associated with a recurring billing account which provides a regularly recurring bill to an account holder, wherein the recurring billing account is not a credit account, debit account or charge account.

8. The method of claim 1, wherein the RF transaction device identifier is associated with at least one of an authorization code, an access code, a personal identification number (PIN), an Internet code, a digital certificate, or biometric data.

9. The method of claim 1, wherein the transaction restriction comprises at least one of a per purchase spending limit, a time of day restriction, a day of week restriction, or a merchant restriction.

10. The method of claim 9, wherein the transaction restriction is assigned by at least one of an RF transaction device user or the provider system.

11. The method of claim 1, wherein the secondary verification comprises at least one of a PIN or biometric sample data.

12. The method of claim 11, wherein the secondary verification is associated with the RF transaction device identifier, and wherein a corroborating secondary verification is stored on at least one of the RF transaction device, the RFID reader, or a merchant database.

13. The method of claim 12, further comprising comparing the secondary verification to the corroborating secondary verification.

14. The method of claim 13, further comprising receiving approval of the recurring billing transaction request in response to the comparing the secondary verification to the corroborating secondary verification.

15. The method of claim 10, wherein the updated total recurring billing amount is periodically submitted to the provider system for payment processing over a time period, in response to the updated total recurring billing amount remaining the same over the time period.

16. A method comprising:
receiving, at a network interface of a merchant server that includes a processor, a recurring billing transaction request associated with a radio frequency (RF) transaction device from a radio frequency identification (RFID) reader, wherein the recurring billing transaction request comprises a recurring billing amount;
receiving, at the merchant server, a magnetic stripe formatted identifier from a point of sale (POS) device, wherein the magnetic stripe formatted identifier is converted by the RFID reader from a decrypted RF transaction device identifier;
approving, at the merchant server, the recurring billing transaction request in response to a secondary verification, wherein the RFID reader receives the secondary verification in response to a transaction restriction associated with the RF transaction device identifier;
adding, at the merchant server, the recurring billing amount to the total recurring billing amount in response to the approving the recurring billing transaction request, to create an updated total recurring billing amount; and
submitting the updated total recurring billing amount from the merchant server to a provider system for payment processing.

17. The method of claim 16, further comprising modifying a merchant system registry file in accordance with a summary report from the provider system by appending a merchant transaction code to at least one of a plurality of recurring billing account records.

18. The method of claim 17, wherein the merchant transaction code comprises at least one of an add transaction code, a delete transaction code, or change transaction code.

19. The method of claim 17, further comprising periodically transmitting the merchant system registry file at a frequency of at least one of once per day, once per week, or once per month.

20. The method of claim 17, further comprising receiving the summary report from the provider system, wherein the summary report comprises a plurality of decision codes associated with the plurality of recurring billing account records transmitted in the merchant system registry file, and wherein the summary report further comprises a rejected records file.

21. The method of claim 20, wherein the summary report further comprises a tally of rejected records.

22. The method of claim 17, further comprising requesting provider preauthorization of at least one of the plurality of recurring billing account records.

23. The method of claim 17, wherein the modifying the merchant system registry file comprises manually modifying the merchant system registry file in accordance with the summary report.

24. The method of claim 16, further comprising associating the magnetic stripe formatted identifier with the recurring billing account record and the total recurring billing amount.

25. A merchant server that includes a processor, the merchant server configured to:
receive, at a network interface of the merchant server, a recurring billing transaction request associated with a radio frequency (RF) transaction device from a radio frequency identification (RFID) reader, wherein the recurring billing transaction request comprises a recurring billing amount;
receive, at the merchant server, a magnetic stripe formatted identifier from a point of sale (POS) device, wherein the magnetic stripe formatted identifier is converted by the RFID reader from a decrypted RF transaction device identifier;
approve, at the merchant server, the recurring billing transaction request in response to a secondary verification, wherein the RFID reader receives the secondary verification in response to a transaction restriction associated with the RF transaction device identifier;
add, at the merchant server, the recurring billing amount to the total recurring billing amount in response to the merchant server approving the recurring billing transaction request, to create an updated total recurring billing amount; and
submit the updated total recurring billing amount from the merchant server to a provider system for payment processing.

26. A merchant system, comprising:
a server comprising a processor and a database configured to store a recurring billing account record, wherein the server is configured to submit an updated total recurring billing amount associated with the recurring billing account record to a provider system for payment processing;

a radio frequency identification (RFID) reader configured to receive a recurring billing transaction request from an RF transaction device, wherein the recurring billing transaction request comprises an encrypted RF transaction device identifier and a recurring billing amount, wherein the RFID reader is configured to decrypt the encrypted RF transaction device identifier to produce an RF transaction device identifier, wherein the RFID reader is further configured to convert the RF transaction device identifier into a magnetic stripe formatted identifier and to transmit the magnetic stripe formatted identifier to a point of sale (POS) device; and a point of sale (POS) device configured to communicate with the server, wherein the POS device is configured to receive the magnetic stripe formatted identifier from the RFID reader, wherein the POS device is configured to receive a secondary verification in response to a transaction restriction associated with a radio frequency (RF) transaction device identifier, wherein the POS device is configured to transmit the magnetic stripe formatted identifier to the server, and wherein the recurring billing amount is added to a total recurring billing amount in response to an approval of the recurring billing transaction request and the secondary verification, to create the updated total recurring billing amount.

* * * * *